(12) United States Patent
Forbes

(10) Patent No.: US 12,188,729 B2
(45) Date of Patent: Jan. 7, 2025

(54) ADJUSTABLE HEAT TRANSFER ELEMENT

(71) Applicant: CONTROLS SOUTHEAST, INC., Charlotte, NC (US)

(72) Inventor: Brandon William Forbes, Charlotte, NC (US)

(73) Assignee: CONTROLS SOUTHEAST, INC., Pineville, NC (US)

( * ) Notice: Subject to any disclaimer, the term of this patent is extended or adjusted under 35 U.S.C. 154(b) by 193 days.

(21) Appl. No.: 17/494,247

(22) Filed: Oct. 5, 2021

(65) Prior Publication Data

US 2022/0113095 A1 Apr. 14, 2022

Related U.S. Application Data

(60) Provisional application No. 63/089,197, filed on Oct. 8, 2020.

(51) Int. Cl.
| | | |
|---|---|---|
| *F28F 1/20* | (2006.01) | |
| *F16L 53/32* | (2018.01) | |
| *F16L 53/70* | (2018.01) | |

(52) U.S. Cl.
CPC ............... *F28F 1/20* (2013.01); *F16L 53/32* (2018.01); *F16L 53/70* (2018.01)

(58) Field of Classification Search
CPC ............. F28F 1/20; F16L 53/32; F16L 53/70
(Continued)

(56) References Cited

U.S. PATENT DOCUMENTS

| | | | | |
|---|---|---|---|---|
| 1,305,170 A | * | 5/1919 | Ross | F02M 63/00 165/185 |
| 2,773,513 A | * | 12/1956 | Isenberg | F16L 59/14 165/45 |

(Continued)

FOREIGN PATENT DOCUMENTS

| | | |
|---|---|---|
| CA | 2745879 A1 | 6/2010 |
| GB | 656519 A | 8/1951 |
| GB | 1081889 A | 9/1967 |
| GB | 2034203 A | 6/1980 |
| JP | 51106000 A | 9/1976 |
| JP | 54170415 U | 12/1979 |

(Continued)

OTHER PUBLICATIONS

Electronically Traced Process Lines, S.O. Jones.
(Continued)

*Primary Examiner* — Jon T. Schermerhorn, Jr.
(74) *Attorney, Agent, or Firm* — Moore & Van Allen PLLC; Jeffrey R. Gray

(57) ABSTRACT

An adjustable, customizable, and configurable heat transfer element is structured for facilitating hear transfer in pipe systems having process pipes. The heat transfer element is configured for transferring heat between a process pipe and a corresponding tracer tube in order to maintain a fluid within the process pipe within a predetermined temperature range. In this regard, the heat transfer element may comprise a body having a nested portion that forms a cavity therein, each extending in a longitudinal direction. The body is configured for operative coupling to the process pipe. The cavity of the nested portion is configured to receive a tracer tube therein such that the tracer tube is positioned in between, and at least partially surrounded by the body and the process pipe. Moreover, the body may comprise a spine that is utilized to aid in bending the heat transfer element in one or more planes.

20 Claims, 31 Drawing Sheets

(58) Field of Classification Search
USPC .......................................................... 165/177
See application file for complete search history.

(56) References Cited

U.S. PATENT DOCUMENTS

| | | | | |
|---|---|---|---|---|
| 2,976,991 A * | 3/1961 | De Matteo | ............. | B21C 31/00 |
| | | | | 72/21.2 |
| 2,982,992 A * | 5/1961 | Brown | ............. | B05C 17/00516 |
| | | | | 118/77 |
| 3,079,673 A * | 3/1963 | Loehlein | ............... | H02G 1/086 |
| | | | | 29/241 |
| 3,151,633 A * | 10/1964 | Shuman | ............... | F16L 59/024 |
| | | | | 392/468 |
| 3,295,595 A * | 1/1967 | Armstrong | ............. | F24D 3/165 |
| | | | | 165/56 |
| 3,315,703 A | 4/1967 | Matthews et al. | | |
| 3,331,946 A * | 7/1967 | Bilbro | ................... | F28D 7/0008 |
| | | | | 338/253 |
| 3,351,738 A * | 11/1967 | Kahn | ...................... | H05B 3/00 |
| | | | | 219/535 |
| 3,354,292 A * | 11/1967 | Kahn | ...................... | H05B 3/00 |
| | | | | 219/535 |
| 3,364,337 A * | 1/1968 | Kahn | ...................... | F24H 1/142 |
| | | | | 219/535 |
| 3,398,262 A * | 8/1968 | Kahn | ...................... | H05B 3/00 |
| | | | | 219/535 |
| 3,548,158 A * | 12/1970 | Mccaskill | ................ | F24H 1/142 |
| | | | | 219/535 |
| 3,552,482 A * | 1/1971 | Ando | ..................... | H05B 6/108 |
| | | | | 392/468 |
| 3,617,699 A * | 11/1971 | Othmer | .................. | F24H 9/455 |
| | | | | 219/535 |
| 3,675,379 A * | 7/1972 | Lambert | ............... | E04H 1/1238 |
| | | | | 52/274 |
| 3,693,711 A * | 9/1972 | Zygiel | ................... | B21C 37/151 |
| | | | | 165/DIG. 397 |
| 3,706,872 A * | 12/1972 | Trabilcy | ................ | F16L 53/34 |
| | | | | 219/535 |
| 3,782,452 A * | 1/1974 | Ceplon | .................. | F16L 59/13 |
| | | | | 219/535 |
| 3,823,769 A * | 7/1974 | Anderson | .............. | F28D 15/04 |
| | | | | 165/185 |
| 3,834,458 A * | 9/1974 | Bilbro | .................... | B23P 15/26 |
| | | | | 165/185 |
| 3,949,189 A * | 4/1976 | Bilbro | .................... | H05B 3/565 |
| | | | | 219/535 |
| 3,955,601 A * | 5/1976 | Plummer, III | .......... | F16L 59/08 |
| | | | | 138/168 |
| 3,972,821 A * | 8/1976 | Weidenbenner | ........ | C08L 63/00 |
| | | | | 252/75 |
| 4,031,611 A * | 6/1977 | Johnson, Jr. | ............. | F16L 59/18 |
| | | | | 285/55 |
| RE29,332 E * | 8/1977 | Bilbro | .................... | H05B 3/565 |
| | | | | 219/535 |
| 4,068,966 A * | 1/1978 | Johnson | ................ | F16B 7/0433 |
| | | | | 248/74.5 |
| 4,123,837 A * | 11/1978 | Horner | ................... | B23P 15/26 |
| | | | | 219/535 |
| 4,152,577 A * | 5/1979 | Leavines | ............... | F24H 9/1818 |
| | | | | 219/535 |
| 4,194,536 A * | 3/1980 | Stine | ..................... | F16L 59/153 |
| | | | | 392/480 |
| 4,203,186 A * | 5/1980 | Horner | .................. | B23P 15/26 |
| | | | | 219/535 |
| 4,280,045 A * | 7/1981 | Blackmore | ............. | F16L 53/34 |
| | | | | 219/535 |
| 4,281,238 A * | 7/1981 | Noma | ..................... | H05B 3/58 |
| | | | | 219/535 |
| 4,314,144 A * | 2/1982 | Wojtecki | ................ | H05B 3/54 |
| | | | | 392/431 |
| 4,334,142 A * | 6/1982 | Blackmore | ............ | H05B 6/108 |
| | | | | 219/535 |
| 4,346,277 A * | 8/1982 | Wojtecki | ................ | H05B 3/54 |
| | | | | 392/431 |
| 4,377,200 A * | 3/1983 | Kochanowski | ..... | F28D 21/0007 |
| | | | | 165/169 |
| 4,401,156 A * | 8/1983 | Wojtecki | ................ | F28F 9/013 |
| | | | | 165/172 |
| 4,429,845 A * | 2/1984 | Stover | ...................... | E01B 7/24 |
| | | | | 219/541 |
| 4,497,365 A * | 2/1985 | Boyer | .................... | F28D 7/106 |
| | | | | 165/169 |
| 4,653,541 A * | 3/1987 | Oehlschlaeger | .......... | F17D 5/04 |
| | | | | 138/104 |
| 4,791,277 A * | 12/1988 | Montierth | .............. | H05B 3/565 |
| | | | | 219/535 |
| 5,086,836 A * | 2/1992 | Barth | ...................... | F16L 53/32 |
| | | | | 137/340 |
| 5,184,283 A * | 2/1993 | Hamel | ............... | H05K 7/20854 |
| | | | | D13/184 |
| 5,230,737 A * | 7/1993 | Takada | ................... | B05C 1/0826 |
| | | | | 118/235 |
| 5,294,780 A * | 3/1994 | Montierth | ................ | H05B 3/56 |
| | | | | 219/535 |
| 5,454,061 A * | 9/1995 | Carlson | ................. | B29C 53/827 |
| | | | | 392/480 |
| 5,501,734 A * | 3/1996 | Oliphant | ............... | A61C 15/041 |
| | | | | 118/712 |
| 5,605,365 A * | 2/1997 | George | ................. | E05C 17/166 |
| | | | | 292/DIG. 53 |
| 5,642,640 A | 7/1997 | Insalaco et al. | | |
| 5,832,987 A * | 11/1998 | Lowry | .................... | G06F 1/203 |
| | | | | 361/679.52 |
| 5,857,515 A * | 1/1999 | Skupien | ................ | F28D 7/0008 |
| | | | | 165/47 |
| 5,933,574 A * | 8/1999 | Avansino | ................ | F16L 53/38 |
| | | | | 219/535 |
| 5,975,195 A * | 11/1999 | Lowry | ..................... | F28F 13/00 |
| | | | | 361/679.52 |
| 6,031,611 A * | 2/2000 | Rosakis | ................. | G01B 11/2441 |
| | | | | 359/521 |
| 6,131,617 A * | 10/2000 | Pitzer | ..................... | F16L 35/00 |
| | | | | 138/143 |
| 6,154,960 A * | 12/2000 | Baldantoni | ............... | F28F 1/16 |
| | | | | 285/289.1 |
| 6,190,480 B1 * | 2/2001 | Carlson | .................... | H05B 3/40 |
| | | | | 156/190 |
| 6,410,893 B1 * | 6/2002 | Yagnik | ...................... | C08K 3/28 |
| | | | | 219/544 |
| 6,435,266 B1 * | 8/2002 | Wu | ............................ | F28F 1/24 |
| | | | | 29/890.032 |
| 6,542,831 B1 * | 4/2003 | Moosmuller | ........... | G01N 21/33 |
| | | | | 702/29 |
| 6,595,241 B2 * | 7/2003 | Chen | ...................... | F28D 7/0008 |
| | | | | 165/96 |
| 6,805,167 B2 * | 10/2004 | Heise | ..................... | F16L 53/38 |
| | | | | 219/535 |
| 6,810,916 B2 * | 11/2004 | Thompson | ................ | E03C 1/12 |
| | | | | 138/112 |
| 6,905,566 B1 * | 6/2005 | Pitzer | ................... | B29D 23/001 |
| | | | | 156/203 |
| 7,203,419 B2 * | 4/2007 | Malone | ................... | F16L 53/38 |
| | | | | 392/479 |
| 7,321,107 B2 * | 1/2008 | Yagnik | ..................... | C08K 3/28 |
| | | | | 219/544 |
| 7,568,526 B2 * | 8/2009 | de St. Remey | ......... | E21B 36/04 |
| | | | | 166/61 |
| 7,626,146 B2 * | 12/2009 | Steinhauser | ............. | H05B 3/56 |
| | | | | 392/467 |
| 7,694,717 B2 * | 4/2010 | Bonner | ................. | F28F 9/0256 |
| | | | | 165/80.1 |
| 7,793,689 B2 * | 9/2010 | Becker | ..................... | H05B 3/56 |
| | | | | 219/535 |
| 8,469,082 B2 * | 6/2013 | Perry | ..................... | F16L 53/38 |
| | | | | 165/185 |
| 8,662,156 B2 * | 3/2014 | Perry | ..................... | F16L 53/38 |
| | | | | 165/185 |

(56) References Cited

U.S. PATENT DOCUMENTS

| | | | |
|---|---|---|---|
| 8,899,310 B2 * | 12/2014 | Perry | B21D 53/06 |
| | | | 165/185 |
| 9,841,239 B2 * | 12/2017 | Perry | F28D 7/0008 |
| 10,520,257 B2 * | 12/2019 | Perry | F16L 53/38 |
| 2007/0212037 A1 * | 9/2007 | Koenekamp | H01M 8/04037 |
| | | | 392/468 |
| 2009/0064925 A1 * | 3/2009 | Obenauer | B27G 11/00 |
| | | | 118/242 |
| 2010/0078155 A1 * | 4/2010 | Morra | F28D 15/00 |
| | | | 165/104.19 |
| 2011/0297360 A1 | 12/2011 | Perry | |
| 2012/0227951 A1 | 9/2012 | Perry | |
| 2013/0048257 A1 * | 2/2013 | Perry | F28F 1/10 |
| | | | 165/182 |
| 2014/0083545 A1 | 3/2014 | Perry | |
| 2017/0314863 A1 * | 11/2017 | Perry | F16L 53/70 |
| 2017/0314864 A1 * | 11/2017 | Perry | F16L 53/38 |
| 2017/0314865 A1 * | 11/2017 | Perry | F28D 7/0008 |
| 2017/0314866 A1 * | 11/2017 | Perry | F16L 53/38 |
| 2017/0314867 A1 * | 11/2017 | Perry | F16L 53/70 |
| 2017/0314868 A1 * | 11/2017 | Perry | B21D 53/06 |
| 2017/0314869 A1 | 11/2017 | Perry | |

FOREIGN PATENT DOCUMENTS

| | | | |
|---|---|---|---|
| JP | 59079327 A | 5/1984 |
| JP | 61070686 A | 4/1986 |
| JP | 63112696 A | 5/1988 |
| JP | 01137126 A | 5/1989 |
| JP | 05196376 A | 8/1993 |
| JP | 2000110985 A | 4/2000 |
| JP | 2003172591 A | 6/2003 |
| JP | 2003307396 A | 10/2003 |
| JP | 2006317046 A | 11/2006 |
| JP | 2008170128 A | 7/2008 |
| KR | 1020020089736 A | 11/2002 |
| KR | 100563847 B1 | 3/2006 |
| WO | 03074926 A1 | 9/2003 |
| WO | 2010065946 A2 | 6/2010 |
| WO | 2011103410 A2 | 8/2011 |

OTHER PUBLICATIONS

PIP PNSC0035 Steam Tracing Specification.

Institution decision in IPR2017-00977 for U.S. Pat. No. 8,662,156.

* cited by examiner

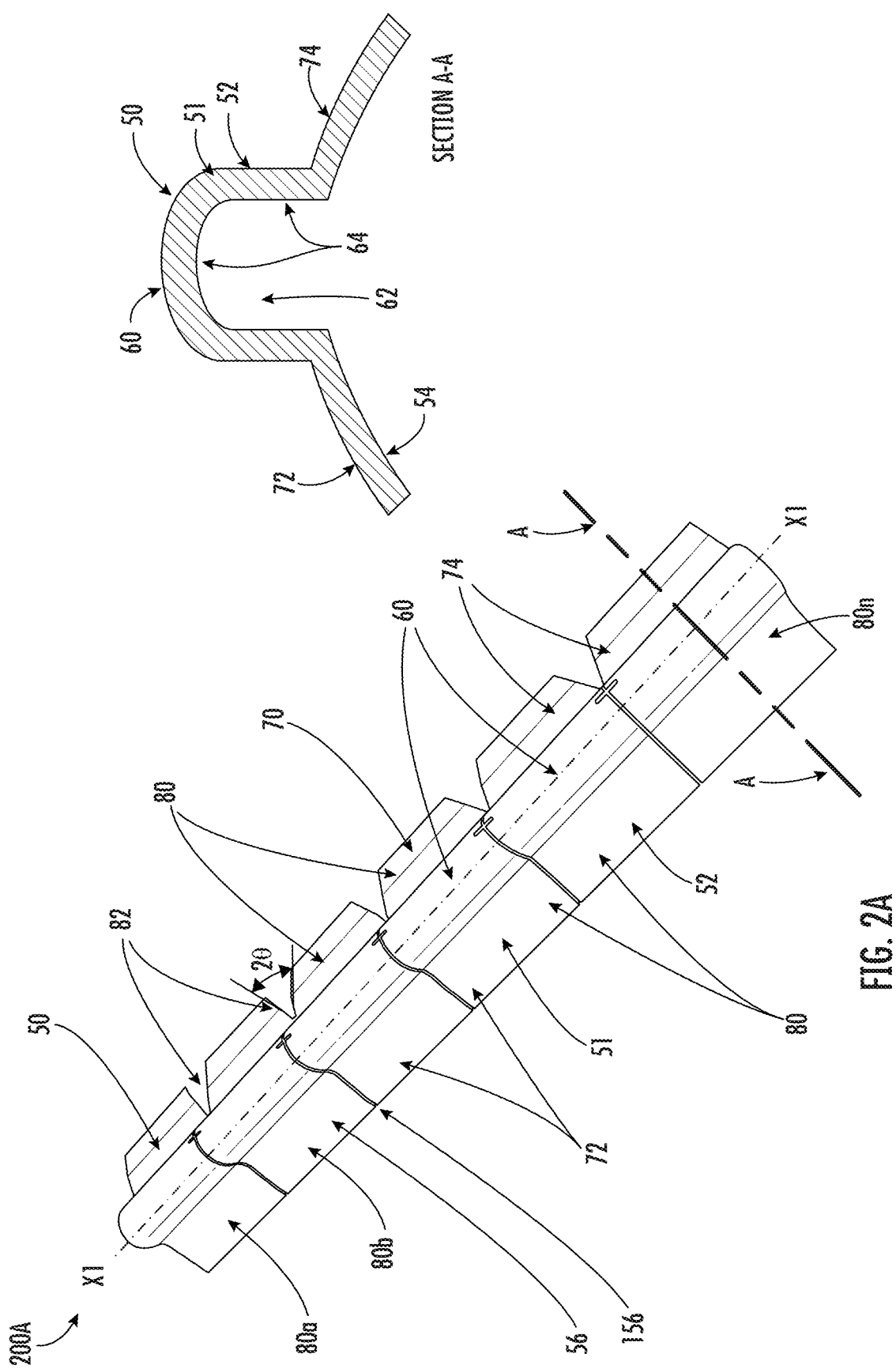

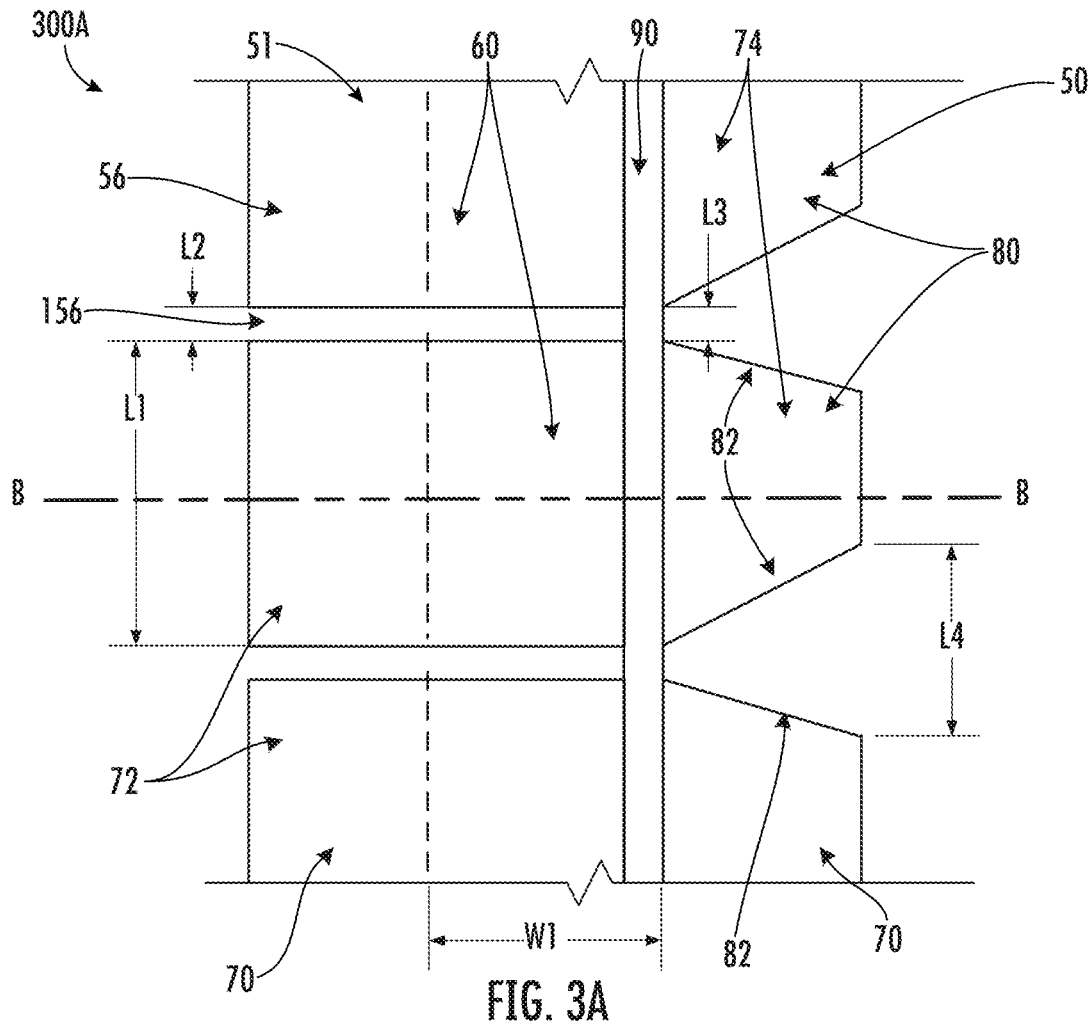
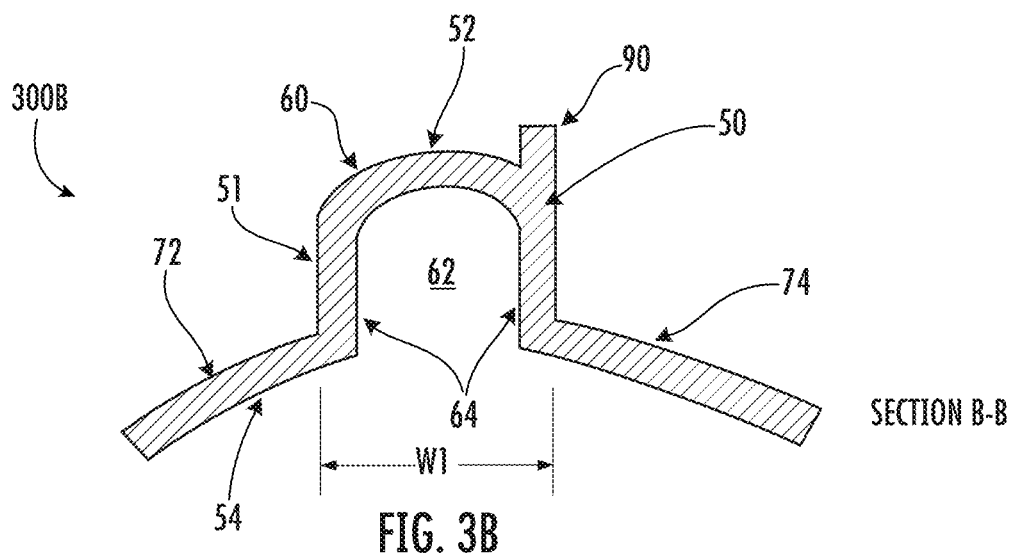
FIG. 3A
FIG. 3B
SECTION B-B

SECTION C-C

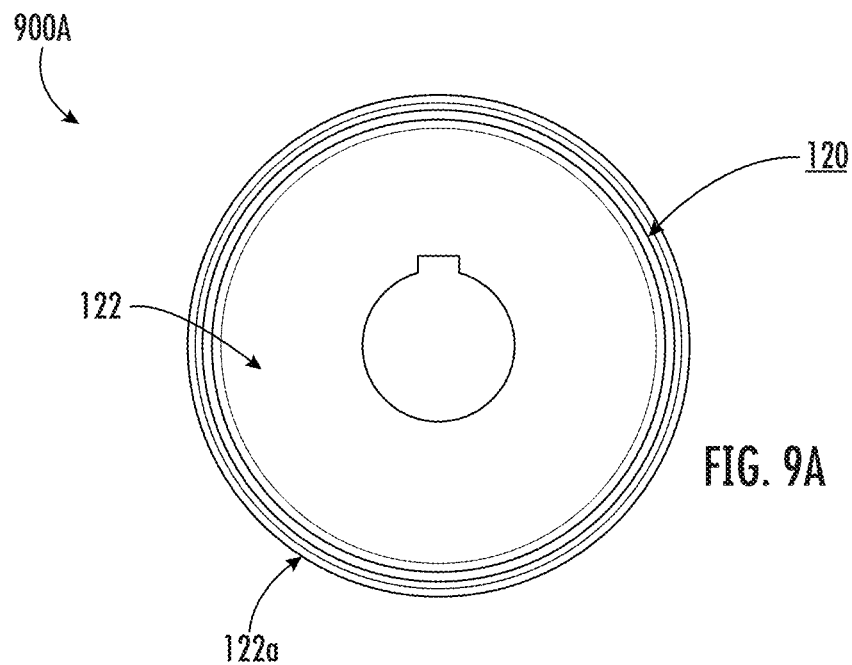
FIG. 9A
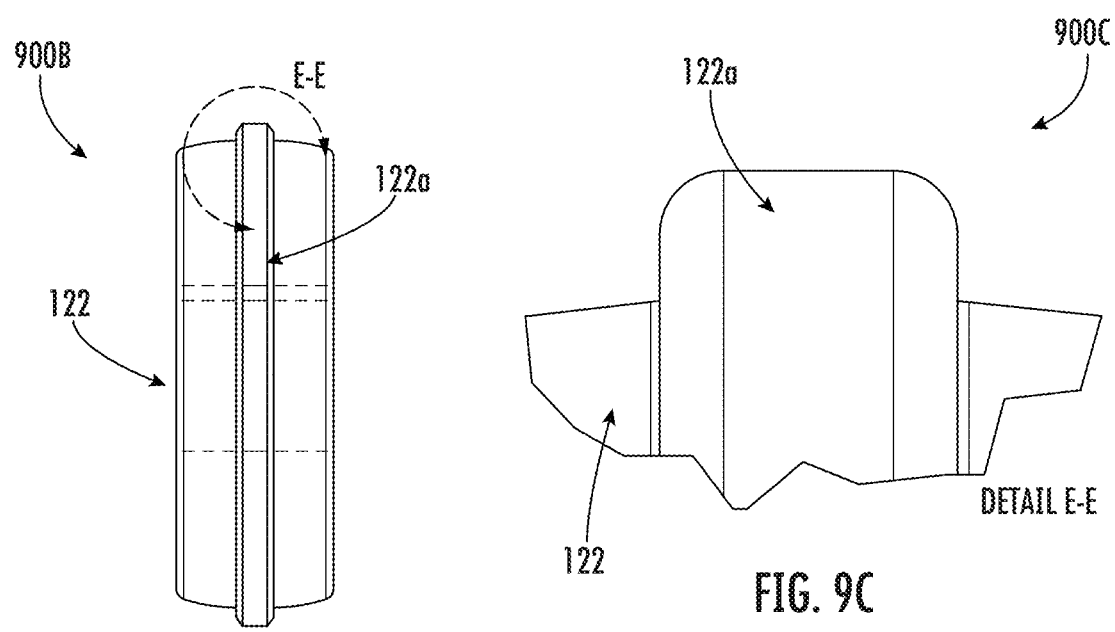
FIG. 9B
FIG. 9C

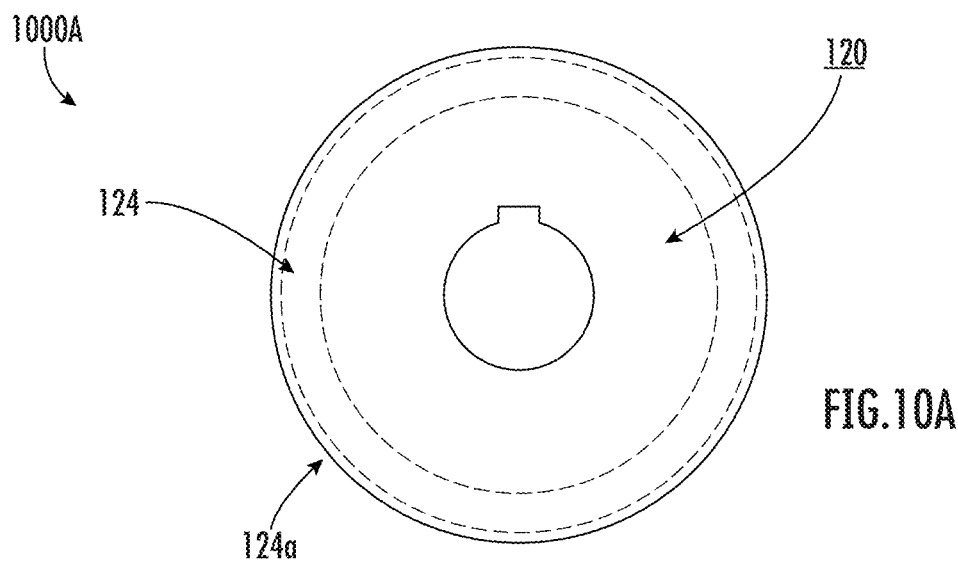
FIG.10A
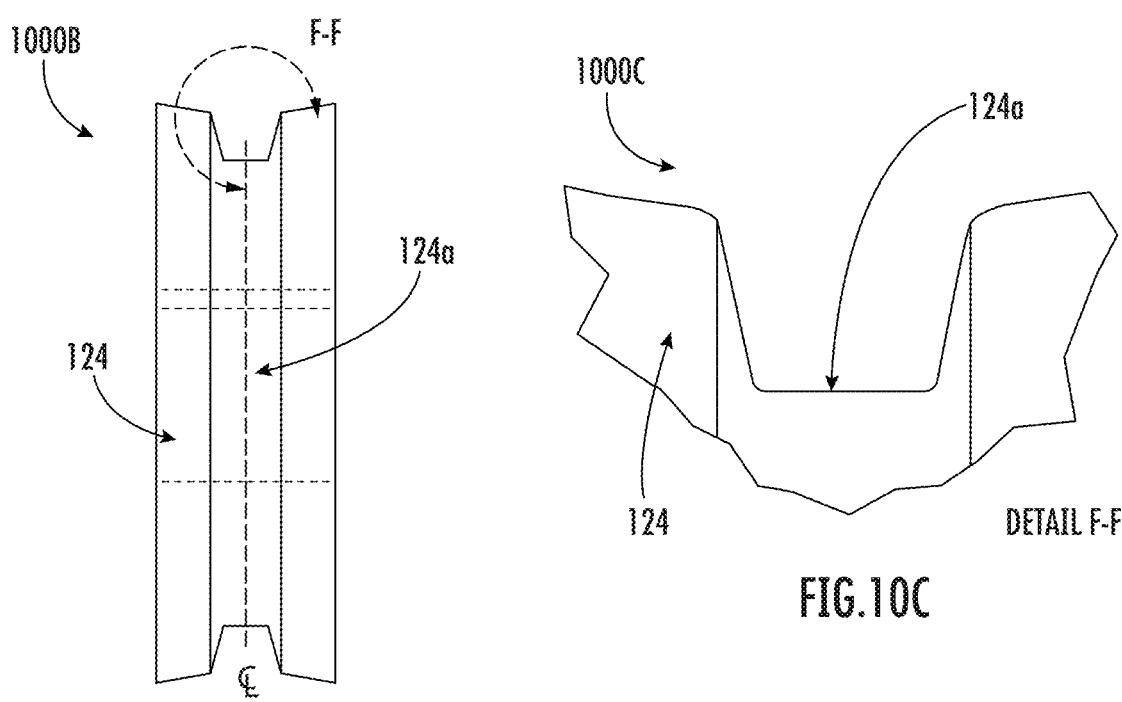
FIG.10B
DETAIL F-F
FIG.10C

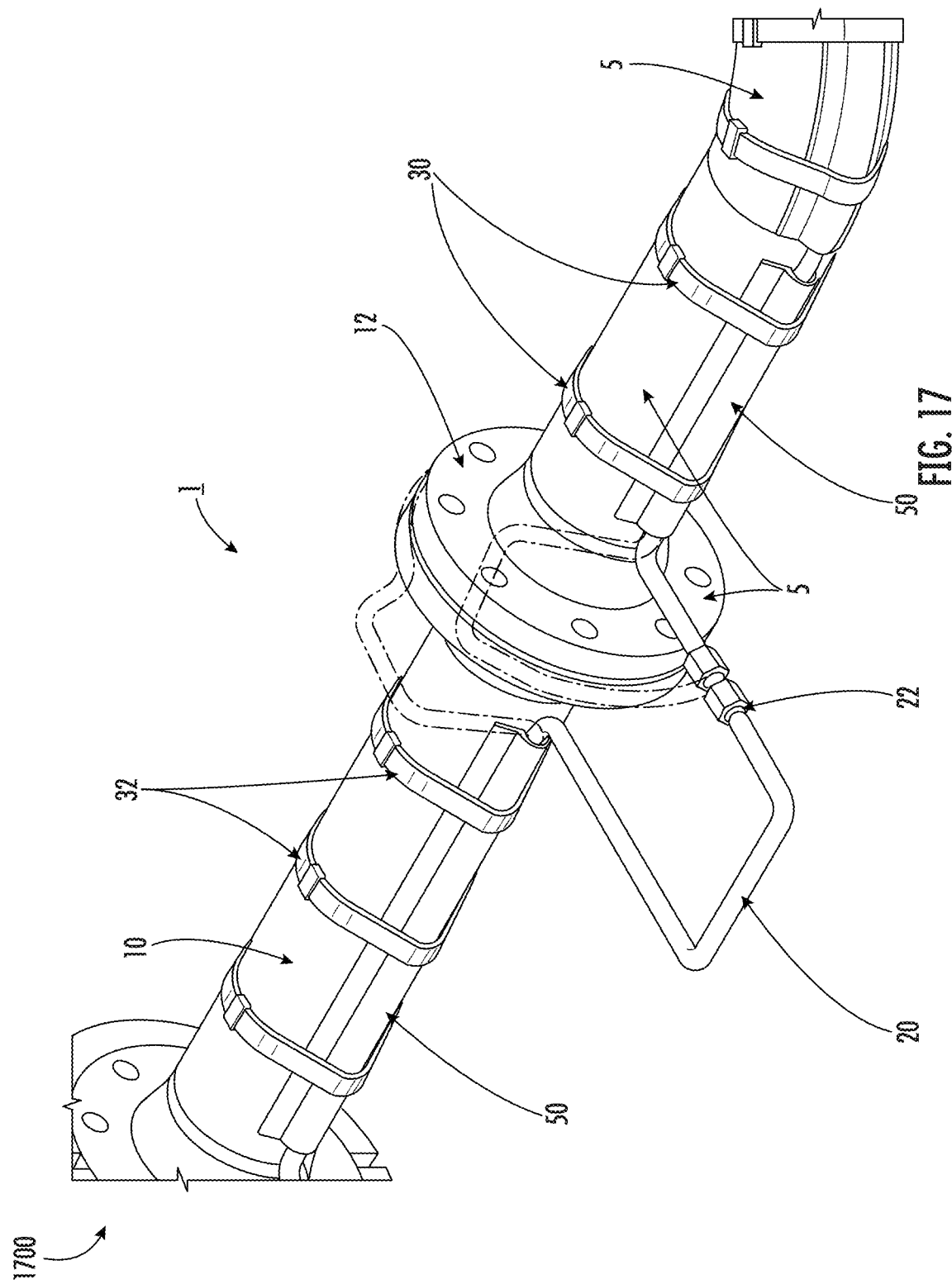

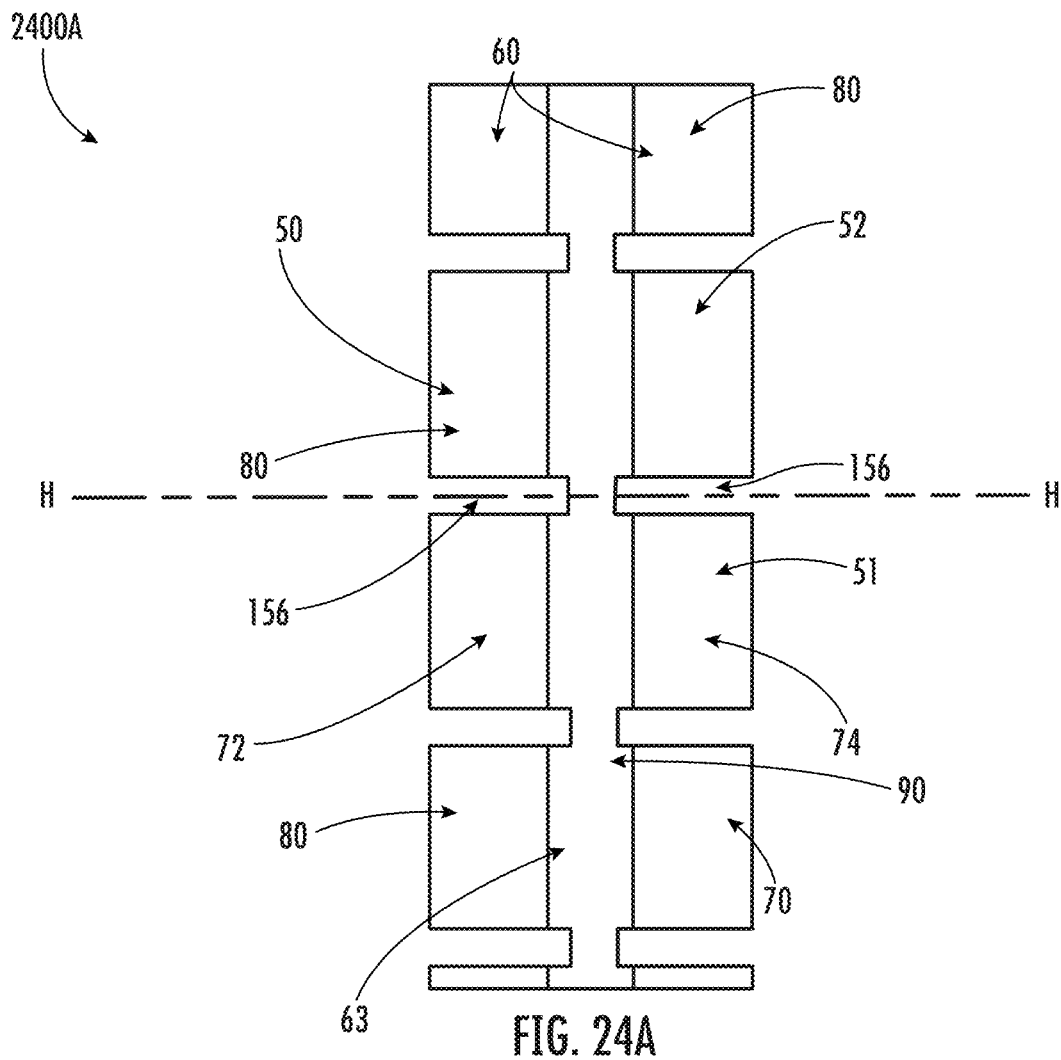
FIG. 24A
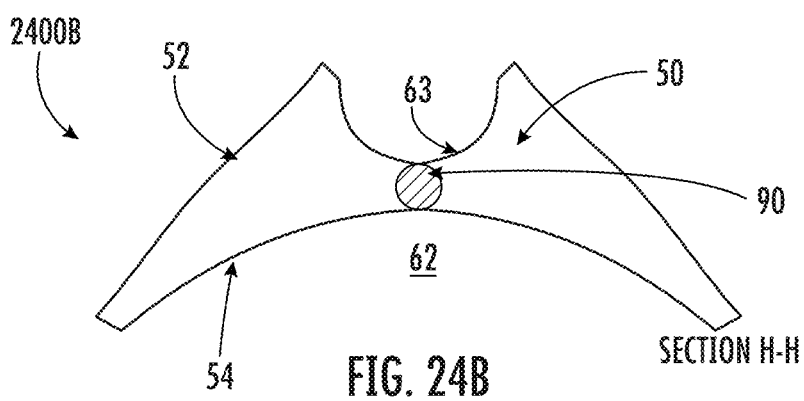
FIG. 24B  SECTION H-H

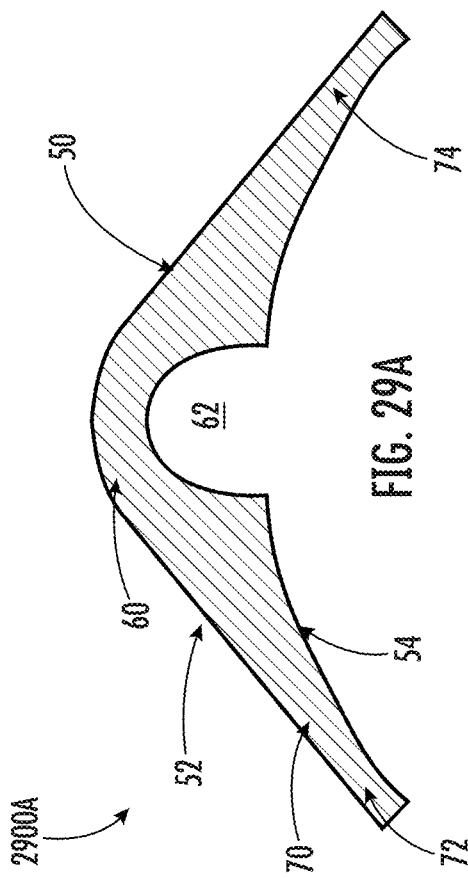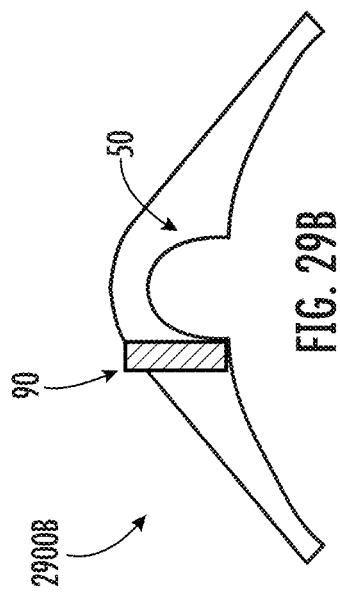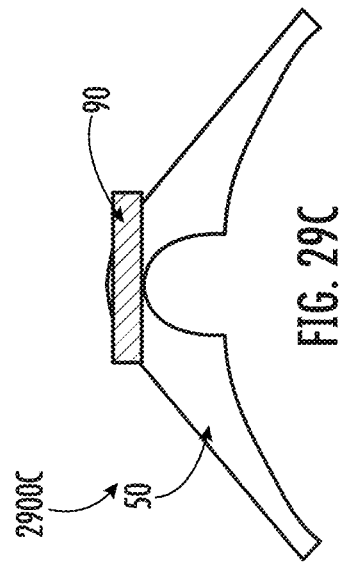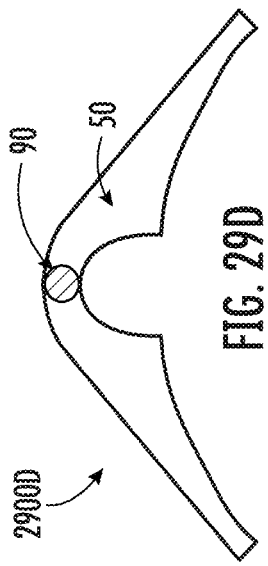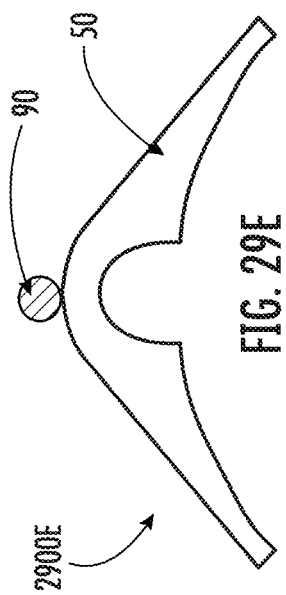

ADJUSTABLE HEAT TRANSFER ELEMENT

CLAIM OF PRIORITY UNDER 35 U.S.C. § 119

The present Application for a Patent claims priority to U.S. Provisional Patent Application Ser. No. 63/089,197 entitled "Adjustable Heat Transfer Element" filed on Oct. 8, 2020 and assigned to the assignee hereof and hereby expressly incorporated by reference herein.

FIELD

The present invention generally relates to apparatuses, systems, and methods for implementing and/or enhancing heat transfer in pipe systems. Specifically, the present invention relates to heat transfer elements, and in particular, heat transfer profiles and adjustable heat transfer elements for process piping and process piping components.

BACKGROUND

Pipes, and pipe systems, are widely used for innumerable functions, such as, for example, transporting fluids. Typically, it is desirable to maintain a fluid transported via a pipe system at a predetermined temperature range in order to maintain the fluid in a liquid form (e.g., above an ambient temperature of an environment in which the pipe is located, or the like) and/or to prevent undesirable and effects to fluid flow properties and fluid composition. Therefore, there is a need for apparatuses and systems that facilitate heat transfer in pipe systems such that the temperature of fluids in pipe systems can be controlled (e.g., maintained, sustained, adjusted, regulated, or the like), in order to achieve the required temperatures of the fluid being transported within the pipes.

BRIEF SUMMARY

The present invention addressed the foregoing deficiencies of conventional systems and provides other advantages by providing an adjustable, customizable, and configurable heat transfer element that is structured for facilitating heat transfer in pipe systems having process pipes. Embodiments of the invention are directed to a heat transfer element configured for transferring heat between a process pipe and a corresponding tracer tube and the process pipe (e.g., in order to maintain a fluid within the process pipe within a predetermined temperature range). In this regard, the heat transfer element may comprise a body having a nested portion that forms a cavity therein, each extending in a longitudinal direction. The body is configured for operative coupling to process pipe component portions such as the process pipe (e.g., such that the longitudinal direction of the body is parallel to an axis of the process pipe, at least, at the region proximate the body). The cavity of the nested portion is configured to receive a tracer tube therein such that the tracer tube is positioned in between, and at least partially surrounded by the body, and in some configurations the process pipe. The body is configured for operative coupling to the process pipe not only at its tube portions, but also at its couplings, flanges, supports, control elements, and/or other devices/components.

One embodiment of the invention comprises a heat transfer element. The heat transfer element comprises a body comprising a nested portion that forms a cavity therein. The body is configured for operative coupling to a process pipe component portion, and the body and the cavity of the body extend in a longitudinal direction. The cavity of the nested portion is configured to receive a tracer tube, and the heat transfer element is configured to transfer heat between the tracer tube and a process pipe component portion.

In further accord with embodiments the body comprises a plurality of discrete body portions each comprising the nested portion, and a spine operatively coupling the discrete body portions together. The spine is configured to be bent in one or more planes to form a curved heat transfer element.

In other embodiments, the spine is operatively coupled to an outer surface radially outward of the cavity of the nested portion the plurality of discrete body portions.

In still other embodiments, the spine is operatively coupled to an outer surface adjacent of the cavity of the nested portion of the plurality of discrete body portions.

In yet other embodiments, the plurality of discrete body portions comprise one or more bevels that are configured to allow bending of the body in a beveled plane to a radius that is smaller than the radius in a non-bevel plane.

In further accord with embodiment, the body has a plurality of body apertures extending laterally at least partially into the body that allow the body to be formed into a curved heat transfer element by forming a radius in at least a portion of the heat transfer element.

In other embodiments, the heat transfer element further comprises a spine operatively coupled to the body.

In still other embodiments, the plurality of body apertures further extend into a portion of the spine.

In yet other embodiments, the spine has a length, a width, and a thickness. The thickness is less than the width and the length, and the width is less than the length. The thickness facilitates bending of the spine out of a plane created by the width and the length.

In further accord with embodiments, the body is formed into a curved heat transfer element by forming a radius in at least a portion of the heat transfer element.

In other embodiments, the body comprises a body profile, and rolling the body into the curved heat transfer element comprises passing a straight heat transfer element between opposing rollers that have a roller profile that corresponds with the body profile of the body.

In still other embodiments, the body further comprises one or more arms operatively coupled to the body.

In yet other embodiments, an inner surface of the one or more arms are curved to provide surface to surface contact between the process pipe component portion and the inner surface of the one or more arms of the heat transfer element.

In further accord with embodiments, the nested portion is formed within an inner surface of the body such that the cavity extends from the inner surface of the body into the body.

In other embodiments, the nested portion is formed within an outer surface of the body such that the cavity extends from the outer surface of the body into the body.

Another embodiment invention comprises a heat transfer system. The system comprises a process pipe component portion, a tracer tube, and a heat transfer element operatively coupled to the tracer tube and the process pipe component portion. The heat transfer element comprises a body comprising a nested portion that forms a cavity therein and one or more arm portions extending from the body. The one or more arm portions are configured to contact the process pipe component portion, and the body and the cavity of the body extend in a longitudinal direction. The cavity of the nested portion is configured to receive a tracer tube, and the heat transfer element is configured to transfer heat between the tracer tube and a process pipe through the one or more arm portions.

In further accord with embodiments, the body of the heat transfer element comprises a plurality of discrete body portions each comprising the nested portion, and a spine operatively coupling the discrete body portions together. The spine is configured to be bent in one or more planes to form a curved heat transfer element.

In other embodiments, the body has a plurality of body apertures extending laterally at least partially into the body that allow the body to be formed into a curved heat transfer element by forming a radius in at least a portion of the heat transfer element.

In still other embodiments, the body is formed into a curved heat transfer element by forming a radius in at least a portion of the heat transfer element. The body comprises a body profile, and rolling the body into the curved heat transfer element comprises passing a straight heat transfer element between opposing rollers that have a roller profile that corresponds with the body profile of the body.

Other embodiments of the invention comprise a method of installing a heat transfer element. The heat transfer element comprises a body comprising a nested portion that forms a cavity therein that extend in a longitudinal direction. The method comprises bending the heat transfer element into a curved heat transfer element by forming a radius in at least a portion of the heat transfer element. The method further comprises assembling the heat transfer element and a tracer to a process pipe component portion, and wherein the tracer located within the cavity of the heat transfer element. The heat transfer element and tracer are operatively coupled to the process pipe component portion to exchange heat between the tracer and process pipe through the heat transfer element around an elbow or flange of the process pipe.

The features of the invention believed to be novel and the elements and characteristic of the invention are set forth with particularity in the appended claims. The figures are for illustration purposes only and are not drawn to scale. The invention itself, however, both as to organization and method of operation, may best be understood by reference to the description of the embodiment(s), which follows, taken in conjunction with the accompanying drawings.

BRIEF DESCRIPTION OF THE DRAWINGS

The figures illustrate embodiments of the invention, and are not necessarily drawn to scale, wherein:

FIG. 2A illustrates a perspective view 200A of a heat transfer element 50 in a linear configuration, in accordance with some embodiments of the disclosure.

FIG. 3A illustrates a schematic top view 300A of a heat transfer element 50, in accordance with some embodiments of the disclosure.

FIG. 3B illustrates a cross-sectional view 300B of the heat transfer element 50 of FIG. 3A, in accordance with some embodiments of the disclosure.

FIG. 9A illustrates a front view 900A of the first roller 122 of FIG. 8A, in accordance with some embodiments of the disclosure.

FIG. 9B illustrates a side view 900B of the first roller 122 of FIG. 9A, in accordance with some embodiments of the disclosure.

FIG. 9C illustrates a detail view 900C of the first roller 122 of FIG. 9B, in accordance with some embodiments of the disclosure.

FIG. 10A illustrates a front view 1000A of the second roller 124 of FIG. 8B, in accordance with some embodiments of the disclosure.

FIG. 10B illustrates a side view 1000B of the second roller 124 of FIG. 10A, in accordance with some embodiments of the disclosure.

FIG. 10C illustrates a detail view 1000C of the second roller 124 of FIG. 10B, in accordance with some embodiments of the disclosure.

FIG. 17 illustrates a schematic perspective view 1700 of heat transfer system 1, in accordance with some embodiments of the disclosure.

FIG. 24A illustrates a schematic top view 2400A of a heat transfer element 50, in accordance with some embodiments of the disclosure.

FIG. 24B illustrates a cross-sectional view 2400B of the heat transfer element 50 of FIG. 24A, in accordance with some embodiments of the disclosure.

FIG. 29A illustrates a schematic cross-sectional view 2900A of a heat transfer element 50, in accordance with some embodiments of the disclosure.

FIGS. 29B to 29E illustrate schematic cross-sectional views 2900B-2900E of the heat transfer element 50 of FIG. 29A with alternative positions of a spine 90, in accordance with some embodiments of the disclosure.

DETAILED DESCRIPTION OF THE INVENTION

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In describing the embodiment(s) of the present invention, reference will be made herein to FIGS. 1 to 30E of the drawings in which like numerals refer to like features of the invention. Features of the invention are not necessarily shown to scale.

Figure 1:
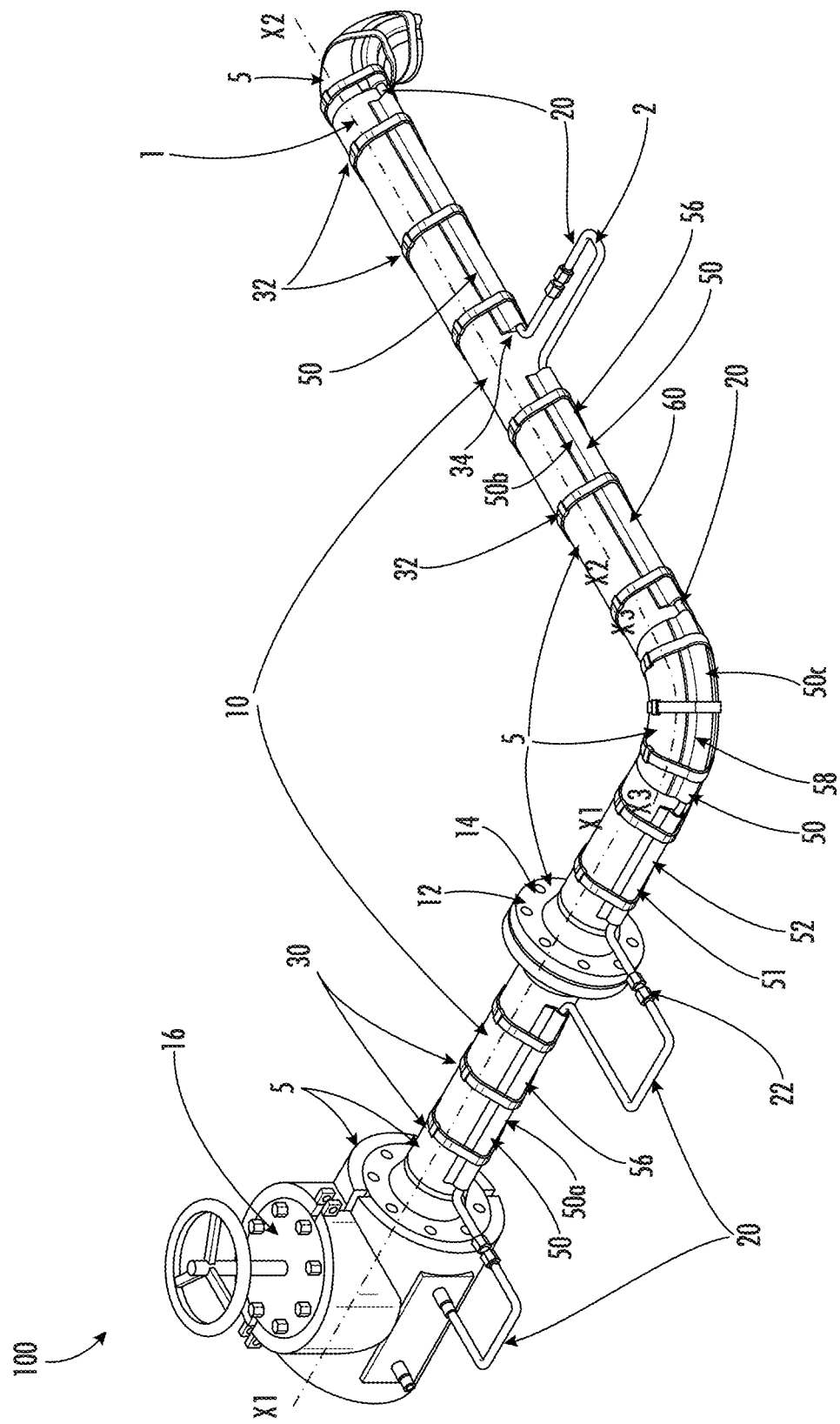
FIG. 1 illustrates a schematic perspective view 100 of heat transfer system 1, in accordance with some embodiments of the disclosure.

FIG. 1 illustrates a schematic perspective view 100 of heat transfer system 1, in accordance with some embodiments of the disclosure. As illustrated by FIG. 1, the heat transfer system 1 comprises one or more process pipes 10. The process pipes 10 are structured for transporting (e.g., carrying, transferring or otherwise conveying) process fluids. The process pipes 10 may comprise a suitable cross-section, such as a circular cross-section, a curvilinear cross-section, a polygonal cross-section, uniform, non-uniform, and/or the like. Typically, it is desirable to maintain a process fluid transported via the process pipes 10 at a predetermined temperature range (e.g., above or below an ambient temperature of an environment in which the pipe is located in order to maintain the fluid in a liquid form, or the like) and/or to prevent undesirable and effects to fluid flow properties and fluid composition. However, due to the very nature and structure of the process pipes 10, the process pipes themselves and the process fluid therein are subject to undesirable variations in temperature (e.g., due to heat loss therein, such as in a heat sink). Moreover, these temperature variations (e.g., rates of heat loss), are not uniform across the process pipes 10. These inevitable temperature variations and non-uniform rates of temperature change are further exacerbated by variations in cross-sectional dimensions of the process pipes 10, bends or curves in the process pipes 10, coupling elements of the process pipes 10 such as process pipe flanges 12, flange couplings 14, pipe support members 114 (illustrated in FIGS. 13 to 14C), control elements 16 (e.g., a valve jacket), and/or other portions and/or components of the process pipes 10.

In order to control (e.g., regulate, adjust, maintain, or the like) the temperature of the fluid transported via the process pipes 10, a tracing system 2 (e.g., tube tracking system) is provided, as illustrated by FIG. 1. In some embodiments, the tracing system 2 comprises a fluid tracer, with a fluid acting as a heating or cooling medium, while in other embodiments, other types of heating or cooling media are utilized, such as electric tracers. The tracing system 2 may comprise one or more tracer tubes 20 that are attached or operatively coupled to corresponding process pipes 10 using heat transfer element couplings 30 (e.g., via a circumferential attachment, such as a band 32, heat transfer cement 34, or the like). Adjacent tracer tubes 20 may be coupled via a tracer tube coupling 22 (e.g., end-to-end). As illustrated by FIG. 1, the tracer tubes 20 of the tracing system 2 are arranged to substantially trace or follow the extent of the corresponding process pipes 10, including bends or curves in the process pipes 10, coupling elements of the process pipes 10 such as process pipe flanges 12, flange couplings 14, pipe support members 114 (illustrated in FIGS. 13 to 14C), control elements 16 (e.g., a valve jacket), and/or other portions/ components of the process pipes 10.

A fluid medium (e.g., a heating medium, a cooling medium, or the like), also referred to as a tracer fluid, such as steam, air, water, oils, and/or other fluids, may flow through the one or more tracer tubes 20. The temperature of the tracer fluid flowing through the tracer tubes 20 may be greater than, equal to, or less than, a temperature of the corresponding process fluid within the process pipes 10.

As illustrated by FIG. 1, the heat transfer system 1 also comprises one or more heat transfer elements 50, with each heat transfer element 50 being operatively coupled to the corresponding tracer tube 20 and/or a process pipe component portion 5. The "process pipe component portion" as used herein may refer to (i) the process pipe 10 itself in its entirety or a portion thereof, (ii) any portion of the process pipe 10 such as bends/curves/elbows in the process pipe 10, and/or (iii) components of or associated with the process pipe 10 such as, but not limited to, coupling elements of the process pipes 10 such as process pipe flanges 12, flange couplings 14, pipe support members 114 (illustrated in FIGS. 13 to 14C), control elements 16 (e.g., a valve jacket), one or more process pipe instruments 18, flow control component 108 such as a reducer 110 and/or other portions/ components of the process pipes 10, as will be described in detail herein. In some embodiments, the heat transfer elements 50 described herein (with respect to FIGS. 1-30) are not only structured to be coupled with the process pipe 10 itself, but also any of the process pipe component portions 5 described above. In other words, it is noted that, the heat transfer element 50 described herein as being structured to be coupled with the process pipe 10 (e.g., as illustrated in some embodiments in FIGS. 1-7, 11, 23-30, or the like), also refers to the heat transfer element 50 being structured to be coupled with any of the other process pipe component portions 5 described above (e.g., as illustrated in some embodiments in FIGS. 13, 14, 17-22, or the like).

Typically, the heat transfer element 50 is configured to transfer or convey heat from the tracer tube 20 to the process pipe 10 (or vice versa) (e.g., via conductive and/or convective heat transfer). In some embodiments, the heat transfer element 50 may be operatively coupled to the corresponding tracer tube 20 and the process pipe 10 via one or more heat transfer element couplings 30 such as bands 32, heat transfer cement 34, clamps 36, and/or the like.

The heat transfer element 50 may be manufactured from a suitable material or a combination of materials such as metals, alloys, composites, plastics, synthetic materials, natural materials and/or the like. In some embodiments, the heat transfer element 50 may be formed from alloys of metals such as iron, aluminum, and/or the like.

Typically, the heat transfer element 50 comprises a heat transfer element body 51, also referred to as a body 51 or a body structure 51. The heat transfer element body 51 comprises a nested portion 60 that forms a cavity structured for receiving and at least partially surrounding a corresponding tracer tube 20. Moreover, the body 51 defines an outer surface 52 and an opposite inner surface. In some embodiments the nested portion 60 has the cavity that extend into the body 51 from the inner surface 54 (e.g., inner surface 54 as illustrated by FIG. 2A). However, as will be described in other embodiments later, the nested portion 60 has the cavity that extends into the body 51 from the outer surface 52. Typically, the heat transfer element 50 and its the heat transfer element body 51 and cavity extend in a longitudinal or substantially longitudinal direction. Typically, as illustrated by FIG. 1, the longitudinal direction of the heat transfer element 50 is substantially the same as, parallel to, or substantially follows that of the longitudinal direction of the corresponding tracer tube 20 and/or process pipe 10. In this regard, the heat transfer elements 50 may have a variety of longitudinal configurations, such as a linear configuration 56 (in the form of a linear heat transfer element 56), a curved configuration 58 (in the form of a curved heat transfer element 58), and/or the like, such that the longitudinal direction of the heat transfer element 50 substantially maps or parallels that of the corresponding tracer tube 20 and/or process pipe 10. In some embodiments, the longitudinal direction of the heat transfer element 50 may be transformed (e.g., from a linear configuration 56 to a curved configuration 58) on site or in-situ during assembly to facilitate assembly.

As illustrated by FIG. 1, the one or more heat transfer elements 50 may comprise a first heat transfer element 50a having a linear configuration 56. Here, the first heat transfer element 50a extends, substantially linearly, along a substantial straight line along the direction X1-X1, thereby tracing the longitudinal direction of a corresponding tracer tube 20 and/or process pipe 10. It is noted that "X" as used herein in the context of longitudinal directions as a convenient notation only and does not imply/suggest a particular axis or plane (e.g., of a coordinate system such as a cartesian, cylindrical, polar, etc.). As such, the direction X1-X1 may occur in a single plane or may intersect multiple planes, with respect to the other longitudinal directions mentioned herein, or with respect to a chosen origin or coordinate system. Similarly, the one or more heat transfer elements 50 may comprise a second heat transfer element 50b also having a linear configuration 56. Here, the second heat transfer element 50b extends, substantially linearly, along a substantial straight line along the direction X2-X2, thereby tracing the longitudinal direction of a corresponding tracer tube 20 and/or process pipe 10. It should be understood that the first heat transfer element 50a and the second heat transfer element 50b, may comprise conventional heat transfer elements, such as straight sections of different profiles, or they may comprise the linear heat transfer elements, that can be bent into the desired configuration, as will be described herein. Moreover, the one or more heat transfer elements 50 may comprise a third heat transfer element 50c having a curved configuration 58. Here, the third heat transfer element 50a extends, along a curved longitudinal direction X3-X3, thereby tracing the pipe/tube bend or elbow in the corresponding tracer tube 20 and/or process pipe 10.

As will be detailed later on, the heat transfer element body 51 further comprises one or more arm portions extending from the body 51. Typically, the arm portions are configured to contact the process pipe 10. In this regard, the arm portions may comprise a curvature that substantially matches the curvature of a corresponding adjacent surface of the process pipe 10. However, it should be understood that the arm portion may not be curved, and instead, include one or more straight sections (e.g., multiple straight sections) that approximate the adjacent surface of the process pipe 10, but which does not completely conform to the surface of the process pipe 10. Typically, the arms the heat transfer element 50 is configured to transfer heat between the tracer tube 20 and the process pipe 10 through the one or more arm portions.

FIG. 2A illustrates a perspective view 200A of a heat transfer element 50 in a linear configuration 56, in accordance with some embodiments of the disclosure. As illustrated by FIG. 2A, the heat transfer element 50 comprises a heat transfer element body 51, also referred to as a body 51 or a body structure 51. As illustrated in section A-A of FIG. 2A, the heat transfer element body 51 comprises a nested portion 60 that forms a cavity 62 structured for receiving and at least partially surrounding a corresponding tracer tube 20. Moreover, the body 51 defines an outer surface 52 and an opposite inner surface 54, with the cavity 62 being provided at the inner surface 54. In this regard, the cavity 62 may be defined by cavity walls 64. The cavity 62 may comprise a suitable cross-section shape such as a "U" shape, a "C" shape, a semi-circular shape, and/or the like. However, the cavity 62 may comprise any cross-section shape, which may or may not conform to a portion of the tracer tube 20. The heat transfer element 50 and its the heat transfer element body 51 and cavity may be formed in its longitudinal or substantially longitudinal direction and can be bent before or after arriving on-site in order to conform to a bend, curvature, or contour of a process pipe component portion 5 such as the process pipe 10.

The heat transfer element body 50 may further comprise one or more arm portions 70 (also referred to as one or more arms 70) extending from the body 51. The one or more arms 70 may comprise a first arm 72 extending from one side of the body 51, and a second arm 74 extending from the other side of the body 51. Typically, the arm portions 70 are configured to contact the corresponding process pipe component portion 5 such as a process pipe 10. In this regard, the arm portions, and specifically, the inner surface 54 of the arms 70, may comprise a contour/curvature that substantially matches the curvature of a corresponding adjacent surface of process pipe component portion 5 such as the process pipe 10. However, as previously described herein, the one or more arm portions 70 may have an inner surface 54 that is made up of one or more straight sections, which in some embodiments may approximate a curved surface. Typically, the heat transfer element 50 is configured to transfer heat between the tracer tube 20 and the process pipe 10 through the one or more arm portions 70. Moreover, some or all of the one or more arms 70 may comprise one or more bevels 82 that allow the heat transfer element 50 to be bend into a curved configuration, as will be described in detail herein.

As further illustrated by FIG. 2A, the heat transfer element body 51 may be formed from a plurality of body portions 80 (80a, 80b, . . . , 80n). Each of the body portions 80 (80a, 80b, . . . , 80n) comprise the nested portion 60 and one or more arms 70. Here, each of the body portions 80 may comprise a first arm 72 extending from one side of the body portion 80 and a second arm 74 extending from the other side of the body portion 80. In some embodiments, the plurality of body portions 80 (80a, 80b, . . . , 80n) may be formed by providing body apertures 156 (e.g., cuts, slits, incisions, gaps, or voids) that extend laterally across a width of the heat transfer element body 51 (completely or partially), or the plurality of body portions 80 (80a, 80b, . . . , 80n) may defined by the body apertures 156 that extend completely or partially across a width of the heat transfer element body 51. The body apertures 156 may extend only partially into the body 51 of the heat transfer element 50 such that a portion of the body 51 may be utilized to allow for bending of the heat transfer element 50. As such, in some embodiments, the plurality of body portions 80 (80a, 80b, . . . , 80n) allow for bending, flexure, twisting, and/or the like of the generally rigid heat transfer element 50, which would have not been possible otherwise.

Moreover, some or all of the one or more arms 70 of the plurality of body portions 80 (80a, 80b, . . . , 80n) may comprise one or more bevels 82. Specifically, FIG. 2A illustrates the second arms 74 having the bevels 82. However, it is understood that the bevels may also be provided on the first arms 72 in other embodiments. Moreover, in some embodiments, the bevels 82 may be provided on the side or sides that may be desirable to form inner curve portions (facing the center) when the heat transfer element 50 is bent.

In some embodiments, the bevels 82 are structured such that adjacent ends of adjacent arms 70 are non-parallel, and define an non-zero bevel angle "$2\theta$" therebetween (e.g., "$2\theta$" may be in the range of about 2-10 degrees, 2-45 degrees, 2-60 degrees, 5-15 degrees, 5-90 degrees, 10-45 degrees, 10-80 degrees, 20-140 degrees, 30-170 degrees, 40-150 degrees, and/or the like). In some embodiments, the bevel 82 may be provided on second arms 74 such that, the one or more bevels 82 are configured to allow bending of the heat transfer element body 51 with the second arms 74 forming an inner portion of the curve (facing a center of the curve) and the first arms 72 forming an outer surface of the curve, without impediments from adjacent arms 74. Here, the bevels 82 allow for engagement, folding, overlap, and/or the like of the adjacent arms 70 when the heat transfer element 50 is bent to render it into a curved configuration 58. In some embodiments, the bevel 82 may be provided on second arms 74 such that, the one or more bevels 82 are configured to allow bending of the heat transfer element body 51 in a beveled plane to a radius that is smaller than the radius in a non-bevel plane.

In this regard, the radius of the heat transfer element body 51 and hence the longitudinal direction X1-X1 in a non-bevel plane (e.g., in the linear configuration 56 illustrated in FIG. 2A) may tend towards infinity. On the other hand, the radius of the heat transfer element body 51 and hence the curved longitudinal direction X3-X3 in a bevel plane (e.g., in the curved configuration 58 illustrated in FIG. 2B) may comprise a finite radius "R" with its center "O" lying towards side of the one or more arms 70 having the bevels 82. In other words, the heat transfer element 50 may be bent from a linear configuration 56 of FIG. 2A into a curved configuration 58 of FIG. 2B, which may be facilitated by the body apertures 156 and the bevels 58. Typically, bending the heat transfer element 50 from the linear configuration 56 of FIG. 2A to the curved configuration 58 of FIG. 2B causes the bevel angles "2θ" to reduce (e.g., by a factor of about 0.7, 0.6, 0.5, 0.4, 0.3, 0.2, and/or the like). The bevel angles "2θ" are structured to allow for obtaining the required curvature. The radius R and the bevel angles "2θ" decrease as the heat transfer element 50 is bent. In other words, the more the heat transfer element 50 is bent, the greater is the decrease in the radius R and/or the bevel angles "2θ".

Figure 2B:
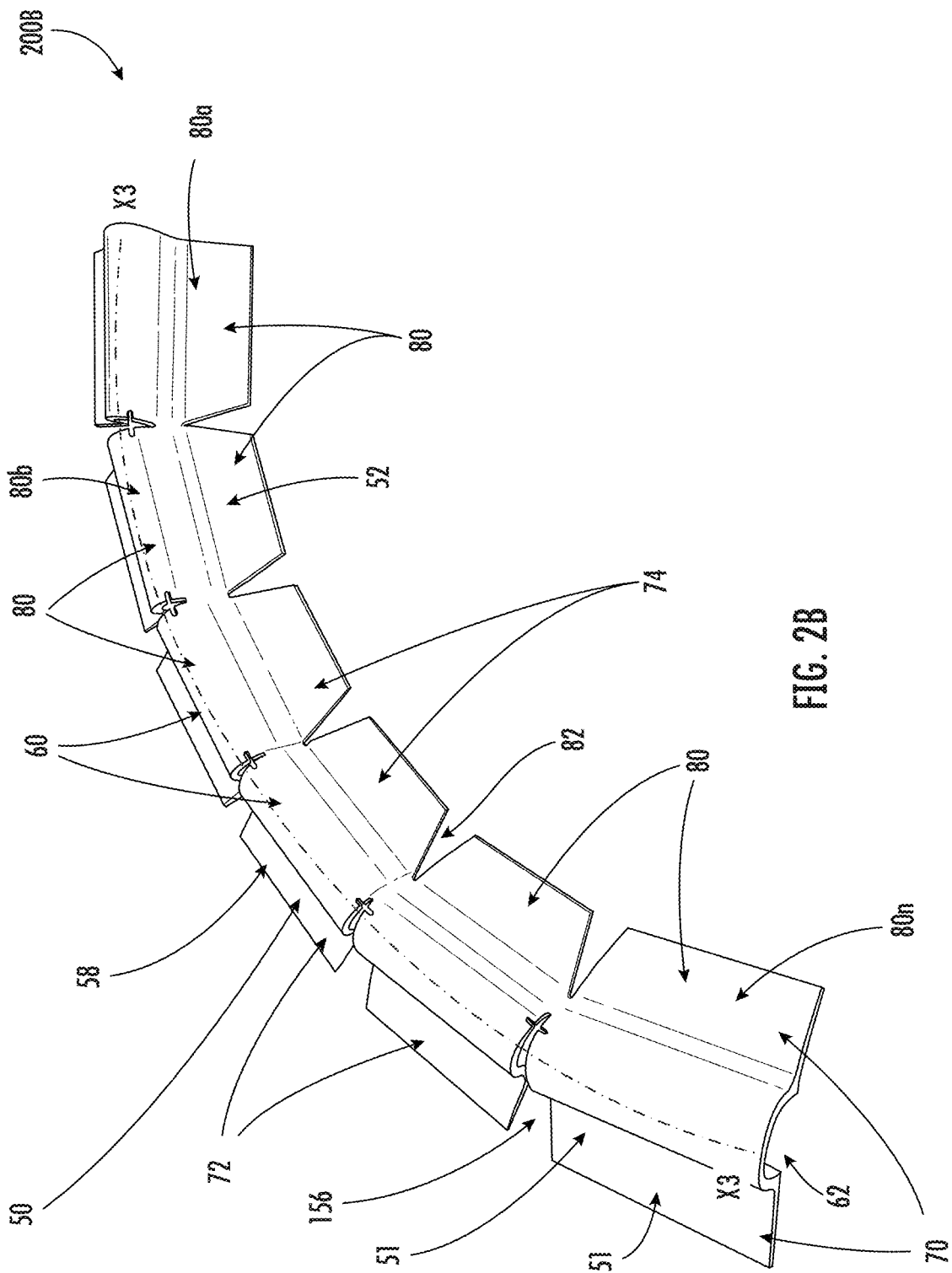
FIG. 2B illustrates a perspective view 200B of a heat transfer element 50 in a curved configuration, in accordance with some embodiments of the disclosure.

FIG. 2B illustrates a perspective view 200B of a heat transfer element 50 in a curved configuration 58, in accordance with some embodiments of the disclosure. The heat transfer element 50 of FIG. 2B is substantially similar to that described with respect to FIG. 2A, except that the heat transfer element 50 comprises a curved configuration 58. Specifically, the heat transfer element 50 comprises a heat transfer element body 51, having a nested portion 60 that forms a cavity 62 structured for receiving and at least partially surrounding a corresponding tracer tube 20. Moreover, the body 51 defines an outer surface 52 and an opposite inner surface 54, with the cavity 62 being provided at the inner surface 54. In this regard, the cavity 62 may be defined by cavity walls 64. The cavity 62 may comprise a suitable cross-section shape such as a "U" shape, a "C" shape, a semi-circular shape, and/or the like. Typically, the heat transfer element 50 and its the heat transfer element body 51 and cavity 62 extend in a longitudinal or substantially curved longitudinal direction X3-X3.

As further illustrated by FIG. 2B, the heat transfer element body 51 comprises a plurality of body portions 80 (80a, 80b, . . . , 80n). Each of the body portions 80 (80a, 80b, . . . , 80n) comprise the one or more arms 70 extending from the body portions 80. Here, each of the body portions 80 may comprise a first arm 72 extending from one side of the body portion 80 and a second arm 74 extending from the other side of the body portion 80. In some embodiments, the plurality of body portions 80 (80a, 80b, . . . , 80n) may be formed by providing body apertures 156 (e.g., cuts, slits, incisions, gaps, voids, or the like) that extend laterally across a width of the heat transfer element body 51 (completely or partially), or the plurality of body portions 80 (80a, 80b, . . . , 80n) may defined by the body apertures 156 that extend laterally completely or partially across a width of the heat transfer element body 51. In some embodiments, the plurality of body portions 80 (80a, 80b, . . . , 80n) allow for bending, flexure, twisting, and/or the like of the generally rigid heat transfer element 50, which would have not been possible otherwise. Moreover, some or all of the one or more arms 70 of the plurality of body portions 80 (80a, 80b, . . . , 80n) may comprise one or more bevels 82. Specifically, FIG. 2B illustrates the second arms 74 having the bevels 82. However, it is understood that the bevels may also be provided on the first arms 72 in other embodiments.

In some embodiments, the bevels 82 are structured such that adjacent ends of adjacent arms 70 are non-parallel and define a non-zero angle "2θ" therebetween. In some embodiments, the bevel 82 may be provided on second arms 74 such that, the one or more bevels are configured to allow bending of the heat transfer element body 51 with the second arms 74 forming an inner portion of the curve (facing a center of the curve) and the first arms 72 forming an outer surface of the curve, without impediments from adjacent arms 74. Here, the bevels 82 allow for engagement, folding, overlap, and/or the like of the adjacent arms 70 when the heat transfer element 50 is bent to render it into a curved configuration 58. In some embodiments, the bevel 82 may be provided on second arms 74 such that, the one or more bevels are configured to allow bending of the heat transfer element body 51 in a beveled plane to a radius that is smaller than the radius in a non-bevel plane. As illustrated in FIG. 2B, the radius R of the heat transfer element body 51 and hence the curved longitudinal direction X3-X3 in a bevel plane, e.g., in the curved configuration 58 illustrated in FIG. 2B, may comprise a finite radius "R" with its center "O" lying towards side of the one or more arms 70 having the bevels 82.

Typically, bending the heat transfer element 50 causes the bevel angles "2θ" to reduce (e.g., by a factor of about 0.7, 0.6, 0.5, 0.4, 0.3, 0.2, and/or the like). The bevel angles "2θ" are structured to allow for obtaining the required curvature. The radius R and the bevel angles "2θ" decrease as the heat transfer element 50 is bent. In other words, the more the heat transfer element 50 is bent, the greater is the decrease in the radius R and/or the bevel angles "2θ". FIG. 2B illustrates the reduced bevel angles "2θ'" due to the curvature of the heat transfer element 50. Here, the reduced bevel angles "2θ'" may be in the range of about 2-10 degrees, 2-45 degrees, 2-60 degrees, 5-15 degrees, 5-90 degrees, 10-45 degrees, and/or the like). In some embodiments, the heat transfer element 50 may be curved to extent that the reduced bevel angles "2θ'" may be about zero.

FIG. 3A illustrates a schematic top view 300A of a heat transfer element 50 having a spine 90, in accordance with some embodiments of the disclosure. FIG. 3B illustrates a cross-sectional view 300B of the heat transfer element 50 of FIG. 3A, in accordance with some embodiments of the disclosure. As illustrated by FIG. 3A, the heat transfer element 50 comprises a heat transfer element body 51, also referred to as a body 51 or a body structure 51, defining an outer surface 52 and an opposite inner surface 54. The heat transfer element body 51 comprises a plurality of body portions 80. Each of the body portions 80 comprise a nested portion 60. Each of the nested portions 60 form a cavity 62 structured for receiving and at least partially surrounding a corresponding tracer tube 20. Moreover, the cavity 62 may be defined by cavity walls 64 of the inner surface 54. The cavity 62 may comprise a suitable cross-section shape such as a "U" shape, a "C" shape, a semi-circular shape, and/or the like. Typically, the heat transfer element 50 and its the heat transfer element body 51 and cavity extend in a longitudinal or substantially longitudinal direction. FIG. 3A illustrates the heat transfer element 50 having a linear configuration 56. However, it is noted that the heat transfer element 50 may be bent into a curved configuration 58.

Moreover, each of the body portions 80 may define a width W1 and comprise one or more arms 70, i.e., a first arm 72 extending from one side of the body portion 80 and a second arm 74 extending from the other side of the body portion 80. In some embodiments, the arms 72 and 74, and specifically, the inner surface 54 of the arms 72 and 74, may comprise a contour/curvature that substantially matches the curvature of a corresponding adjacent surface of the process pipe component portion 5 such as the process pipe 10, to thereby provide surface contact therebetween. Typically, the heat transfer element 50 is configured to transfer heat between the tracer tube 20 and the process pipe 10 through the one or more arm portions 70 (72, 74). In some embodiments, the plurality of body portions 80 are spaced apart from each other by body apertures 156 (e.g., have apertures or gaps therebetween) that extend laterally across a width of the heat transfer element body 51, either completely or partially. In other embodiments, the body apertures 156 may also extend into the spine 90, either completely or partially. As illustrated, adjacent first arms 72 (defining a length "L1") of adjacent body portions 80 may comprise a substantially constant void or gap of length "L2" therebetween. Moreover, adjacent second arms 74 of adjacent body portions 80 may comprise a variable/bevel void or gap of length "L3" at the proximate end and a greater length "L4" at the distal end, as illustrated by FIG. 3A. In some embodiments, the plurality of body portions 80 allow for bending, flexure, twisting, and/or the like of the generally rigid heat transfer element 50, which would have not been possible otherwise.

Moreover, FIG. 3A illustrates the second arms 74 having the bevels 82. However, it is understood that the bevels 82 may also be provided on the first arms 72 in other embodiments. Moreover, in some embodiments, the bevels 82 may be provided on the side or sides that may be desirable to form inner curve portions (facing the center) when the heat transfer element 50 is bent. In some embodiments, the bevels 82 are structured such that adjacent ends of adjacent arms 70 are non-parallel, and define a gap with a dimension "L4" at the free ends of the second arms 74, which is greater than the gap with a dimension "L3" proximate the spine 90. In some embodiments, the bevel 82 may be provided on second arms 74 such that, the one or more bevels are configured to allow bending of the heat transfer element body 51 with the second arms 74 forming an inner portion of the curve (facing a center of the curve) and the first arms 72 forming an outer surface of the curve, without impediments from adjacent arms 74. Here, the bevels 82 allow for engagement, folding, overlap, and/or the like of the adjacent arms 70 when the heat transfer element 50 is bent to render it into a curved configuration 58. In some embodiments, the bevel 82 may be provided on second arms 74 such that, the one or more bevels are configured to allow bending of the heat transfer element body 51 in a beveled plane to a radius that is smaller than the radius in a non-bevel plane. Typically, bending the heat transfer element 50 into a curved configuration 58 causes the bevel gap dimension L4 to reduce progressively.

Moreover, as illustrated by FIGS. 3A-3B, the heat transfer element 50 comprises a spine 90 operatively coupled to the plurality of body portions 80 to form the heat transfer element body 51. The spine 90 is structured to provide strength and stability to the heat transfer element 50, both in the linear configuration and when bent into a curved configuration. The spine 90 is configured to be bent in one or more planes to attain the curved configuration. The spine 90 is operatively coupled to the outer surface 52 of the body portions 80 (e.g., formed along with the body 51 or later attached to body portions 51). Specifically, FIGS. 3A-3B illustrate the spine 90 being offset from a general center of the body portion 80. More particularly, FIGS. 3A-3B illustrate the spine 90 being provided at side of the nested portion 60 that is proximate the second arms 74. Moreover, as illustrated, the spine 90 comprises a generally polygonal or rectangular cross-section, although other cross-sections may also be provided. The spine 90 is illustrated as extending vertically, and as such, in this configuration, the spine 90 may provide for bending about the thickness of the spine 90, while resisting bending about the longer width of the spine 90. As such, the spine 90 illustrated in FIGS. 3A and 3B allow for bending about the side of the heat transfer element 50 horizontally, while restricting bending around the top or bottom of the heat transfer element 50 vertically. It should be understood, that while the spine 90 is illustrated an extending vertically, it may extend horizontally (e.g., to allow for bending around the top or bottom of the heat transfer element 50 vertically. Alternatively, it may extend at any angle (e.g., from 45 degrees from the illustrated orientation, or other like degrees) in order to aid in bending in two planes (e.g., partially horizontally, partially vertically, or the like). Moreover, while the spine 90 is illustrated as being located on a second side of the of the body 51 adjacent the second arm 74, it should be understood, as will be descried herein, that the spine 90 may be located on the first side of the body 51 adjacent the first arm 72, the top of the outer surface 52, the bottom of the inner surface 54, or the like.

Figure 4A:
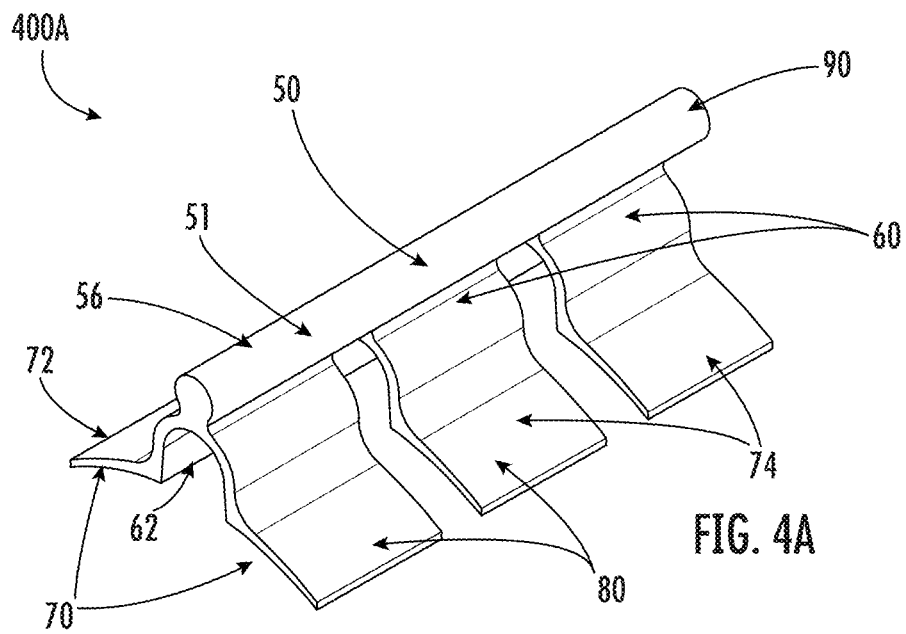
FIG. 4A illustrates a perspective view 400A of a heat transfer element 50, in accordance with some embodiments of the disclosure.
Figure 4B:
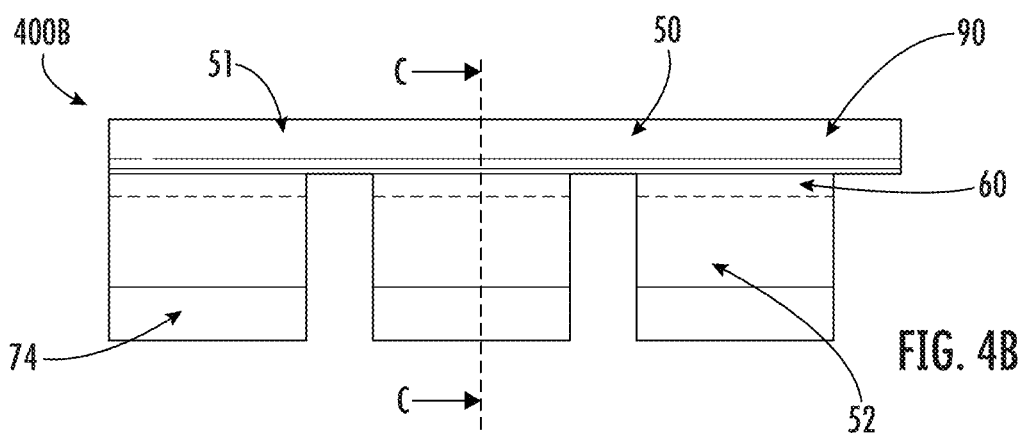
FIG. 4B illustrates a right-side view 400B of the heat transfer element 50 of FIG. 4A, in accordance with some embodiments of the disclosure.
Figure 4C:
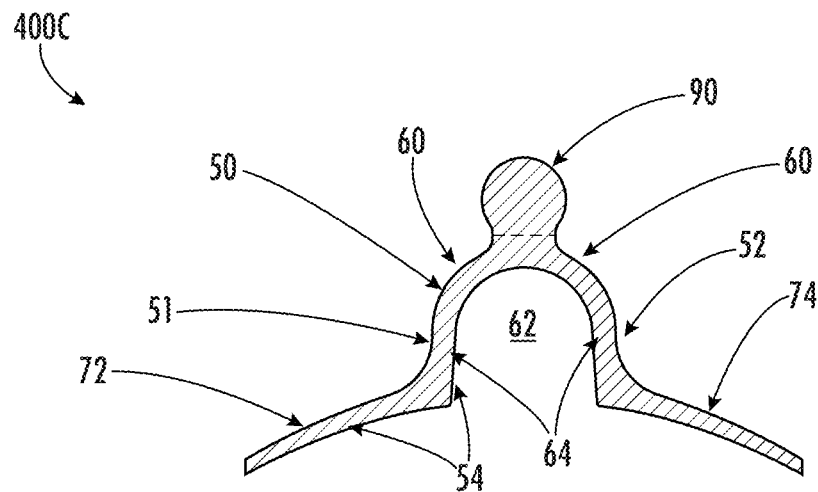
FIG. 4C illustrates a cross-sectional view 400C of the heat transfer element 50 of FIG. 4B, in accordance with some embodiments of the disclosure.

FIG. 4A illustrates a perspective view 400A of a heat transfer element 50 having a spine 90, in accordance with some embodiments of the disclosure. FIG. 4B illustrates a right-side view 400B of the heat transfer element 50 of FIG. 4A, in accordance with some embodiments of the disclosure. FIG. 4C illustrates a cross-sectional view 400C of the heat transfer element 50 of FIG. 4B, in accordance with some embodiments of the disclosure.

As illustrated by FIG. 4A, the heat transfer element 50 comprises a heat transfer element body 51, also referred to as a body 51 or a body structure 51, defining an outer surface 52 and an opposite inner surface 54. The heat transfer element body 51 comprises a plurality of discrete body portions 80 (e.g., body portions 80 that are separate from each other and operatively coupled by the spine, or the like). Each of the discrete body portions 80 comprise a nested portion 60. Each of the nested portions 60 form a cavity 62 structured for receiving and at least partially surrounding a corresponding tracer tube 20. Moreover, the cavity 62 may be defined by cavity walls 64 of the inner surface 54. The cavity 62 may comprise a suitable cross-section shape such as a "U" shape, a "C" shape, a semi-circular shape, and/or the like. Typically, the heat transfer element 50 and its the heat transfer element body 51 and cavity 60 extend in a longitudinal or substantially longitudinal direction. FIGS. 4A-4B illustrate the heat transfer element 50 having a linear configuration 56. However, it is noted that the heat transfer element 50 may be bent into a curved configuration 58.

Moreover, each of the body portions 80 comprise one or more arms 70, such as, a first arm 72 extending from one side of the body 51 (e.g., from a first side of each of the discrete body portions 80) and a second arm 74 extending from the other side of the body 51 (e.g., from a second side of each of the discrete body portions 80). In some embodiments, the arms 72 and 74, and specifically, the inner surface 54 of the arms 72 and 74, may comprise a contour/curvature that substantially matches the curvature of a corresponding adjacent surface of the process pipe component portions 5 such as the process pipe 10, to thereby provide surface contact therebetween. Typically, the heat transfer element 50 is configured to transfer heat between the tracer tube 20 and the process pipe 10 through the one or more arm portions 70 (72, 74). In some embodiments, the plurality of discrete body portions 80 are separate and spaced apart from each other, have gaps therebetween that extend laterally across the entire width of the heat transfer element 50. In some embodiments, the gaps may extend into a portion of the spine 90

As illustrated by FIGS. 4A-4C, the heat transfer element 50 comprises a spine 90 that operatively couples the plurality of discrete body portions 80 together to form the heat transfer element 50. The spine 90 is structured to connect the discrete body portions 80 and provide strength and stability to the heat transfer element 50, both in the linear configuration and when bent into a curved configuration. The spine 90 illustrated in FIGS. 4A-4C is configured to be bent in one or more planes to attain the curved configuration in one or more planes. As illustrated in FIGS. 4A-4C, the spine 90 may be operatively coupled to the outer surface 52 of the body 51 of each of the discrete body portions 80. Specifically, FIGS. 4A-4C illustrate the spine 90 being located at a center of the body 51 of the discrete body portions 80 (e.g., above the nested portion 60 of the body 51). Moreover, as illustrated, the spine 90 comprises a generally curvilinear (e.g., circular, oval, or the like) cross-section, although other cross-sections may also be provided.

In some embodiments, the plurality of discrete body portions 80, the spine 90, and/or the gaps therebetween allow for bending, flexure, twisting, and/or the like of the generally rigid heat transfer element 50 in various configurations to allow for placement over a tracer tube 20, or the like, in a number of straight, curved, uniform, non-uniform, tracer tube 20 routing, which would have not been possible otherwise.

Figure 5:
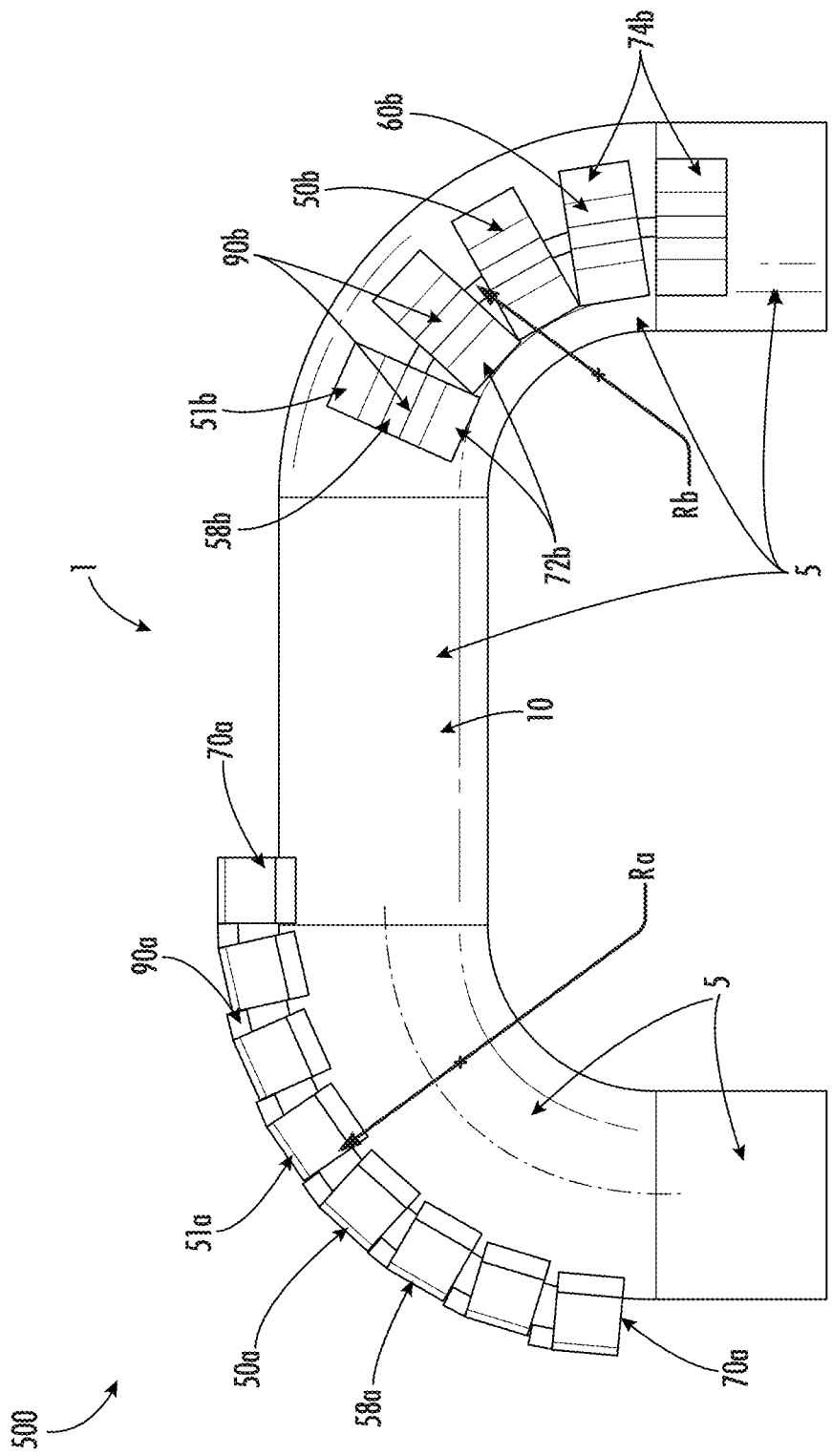
FIG. 5 illustrates a schematic top view 500 of a heat transfer system 1 depicting an assembly of the heat transfer element 50 of FIG. 4A and a process pipe 10, in accordance with some embodiments of the disclosure.

FIG. 5 illustrates a schematic top view 500 of a heat transfer system 1 depicting an assembly of the heat transfer element 50 of FIG. 4A and a process pipe 10, in accordance with some embodiments of the disclosure. Specifically, FIG. 5 illustrates a first heat transfer element 50a similar to the heat transfer element 50 of FIGS. 4A-4C in a curved configuration 58a having a radius Ra. Here, FIG. 5 illustrates the first heat transfer element 50a being assembled to an outer portion of a first bend in the process pipe 10 (e.g., a process pipe component portion 5). Furthermore, FIG. 5 illustrates a second heat transfer element 50b similar to the heat transfer element 50 of FIGS. 4A-4C in a curved configuration 58b having a radius Rb. Specifically, FIG. 5 illustrates the second heat transfer element 50b being assembled to a side portion of a second bend in the process pipe 10 (e.g., a process pipe component portion 5). Here, typically, the radius Ra is greater than radius Rb. Moreover, the heat transfer element 50 can be assembled to an inner portion of a bend in the process pipe 10 (not illustrated in FIG. 5). In this manner, the heat transfer element 50 can to formed into a curved configuration 58 having a variety of radii, such as Ra and Rb.

Figure 6A:
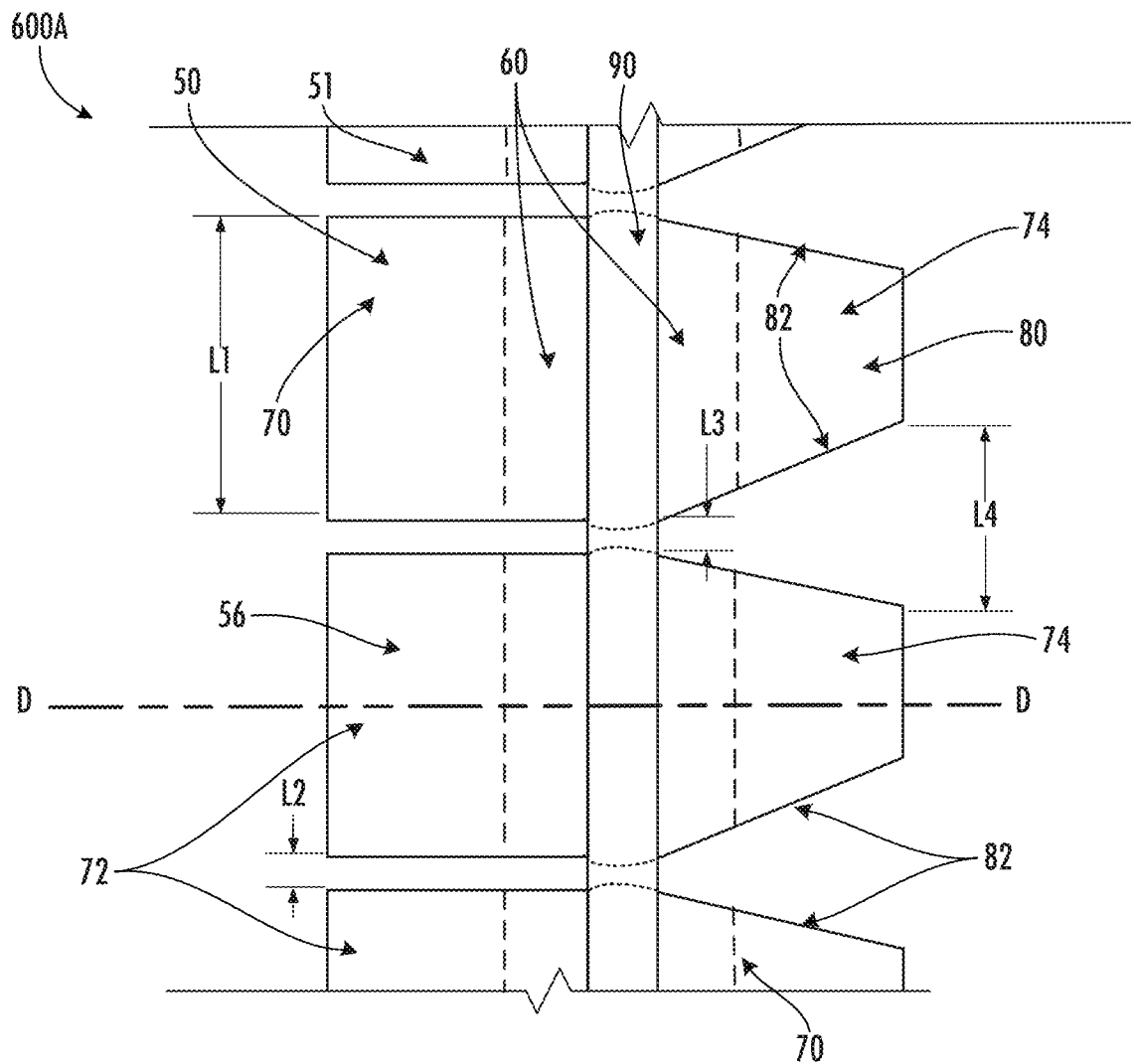
FIG. 6A illustrates a schematic top view 600A of a heat transfer element 50, in accordance with some embodiments of the disclosure.
Figure 6B:
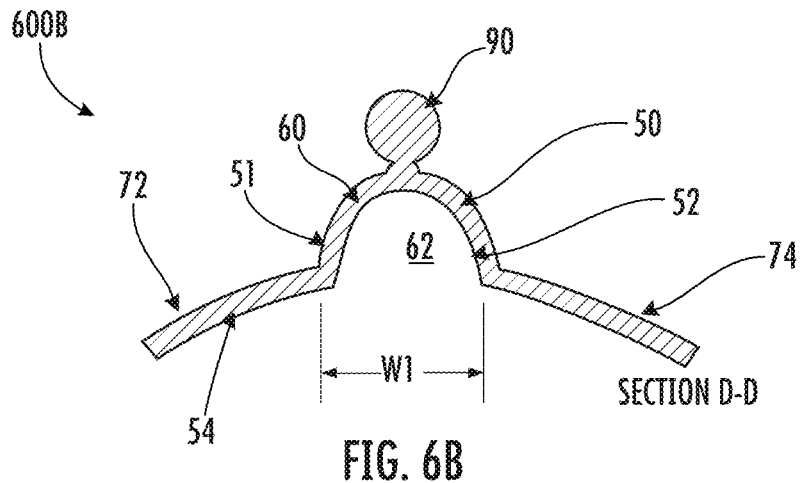
FIG. 6B illustrates a cross-sectional view 600B of the heat transfer element 50 of FIG. 6A, in accordance with some embodiments of the disclosure.

FIG. 6A illustrates a schematic top view 600A of a heat transfer element 50 having a spine 90, in accordance with some embodiments of the disclosure. FIG. 6B illustrates a cross-sectional view 600B of the heat transfer element 50 of FIG. 6A, in accordance with some embodiments of the disclosure.

As illustrated by FIG. 6A, the heat transfer element 50 comprises a heat transfer element body 51, defining an outer surface 52 and an opposite inner surface 54. The heat transfer element 50 comprises a plurality of discrete body portions 80. Each of the discrete body portions 80 comprise a nested portion 60. Each of the nested portions 60 form a cavity 62 structured for receiving and at least partially surrounding a corresponding tracer tube 20. Moreover, the cavity 62 may be defined by cavity walls 64 of the inner surface 54. The cavity 62 may comprise a suitable cross-section shape such as a "U" shape, a "C" shape, a semi-circular shape, and/or the like. Typically, the heat transfer element 50 and its the heat transfer element body 51 and cavity extend in a longitudinal or substantially longitudinal direction. FIG. 6A illustrates the heat transfer element 50 having a linear configuration 56. However, it is noted that the heat transfer element 50 may be bent into a curved configuration 58.

Moreover, each of the discrete body portions 80 may define a width W1 and be operatively coupled to one or more arms 70, i.e., a first arm 72 extending from one side of the body 51 (e.g., of each of the discrete body portions 80) and a second arm 74 extending from the other side of the body 51 (e.g., of each of the discrete body portions 80). In some embodiments, the arms 72 and 74, and specifically, the inner surface 54 of the arms 72 and 74, may comprise a contour/curvature that substantially matches the curvature of a corresponding adjacent surface of the process pipe component portion 5 such as a process pipe 10, to thereby provide surface contact therebetween. Typically, the heat transfer element 50 is configured to transfer heat between the tracer tube 20 and the process pipe 10 through the one or more arm portions 70 (72, 74). In some embodiments, the plurality of discrete body portions 80 are spaced apart from each other, such that, they have gaps therebetween that extend laterally across a width of the heat transfer element body 51, either completely or partially. In other embodiments, the gaps may also extend partially into the spine 90. As illustrated, adjacent first arms 72 (defining a length "L1") of adjacent discrete body portions 80 may comprise a substantially constant void or gap of length "L2" therebetween. Moreover, adjacent second arms 74 of adjacent discrete body portions 80 may comprise a variable/bevel 82 void or gap of length "L3" at the proximate end and a greater length "L4" at the distal end, as illustrated by FIG. 6A.

Moreover, FIG. 6A illustrates the second arms 74 having the bevels 82. However, it is understood that the bevels 82 may also be provided on the first arms 72 in other embodiments. Moreover, in some embodiments, the bevels 82 may be provided on the side or sides that may be desirable to form inner curve portions (facing the center) when the heat transfer element 50 is bent. In some embodiments, the bevels 82 are structured such that adjacent ends of adjacent arms 70 are non-parallel, and define a gap with a dimension "L4" at the free ends of the second arms 74, which is greater than the gap with a dimension "L3" proximate the spine 90. In some embodiments, the bevel 82 may be provided on second arms 74 such that, the one or more bevels are configured to allow bending of the heat transfer element body 51 with the second arms 74 forming an inner portion of the curve (facing a center of the curve) and the first arms 72 forming an outer surface of the curve, without impediments from adjacent arms 74. Here, the bevels 82 allow for folding, overlap, and/or the like of the adjacent arms 70 when the heat transfer element 50 is bent to render it into a curved configuration 58. In some embodiments, the bevel 82 may be provided on second arms 74 such that, the one or more bevels 82 are configured to allow bending of the heat transfer element body 51 in a beveled plane to a radius that is smaller than the radius in a non-bevel plane. Typically, bending the heat transfer element 50 into a curved configuration causes the bevel gap dimension L4 to reduce progressively.

Moreover, as illustrated by FIGS. 6A-6B, the heat transfer element 50 comprises a spine 90 operatively coupling the discrete body portions 80 together (e.g., to the outer surface 52 of each of the discrete body portions 80, or the like) to form the heat transfer element 50, via a neck portion of the spine 90. The spine 90 is structured to connect the discrete body portions 80 and provide strength and stability to the heat transfer element 50, both in the linear configuration and when bent into a curved configuration. Typically, the spine 90 is configured to be bent in one or more planes to attain the curved configuration. The spine 90 is operatively coupled to the outer surface 52 of the body 51, opposite the nested portion 60 having the cavity 62. Specifically, FIGS. 6A-6B illustrate the spine 90 being provided a general center of the nested portion 60. Moreover, as illustrated, the spine 90 comprises a generally curvilinear (e.g., circular, oval, or the like) with a neck cross-section, although other cross-sections may also be provided.

In some embodiments, the plurality of discrete body portions 80, the spines 90, the gaps, and/or the bevels 82 allow for bending, flexure, twisting, and/or the like of the generally rigid heat transfer element 50, which would have not been possible otherwise.

It should be understood that the plurality of body portions 80 may be formed from body apertures 156 that are formed within (e.g., cut into, or the like) a solid heat transfer element (e.g., that still allows the solid heat transfer element to be coupled together) or from discrete body portions 80 that are separate from each other and are operatively coupled together. However, while the spine 90 may be needed in order to operatively couple the discrete body portions 80 together to form the heat transfer element 50, the spline 90 may or may not be utilized with the heat transfer element 50 that utilizes the body apertures 156. That is, the heat transfer element 50 that utilizes the body apertures 156 may be bent around the portion of the heat transfer element 50 that hasn't been cut. Alternatively, in order to facilitate bending in one or more orientations, while hindering bending in one or more other orientations, the spine 90 may be used along with the body apertures 156 in order to facilitate bending in a particular orientation.

Figure 7:
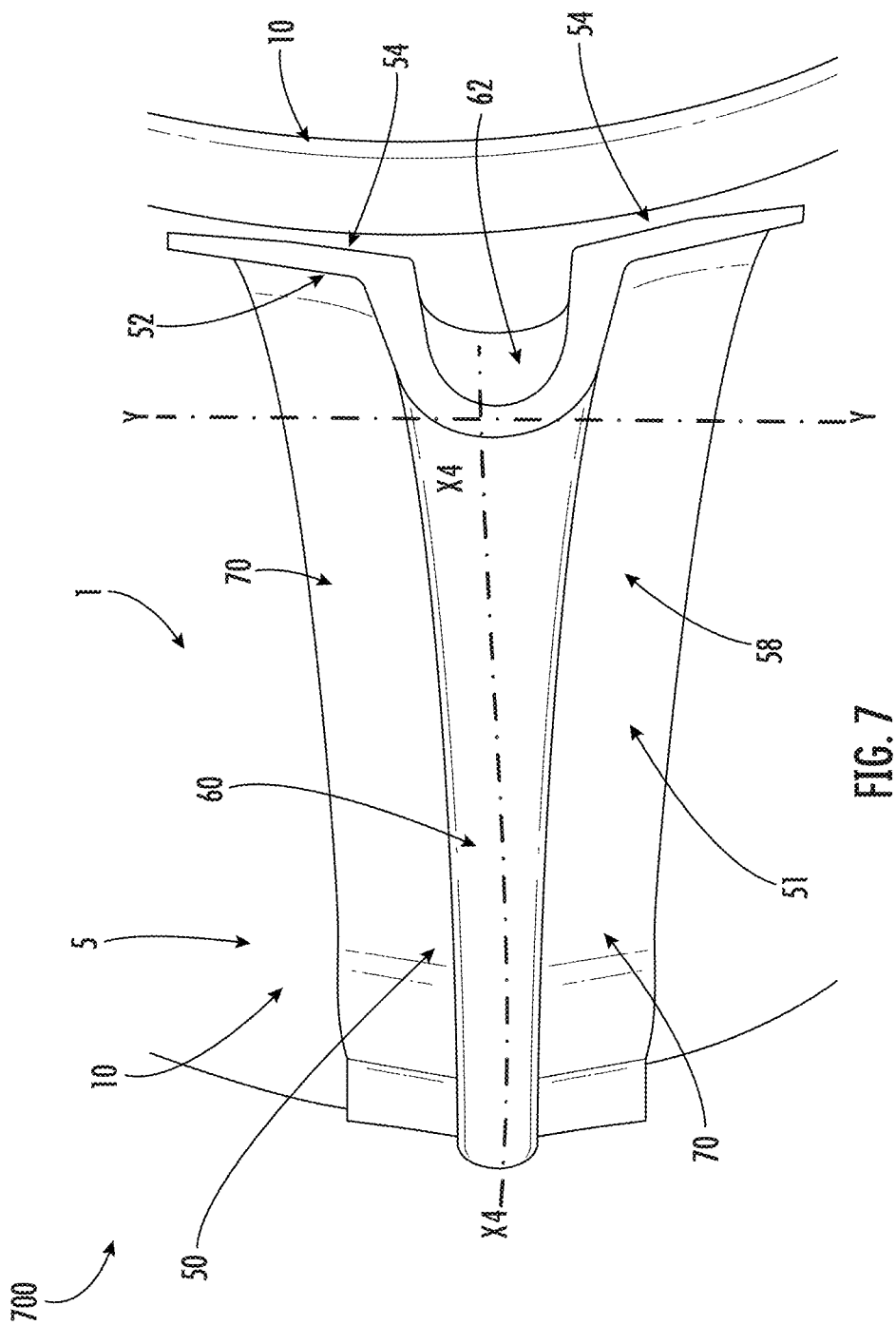
FIG. 7 illustrates a schematic perspective view 700 of a heat transfer system 1 depicting an assembly of the heat transfer element 50 and a process pipe 10, in accordance with some embodiments of the disclosure.

FIG. 7 illustrates a schematic perspective view 700 of a heat transfer system 1 depicting an assembly of the heat transfer element 50 and a process pipe 10, in accordance with some embodiments of the disclosure. Specifically, FIG. 7 illustrates a rolled heat transfer element 50 in a curved configuration 58. As illustrated, the heat transfer element 50 comprises a heat transfer element body 51. The heat transfer element body 51 comprises a nested portion 60 that forms a cavity 62 structured for receiving and at least partially surrounding a corresponding tracer tube 20 (not illustrated). Moreover, the body 51 defines an outer surface 52 and an opposite inner surface 54, with the nested portion 60 having a cavity 62 being provided at the inner surface 54. The cavity 62 may comprise a suitable cross-section shape such as a "U" shape, a "C" shape, a semi-circular shape, and/or the like. Typically, the heat transfer element 50 and its the heat transfer element body 51 and cavity extend in a curved longitudinal direction X4-X4 which matches the curvature of the process pipe 10 (e.g., a process pipe component portion 5). The heat transfer element 50 further comprises one or more arm portions 70 (also referred to as one or more arms 70) extending from either side of the body 51. Typically, the arm portions 70 are configured to contact the process pipe 10. As illustrated by FIG. 7, the heat transfer element 50 is assembled to the process pipe 10. The rolled heat transfer element 50 may be extruded and then rolled using a pair of rollers 120 as will be described in further detail herein.

Figure 8A:
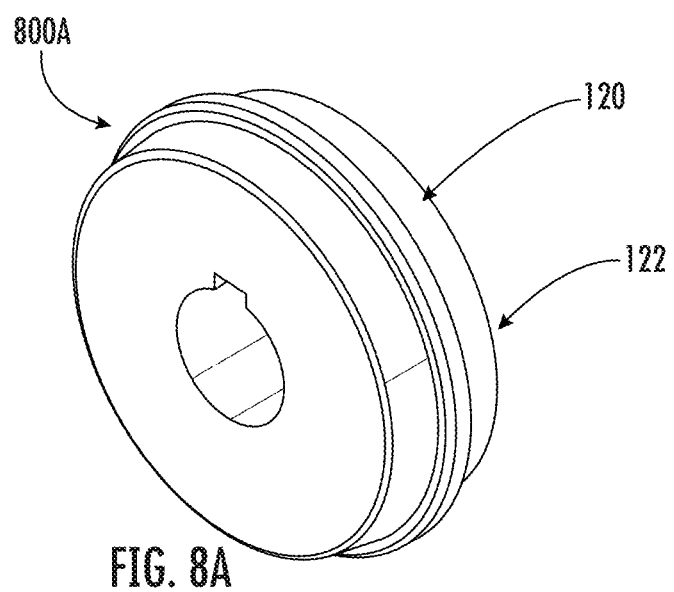
FIG. 8A illustrates a perspective view 800A of a first roller 122 of a roller pair 120, in accordance with some embodiments of the disclosure.
Figure 8B:
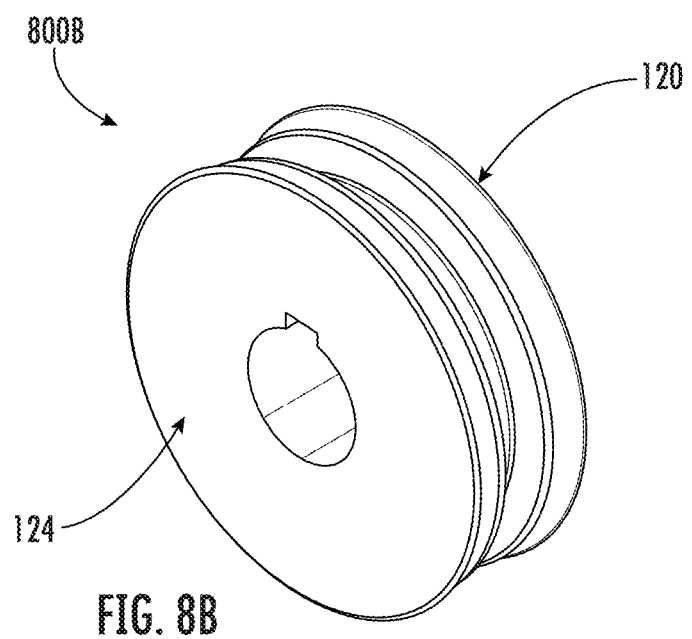
FIG. 8B illustrates a perspective view 800B of a second roller 124 of the roller pair 120 of FIG. 8A, in accordance with some embodiments of the disclosure.

FIG. 8A illustrates a perspective view 800A of a first roller 122 of a roller pair 120, in accordance with some embodiments of the disclosure. FIG. 8B illustrates a perspective view 800B of a second roller 124 of the roller pair 120 of FIG. 8A, in accordance with some embodiments of the disclosure. The first roller 122 may comprise a circumferential roller profile/contour cross-section structured for forming (e.g., rolling) an inner surface 54 of the heat transfer element 50 (illustrated in detail with respect to FIGS. 9A-9C), while the second roller 124 may comprise a circumferential roller profile/contour cross-section for forming (e.g., rolling) an outer surface 52 of the heat transfer element 50 (illustrated in detail with respect to FIGS. 10A-10C). The roller pair 120 may be employed to manufacture a heat transfer element 50 (e.g., in its entirety or its portions such as, its heat transfer element body 51 and/or one or more arms 70), using the manufacturing arrangements illustrated in FIGS. 8C and/or 8D. For the manufacturing, the first roller 122 and the second roller 124 may be positioned next to each other such that their complementary roller profile/contour cross-sections are positioned adjacent to each other. The roller pair 120 is connected to shafts that may rotate the rollers at a predetermined speed. Next, a material sheet or material workpiece "M" (e.g., a metal alloy) for forming the heat transfer element 50, or a pre-formed straight heat transfer element 50, is passed in between the rotating roller pair 120, thereby forming the material into the curved heat transfer element 50. This rolling method may be employed for manufacture any embodiment of the heat transfer element 50 described herein.

Figure 8C:
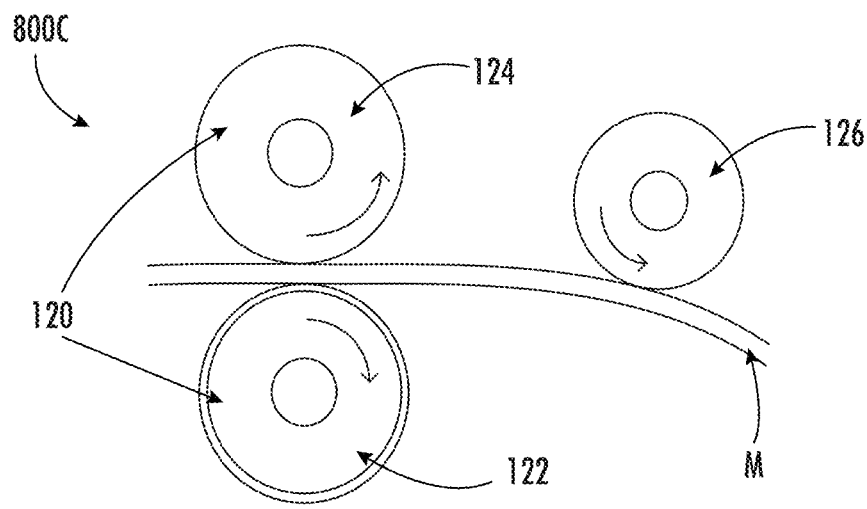
FIG. 8C illustrates a schematic view 800C of the assembly of the roller pair 120 of FIGS. 8A and 8B for manufacture of a heat transfer element 50, in accordance with some embodiments of the disclosure.

FIG. 8C illustrates a schematic view 800C of the assembly of the roller pair 120 of FIGS. 8A and 8B for manufacture of a heat transfer element 50, in accordance with some embodiments of the disclosure. Specifically, FIG. 8C illustrates an asymmetrical arrangement with the first roller 122 and the second roller 124 positioned next to each other such that their complementary roller profile/contour cross-sections are positioned adjacent to each other, and another third roller 126 (e.g., a tail roller) positioned downstream thereof. Here, a material sheet or material workpiece "M" (e.g., a metal alloy) for forming the heat transfer element 50, or a pre-formed straight heat transfer element 50, is first passed in between first roller 122 and the second roller 124, which pinch the heat transfer element material M (e.g., creating the bend point, contour of the heat transfer element, and/or the like). Next, the heat transfer element material M that has been shaped/contoured/pinched may then be modified to the desired radius/dimension by the third roller 126.

Figure 8D:
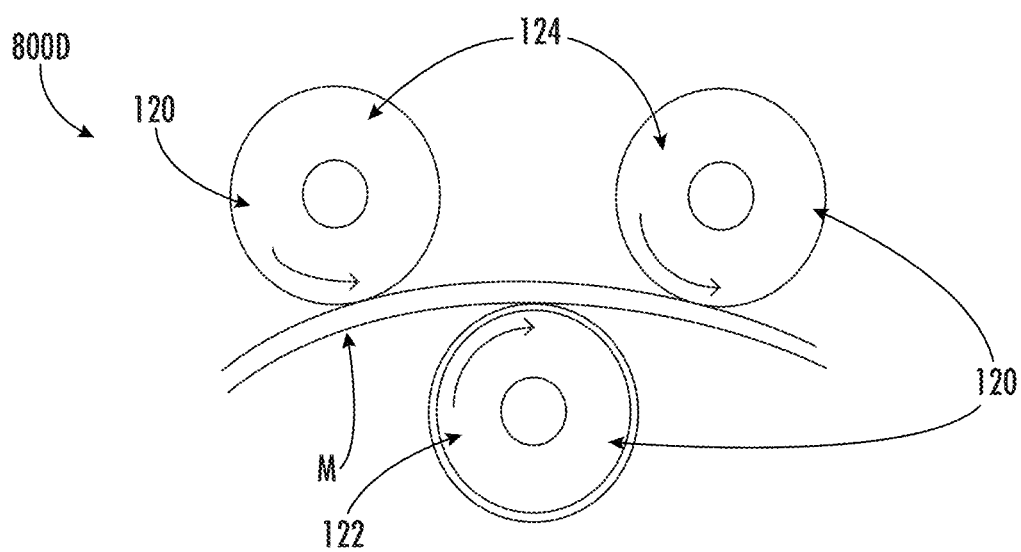
FIG. 8D illustrates a schematic view 800D of the assembly of the roller pair 120 of FIGS. 8A and 8B for manufacture of a heat transfer element 50, in accordance with some embodiments of the disclosure.

FIG. 8D illustrates a schematic view 800D of the assembly of the roller pair 120 of FIGS. 8A and 8B for manufacture of a heat transfer element 50, in accordance with some embodiments of the disclosure. Specifically, FIG. 8D illustrates a symmetrical arrangement with the first roller 122 and two second rollers 124. Here, a material sheet or material workpiece "M" (e.g., a metal alloy) for forming the heat transfer element 50, or a pre-formed straight heat transfer element 50, is passed through the roller arrangement, with the three rollers providing three points of force to, together or in combination, form the heat transfer element 50. In this instance, in some embodiments, there is no pitch point.

That said, it is contemplated that, in other embodiments, the manufacture of the heat transfer element 50 may involve rolling/bending the heat transfer element material M in a "hard-to-bend" plane (e.g., using a custom-shaped die, a wiper shoe, a mandrel, and/or the like). The "hard-to-bend" plane, would be laterally (e.g., in the Y-Y plane shown FIG. 7), instead of in the X4-X4 plane that the heat transfer element is illustrated as being bent in FIG. 7.

FIG. 9A illustrates a front view 900A of the first roller 122 of FIG. 8A, in accordance with some embodiments of the disclosure. FIG. 9B illustrates a side view 900B of the first roller 122 of FIG. 9A, in accordance with some embodiments of the disclosure. FIG. 9C illustrates a detail view 900C of the first roller 122 of FIG. 9B, in accordance with some embodiments of the disclosure. The first roller 122 comprises a circumferential roller profile/contour cross-section 122a structured for forming (e.g., rolling) an inner surface 54 of the heat transfer element 50. Specifically, the first roller profile cross-section 122a may be structured to form and/or support the body 51 having the nested portion 60 with the cavity 62, and inner surfaces 54 of the nested portion 60 and the one or more arms 70 as the heat transfer element 50 is being curved into a curved heat transfer element 50.

FIG. 10A illustrates a front view 1000A of the second roller 124 of FIG. 8B, in accordance with some embodiments of the disclosure. FIG. 10B illustrates a side view 1000B of the second roller 124 of FIG. 10A, in accordance with some embodiments of the disclosure. FIG. 10C illustrates a detail view 1000C of the second roller 124 of FIG. 10B, in accordance with some embodiments of the disclosure. The second roller 124 may comprises a circumferential roller profile/contour cross-section 124a for forming (e.g., rolling) an outer surface 52 of the heat transfer element 50. Specifically, the second roller profile cross-section 124a may be structured to form and/or support the outer surface 52 of body 51 and the one or more arms 70

Figure 11:
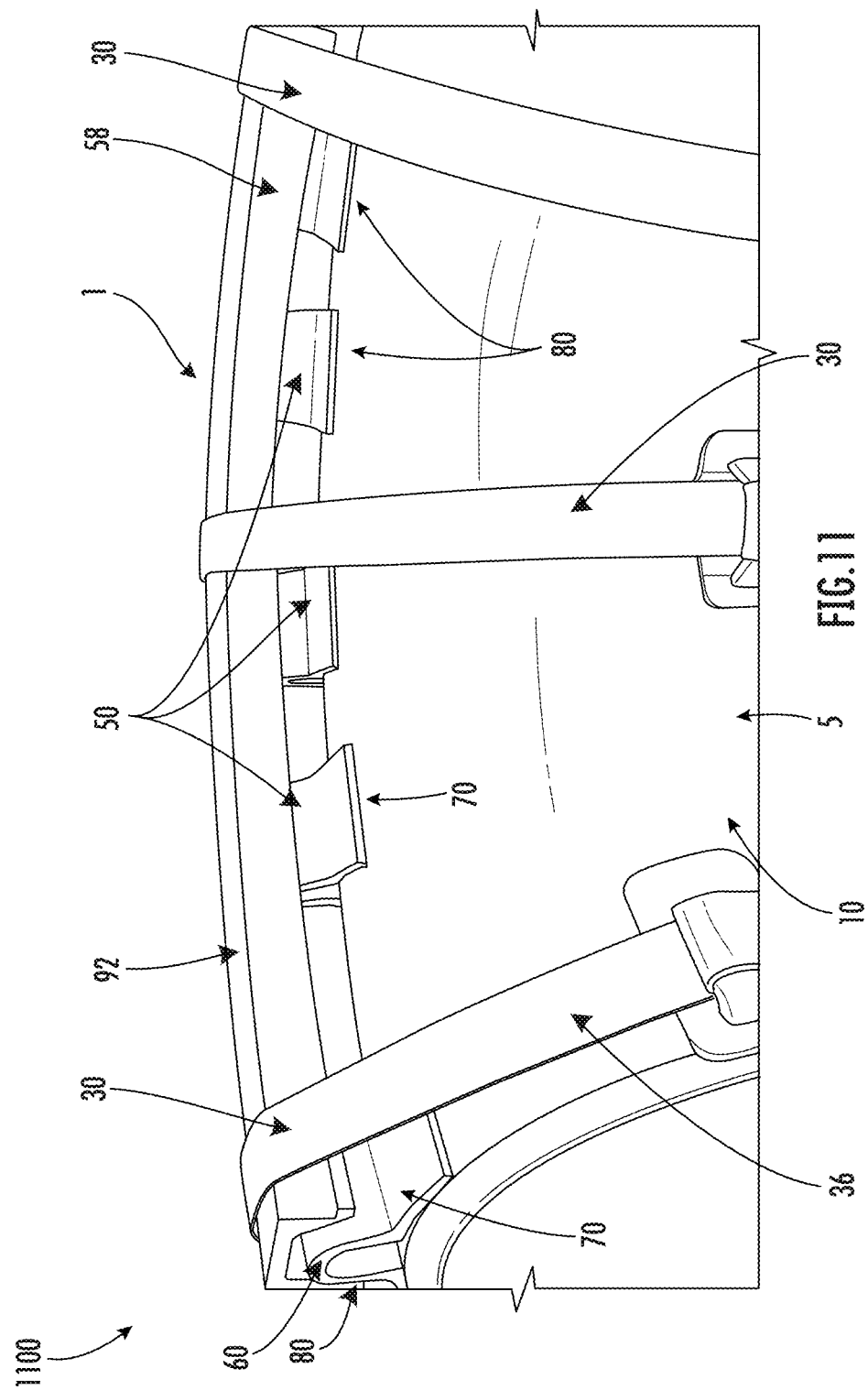
FIG. 11 illustrates a perspective view 1100 of a heat transfer system 1 depicting an assembly of a heat transfer element 50 and a process pipe 10, in accordance with some embodiments of the disclosure.

FIG. 11 illustrates a perspective view 1100 of a heat transfer system 1 depicting an assembly of a heat transfer element 50 and a process pipe 10 (e.g., a process pipe component portion 5), in accordance with some embodiments of the disclosure. As illustrated, the heat transfer element 50 comprises a plurality of discrete body portions 80, each having a body 51 with a nested portion 60 for defining the cavity 62 and one or more arms 70. Here, the plurality of discrete body portions 80 are all completely separable and separate from each other. A spine in the form of a spine coupling 92 of the heat transfer element 50 is structured to releasable couple the discrete body portions 80 (e.g., allow for assembly and/or disassembly of the discrete body portions 80). The spine coupling 92 is an elongate body, comprising a channel for receiving a body coupling (e.g., a tab, ball, lip, neck, or the like) of the discrete body portions 80. The discrete body portions 80 may be slid into, or press-fit, or snap-fit into the channel of the spine coupling 92.

The assembly process for the heat transfer system 1 of FIG. 11 will now be described. In some embodiments, the body coupling of the discrete body portions 80 may be first assembled with the spine coupling 92, e.g., may be slid into, or press-fit, or snap-fit into the channel of the spine coupling 92. This assembly may then be positioned on a desired portion of the process pipe 10 (e.g., a process pipe component portion 5), the discrete body portions 80 may be rearranged suitably, and the assembly may be operatively coupled to the process pipe 10 using heat transfer element couplings 30 such as clamps 36 (or other heat transfer element couplings 30 such as heat transfer cement 34 or bands 32). In alternative embodiments, the discrete body portions 80 may be first be positioned suitable on the process pipe 10. Next, the spine coupling 92 may be assembled onto the discrete body portions 80. This assembly may then be operatively coupled to the process pipe component portions 5, e.g., the process pipe 10 using heat transfer element couplings 30, such as bands 32, clamps 36 (or other heat transfer element couplings 30 such as heat transfer cement 34, or the like).

Figure 12:
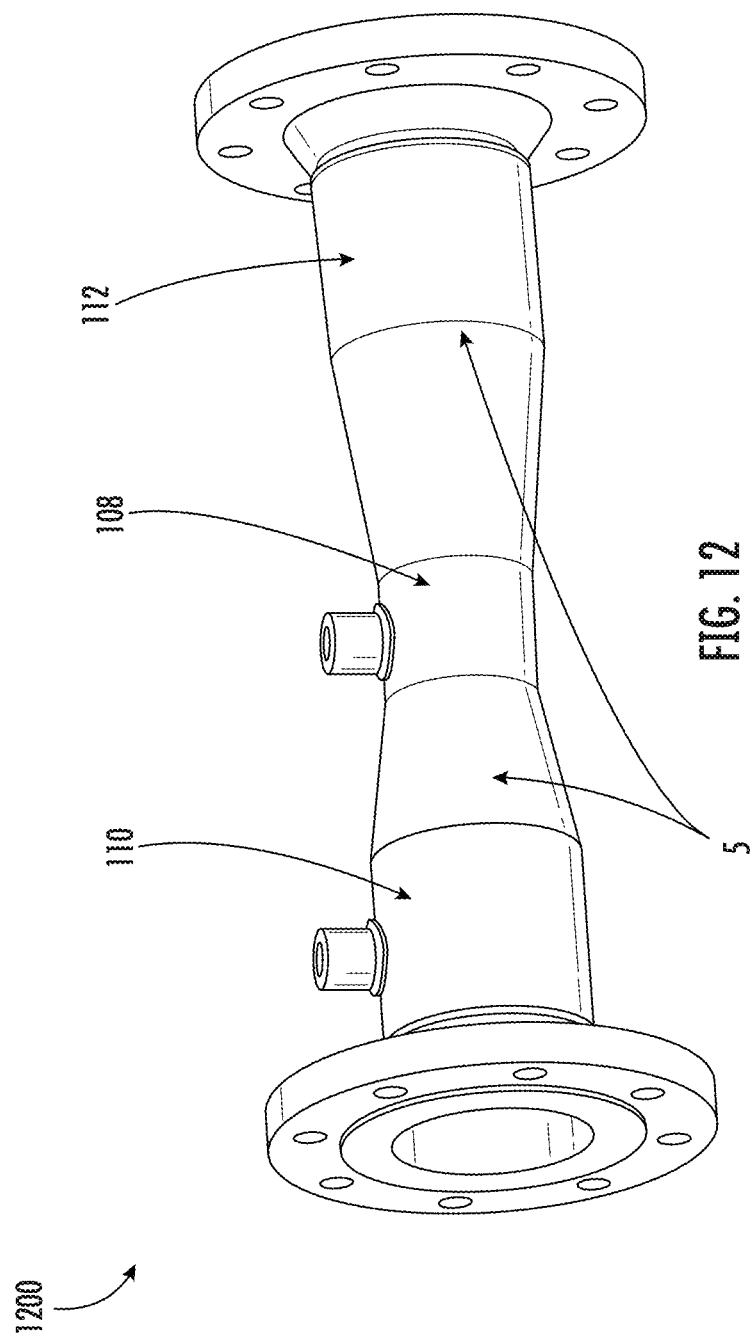
FIG. 12 illustrates a perspective view 1200 of a flow control component 108, in accordance with some embodiments of the disclosure.

FIG. 12 illustrates a perspective view 1200 of a process pipe component portion 5 in the form of a flow control component 108, in accordance with some embodiments of the disclosure. The flow control component 108 comprises a reducer 110 and an expander 112. Any of the heat transfer elements 50 described herein may be employed for assembly with the flow control component 108, in a manner similar to the assemblies with the process pipes 10 described with respect to FIGS. 5, 7 and 11.

Figure 13:
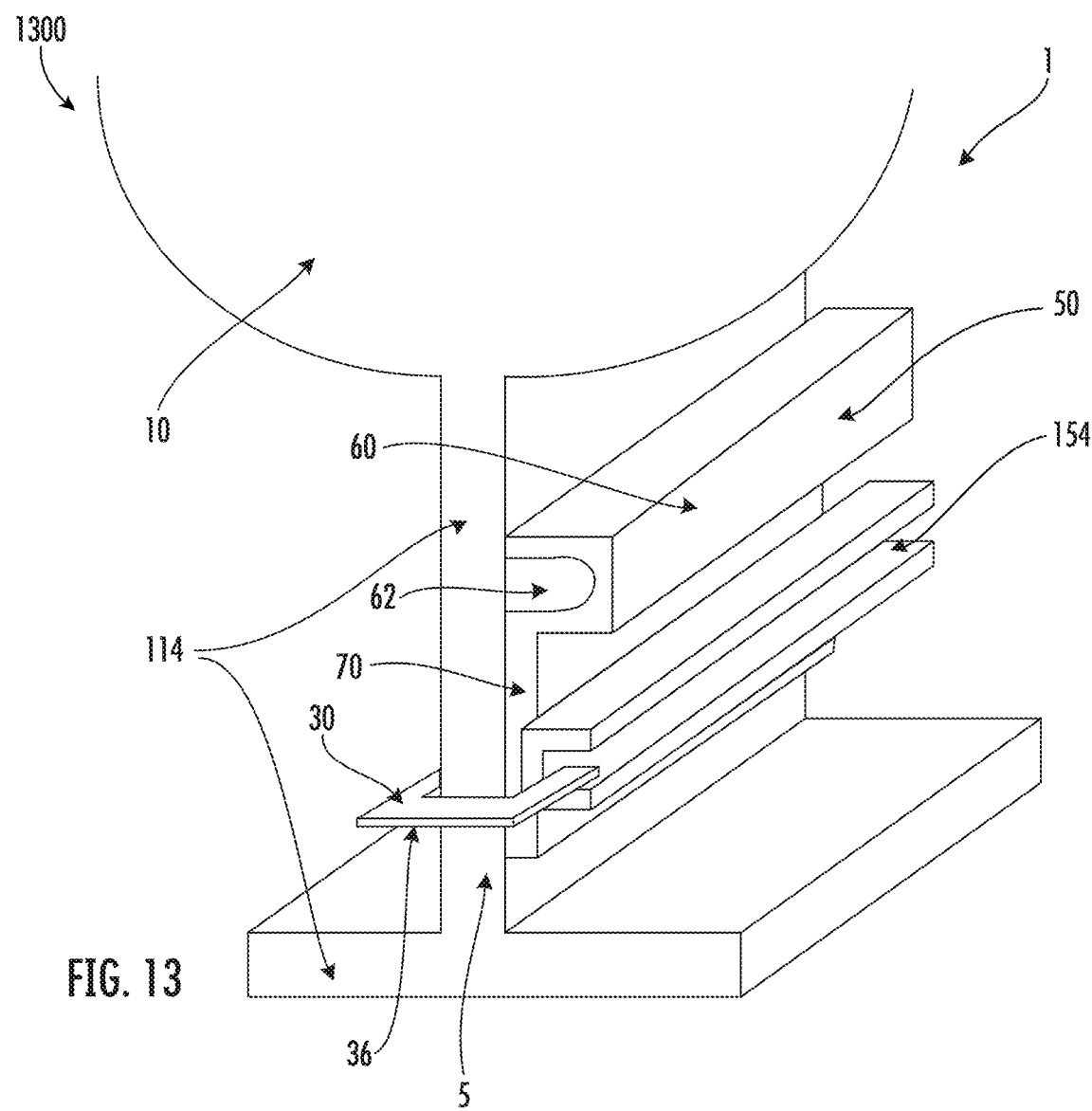
FIG. 13 illustrates a schematic perspective view 1300 of a heat transfer system 1 depicting an assembly of a heat transfer element 50 and a pipe support member 114 of a process pipe 10, in accordance with some embodiments of the disclosure.
Figure 14B:
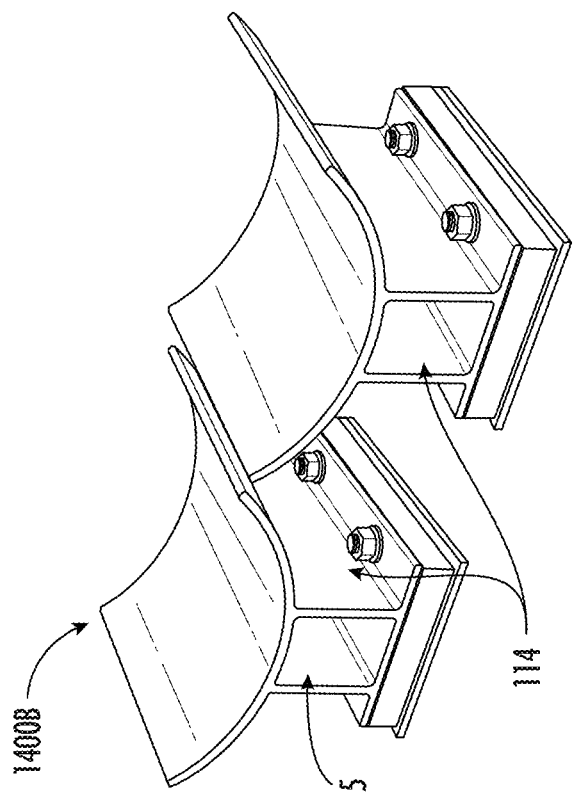
FIG. 14B illustrates a perspective view 1400B of a pipe support member 114 of a process pipe 10, in accordance with some embodiments of the disclosure.
Figure 14C:
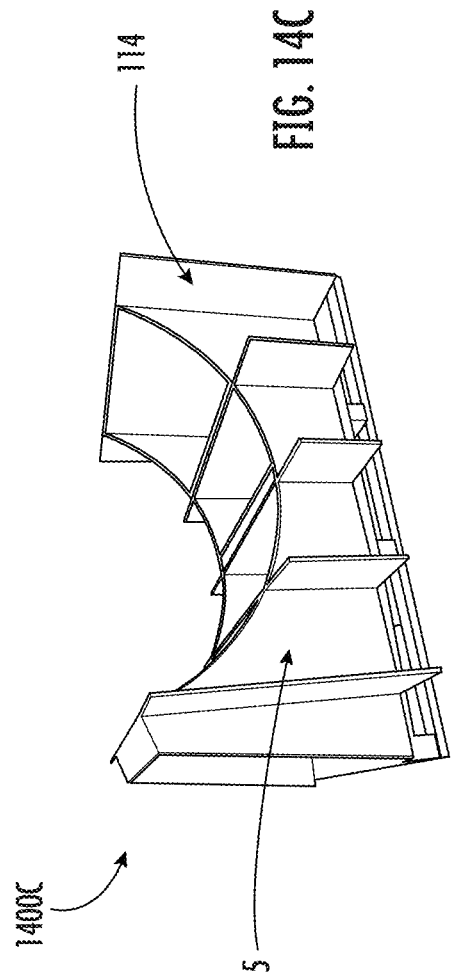
FIG. 14C illustrates a perspective view 1400C of a pipe support member 114 of a process pipe 10, in accordance with some embodiments of the disclosure.
Figure 14A:
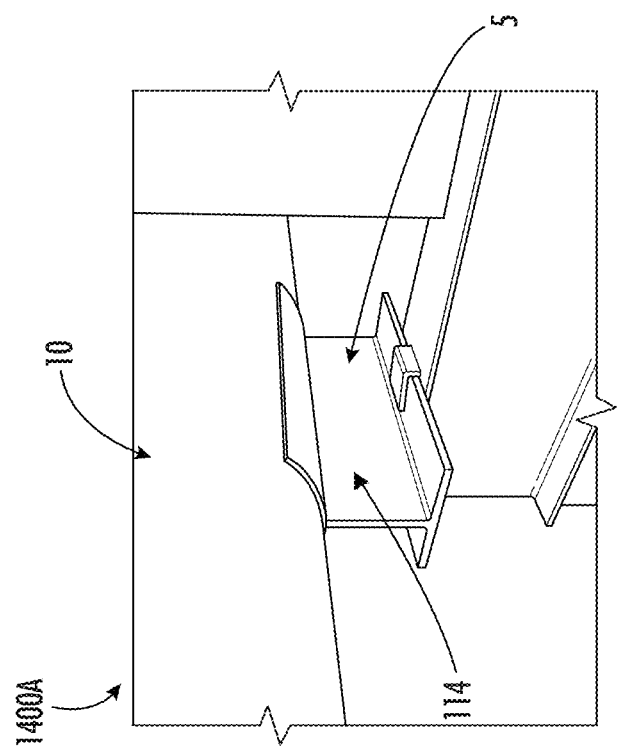
FIG. 14A illustrates a perspective view 1400A of a pipe support member 114 of a process pipe 10, in accordance with some embodiments of the disclosure.

FIG. 13 illustrates a schematic perspective view 1300 of a heat transfer system 1 depicting an assembly of a heat transfer element 50 and a pipe support member 114 of a process pipe 10, in accordance with some embodiments of the disclosure. As discussed previously, the process pipe component portions 5 may comprise a pipe support member 114, a process pipe 10, and/or the like. FIG. 14A illustrates a perspective view 1400A of a pipe support member 114 of a process pipe 10, in accordance with some embodiments of the disclosure. FIG. 14B illustrates a perspective view 1400B of a pipe support member 114 of a process pipe 10, in accordance with some embodiments of the disclosure. FIG. 14C illustrates a perspective view 1400C of a pipe support member 114 of a process pipe 10, in accordance with some embodiments of the disclosure.

Typically, process pipe component portions 5 such as one or more pipe support members 114 may be provided to support the process pipes 10. However, these pipe support members 114 act as a heat sink and undesirably draw away heat from the process fluid in the process pipes 10. To counteract this, tracer tubes 20 (not illustrated) may be provided at the pipe support members 114 to provide heat thereto. In this regard, one or more heat transfer elements 50 may be provided around the tracer tubes 20 (not illustrated) on the support members 114. As illustrated, the heat transfer element 50 may comprise a body portion 51 and one or more arms 70 extending therefrom. The body portion 51 may comprise a nested portion 60 forming a cavity 62 structured for receiving the tracer tube 20. The heat transfer element 50 may be assembled to the pipe support member 114 (e.g., a process pipe component portion 5) via a coupling channel 154 and a heat transfer element coupling 30, such as a clamp 36.

Figure 15:
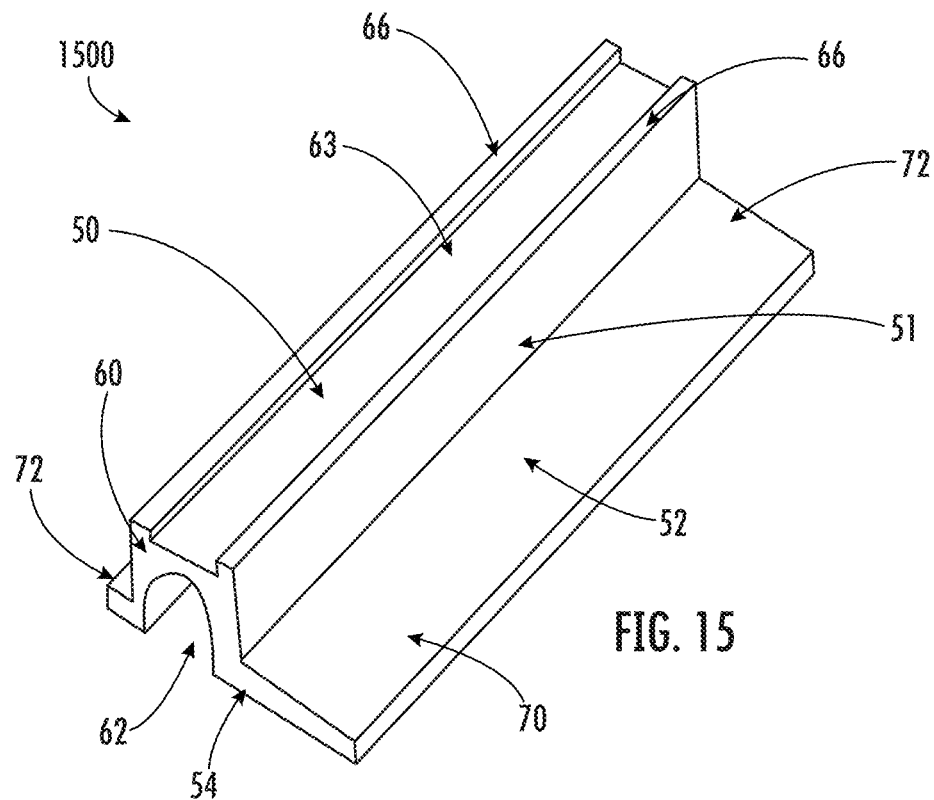
FIG. 15 illustrates a schematic perspective view 1500 of a heat transfer element 50, in accordance with some embodiments of the disclosure.

FIG. 15 illustrates a schematic perspective view 1500 of a heat transfer element 50, in accordance with some embodiments of the disclosure. As illustrated, the heat transfer element 50 comprises a heat transfer element body 51 comprising a nested portion 60 that forms a cavity 62 therein. The heat transfer element 50 comprises an outer surface 52 and an opposite inner surface 54. Typically, the heat transfer element body 51 is configured for operative coupling to a process pipe component portion 5 such as a process pipe 10. Typically, the body 51 and the cavity 62 of the body 51 extend in a longitudinal direction. Typically, the nested portion 60 is configured to receive a tracer tube 20 in the cavity 62 formed by the nested portion 60. The heat transfer element 50 also comprises one or more arms 70 (e.g., a first arm 72 and a second arm 74) extending from the body 51. The heat transfer element 50 further comprises an outer channel 63 on the outer surface 52 of the heat transfer element body 51. This outer channel 63 is structured for allowing the otherwise rigid heat transfer element 50 to be operatively coupled to a support member 114 or flange, as will be described in further detail herein. Specifically, FIG. 15 illustrates the outer channel 63 being positioned over a top portion of the nested portion 60, opposite the cavity 62. The outer channel 63 may be formed through the use of one or more projections 66, which are structured for allowing the otherwise rigid heat transfer element 50 to bend or flex. Moreover, the one or more projections 66 are structured for coupling with or retaining a heat transfer element coupling 30 such as a band 32 thereon, when the heat transfer element 50 is assembled onto a process pipe component portion 5 such as a process pipe flange 12 (e.g., in an arrangement similar to that illustrated in FIGS. 19A-20). In addition, upon assembly, the heat transfer element coupling 30 such as the band 32 may rest between the one or more projections 66, such that the heat transfer element coupling 30 or the band 32 does not slide off when tightened thereon during assembly. Typically, the heat transfer element 50 is configured to transfer heat between the tracer tube 20 and the process pipe 10.

Figure 16:
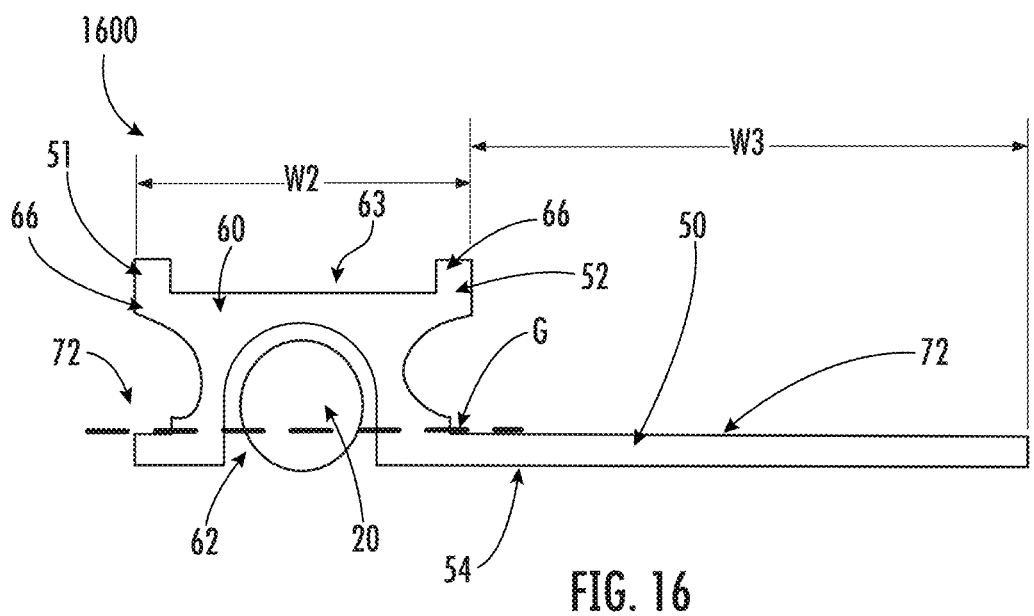
FIG. 16 illustrates a schematic front view 1600 of a heat transfer element 50, in accordance with some embodiments of the disclosure.

FIG. 16 illustrates a schematic front view 1600 of a heat transfer element 50, in accordance with some embodiments of the disclosure. As illustrated, the heat transfer element 50 comprises a heat transfer element body 51 comprising a nested portion 60 that forms a cavity 62 therein. The heat transfer element 50 comprises an outer surface 52 and an opposite inner surface 54. Typically, the heat transfer element body 51 is configured for operative coupling to a process pipe component portion 5 such as a process pipe 10. Typically, the body 51 and the cavity 62 of the body 51 extend in a longitudinal direction. Typically, the cavity 62 of the nested portion 60 is configured to receive a tracer tube 20. The heat transfer element 50 also comprises one or more arms 70 (e.g., a first arm 72 and a second arm 74) extending from the body 51. The nested portion 60 may define a width of W2 and the first arm 72 may define a width of W3. The heat transfer element 50 further comprises a channel 63 on the outer surface 52 of the heat transfer element body 51. These outer channels 63 may be formed through the use of one or more projections 66, which are structured for allowing the otherwise rigid heat transfer element 50 to bend or flex. Moreover, the one or more projections 66 are structured for coupling with or retaining a heat transfer element coupling 30 such as a band 32 thereon, when the heat transfer element 50 is assembled onto a process pipe component portion 5 such as a process pipe flange 12 (e.g., in an arrangement similar to that illustrated in FIGS. 19A-20). In addition, upon assembly, the heat transfer element coupling 30 such as the band 32 may rest between the one or more projections 66, such that the heat transfer element coupling 30 or the band 32 does not slide off when tightened thereon during assembly. Specifically, FIG. 16 illustrates a first channel 63 being positioned over a top portion of the nested portion 60, opposite the cavity 62. Typically, the heat transfer element 50 is configured to transfer heat between the tracer tube 20 and the process pipe 10.

FIG. 17 illustrates a schematic perspective view 1700 of heat transfer system 1, in accordance with some embodiments of the disclosure. Specifically, FIG. 17 illustrates a tracer tube 20 provided around a process pipe flange 12 of a process pipe 10 instead of jumping over the process pipe flange 12 (both configurations illustrated). As discussed previously, the process pipe component portions 5 may comprise the process pipe 10, bends in the process pipe, a process pipe flange 12, and/or the like. Moreover, one or more heat transfer elements 50 are provided and are coupled to the tracer tube 20 and process pipe 10 via heat transfer element couplings 30 such as bands 32. However, the process pipe flange 12 also act as a heat sink and undesirably draws away heat from the process fluid in the process pipes 10. However, the conventional arrangement illustrated in FIG. 17 is insufficient to remedy this because the process pipe flange 12 jumps over the process pipe flange 12, thereby the tracer tube 20 is unable to heat (or cool) the process pipe flange 12. The present invention provides a solution to this problem, by providing heat transfer elements 50 that are structured for assembling a tracer tube 20 over the circumference of the process pipe flange 12 to thereby heat (or cool) the process pipe flange 12, as will be described in detail with respect to FIGS. 18A-20, below.

Figure 18A:
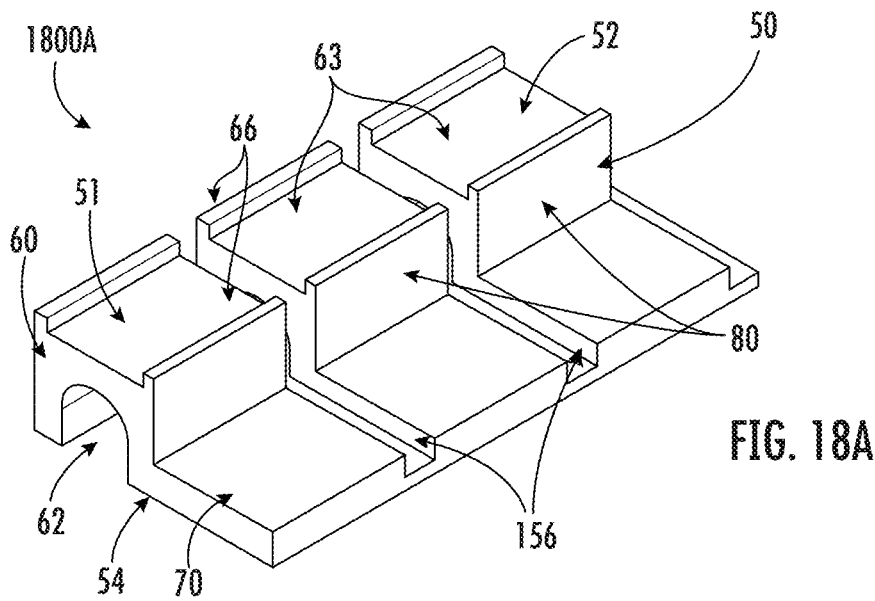
FIG. 18A illustrates a schematic perspective view 1800A of a heat transfer element 50, in accordance with some embodiments of the disclosure.
Figure 18B:
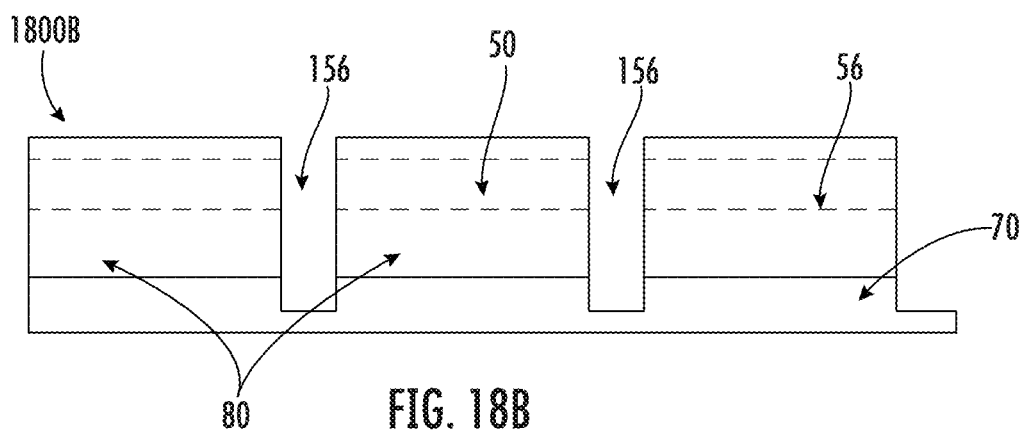
FIG. 18B illustrates a schematic right-side view 1800B of the heat transfer element 50 of FIG. 18A, in accordance with some embodiments of the disclosure.
Figure 18C:
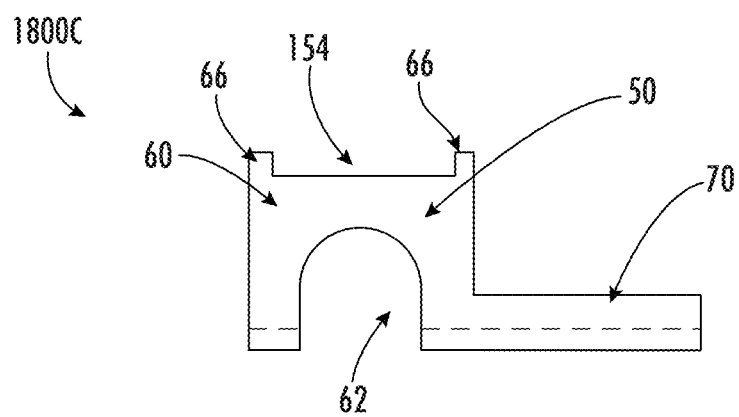
FIG. 18C illustrates a schematic front view 1800C of the heat transfer element 50 of FIG. 18A, in accordance with some embodiments of the disclosure.

FIG. 18A illustrates a schematic perspective view 1800A of a heat transfer element 50, in accordance with some embodiments of the disclosure. FIG. 18B illustrates a schematic right-side view 1800B of the heat transfer element 50 of FIG. 18A, in accordance with some embodiments of the disclosure. FIG. 18C illustrates a schematic front view 1800C of the heat transfer element 50 of FIG. 18A, in accordance with some embodiments of the disclosure. FIGS. 18A-18C illustrate a heat transfer element 50 structured for assembling a tracer tube 20 around process pipe component portion 5 such as a process pipe flange 12 of a process pipe 10. Typically, the heat transfer element 50 is configured to transfer heat between the tracer tube 20 and the process pipe 10. The heat transfer element 50 comprises a plurality of body portions 80. The body portions 80 may be integrally operatively coupled with each other, and formed by body apertures 156 (e.g., cut into a linear heat transfer element 50). Alternatively, the body portion 80 may be discrete body portions 80 that are separate from each other and operatively coupled together through the use of a spine 90. Typically, the heat transfer element 50 is configured for operative coupling to a process pipe flange 12. Each of the body portions 80 comprise have a nested portion 60. Each of the nested portions 60 form a cavity 62 structured for receiving and at least partially surrounding a corresponding tracer tube 20. The cavity 62 may comprise a suitable cross-section shape such as a "U" shape, a "C" shape, a semi-circular shape, and/or the like.

The heat transfer element 50 also comprises one or more arms 70 (e.g., a first arm 72) extending from one side of the body 51. The heat transfer element 50 further comprises an outer channel 63 on the outer surface 52 of the heat transfer element body 51, formed from one or more projections 66 extending from the outer surface 52. Specifically, FIG. 15 illustrates the channel 63 being positioned over a top portion of the nested portion 60, opposite the cavity 62. These outer channels 63 may be formed through the use of one or more projections 66, which are structured for allowing the otherwise rigid heat transfer element 50 to bend or flex. Moreover, the one or more projections 66 are structured for coupling with or retaining a heat transfer element coupling 30 such as a band 32 thereon, when the heat transfer element 50 is assembled onto a process pipe component portion 5 such as a process pipe flange 12 (e.g., in an arrangement similar to that illustrated in FIGS. 19A-20). In addition, upon assembly, the heat transfer element coupling 30 such as the band 32 may rest between the one or more projections 66, such that the heat transfer element coupling 30 or the band 32 does not slide off when tightened thereon during assembly.

The heat transfer element 50 further comprises one or more body apertures 156 that extend into the body 51 and create body portions 80 of the heat transfer element 50. As illustrated, the one or more body apertures 156 extend laterally across the body 51 and in some embodiments may extend into the one or more arms 70. The one or more body apertures 156 are structured for allowing the otherwise rigid heat transfer element 50 to bend or flex to conform to the circumference of the process pipe flange 12. FIGS. 18A-18C illustrates the heat transfer element 50 having a linear configuration 56. However, it is noted that the heat transfer element 50 may be bent into a curved configuration 58, as will be described later on with respect to FIGS. 19A-20. The body apertures 156, regardless of whether or not the body apertures 156 extend into the one or more arms 70, allow for bending of the heat transfer element circumferentially, such as around a flange 12; however, it should be understood that in some embodiments, by extending the body apertures 156 into the one or more arms 70, it may be easier to bend the heat transfer element 50, such as around a flange 12.

Figure 19A:
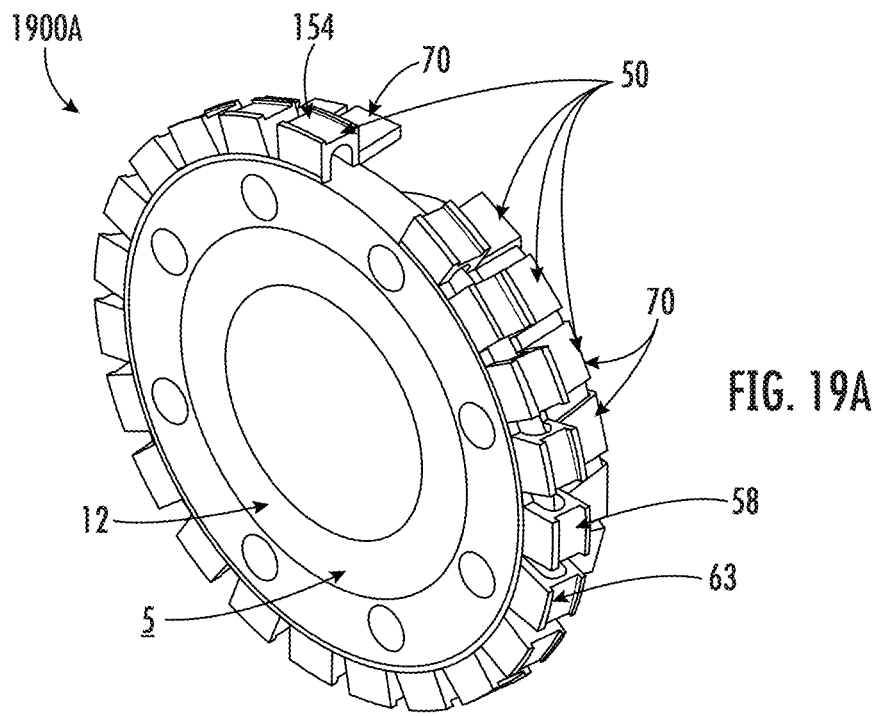
FIG. 19A illustrates a schematic perspective view 1900A of an assembly of a heat transfer element 50 of FIG. 18A and a process pipe flange 12, in accordance with some embodiments of the disclosure.
Figure 19B:
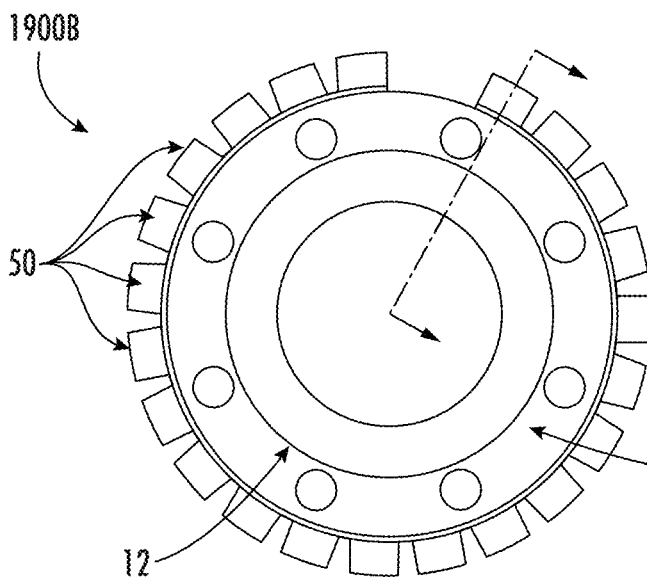
FIG. 19B illustrates a schematic front view 1900B of the assembly of FIG. 19A, in accordance with some embodiments of the disclosure.
Figure 19C:
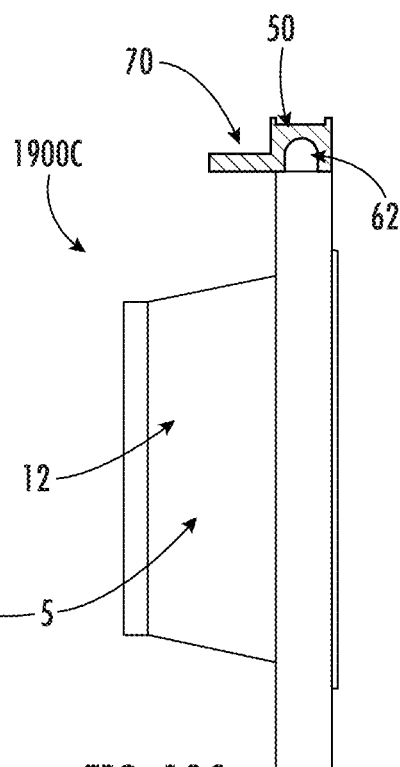
FIG. 19C illustrates a schematic cutaway left side view 1900C of the assembly of FIG. 19A, in accordance with some embodiments of the disclosure.

FIG. 19A illustrates a schematic perspective view 1900A of an assembly of a heat transfer element 50 of FIG. 18A and a process pipe flange 12, in accordance with some embodiments of the disclosure. FIG. 19B illustrates a schematic front view 1900B of the assembly of FIG. 19A, in accordance with some embodiments of the disclosure. FIG. 19C illustrates a schematic cutaway left side view 1900C of the assembly of FIG. 19A, in accordance with some embodiments of the disclosure. Specifically, FIGS. 19A-19C illustrate the heat transfer element 50 of FIGS. 18A-18C being bent into a curved configuration 58 are assembled over a circumference of the process pipe flange 12. The heat transfer element 50 may completely or partially cover the circumference of the process pipe flange 12 (e.g., a process pipe component portion 5). The heat transfer element 50 may be held together in place around the process pipe flange 12 using heat transfer element couplings 30 such as a band 32 which may be a metal, elastic, gasket, or the like band 32 that is positioned over the heat transfer element 50 (e.g., in the channel 63) and may exert a compressive force over the heat transfer element 50 thereby holding it in place over the flange 12.

Figure 20:
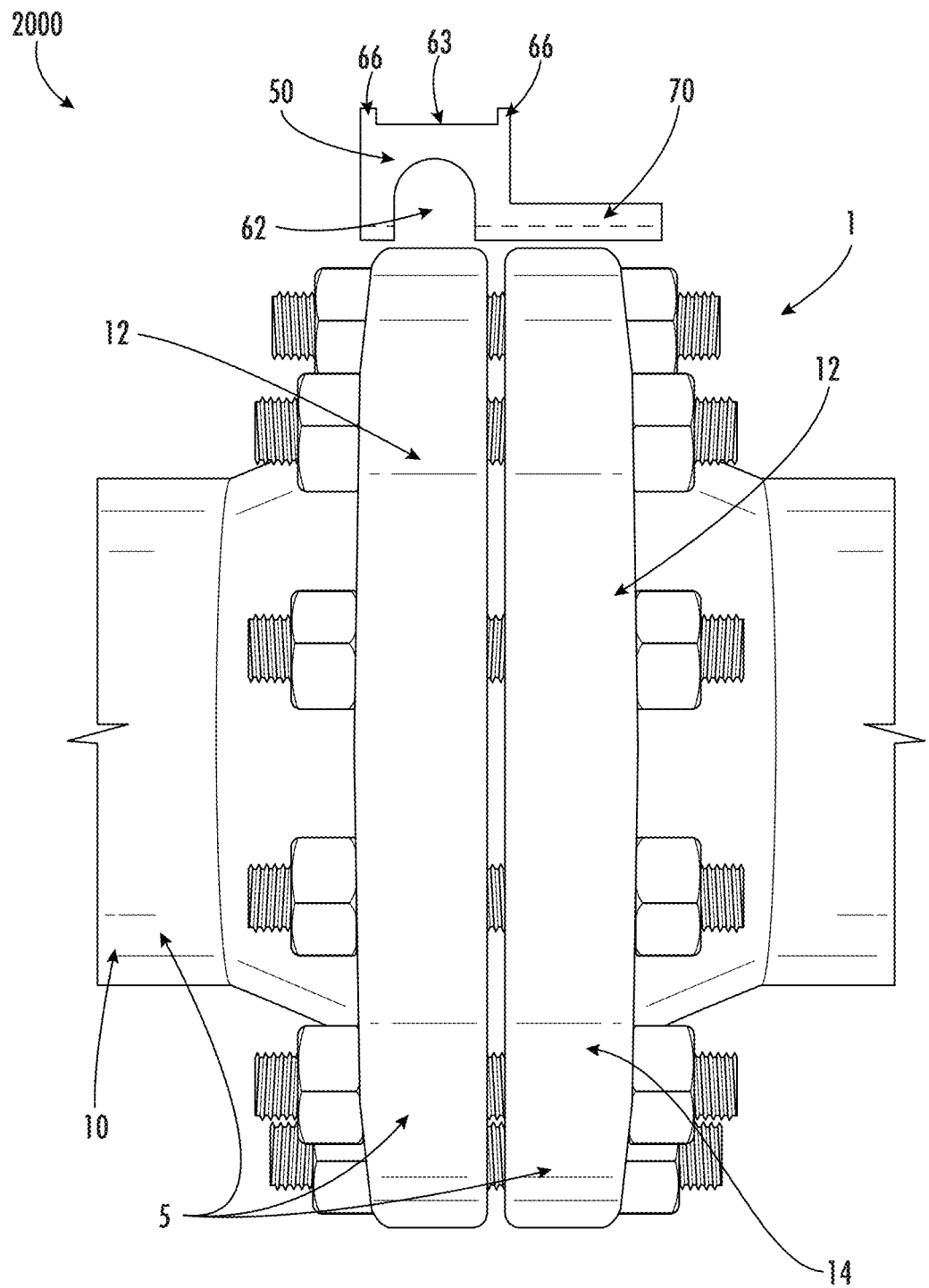
FIG. 20 illustrates a schematic cutaway right side view 2000 of a heat transfer system 1 depicting an assembly of the heat transfer element 50 of FIG. 18A and a flange coupling 14 of a process pipe 10, in accordance with some embodiments of the disclosure.

FIG. 20 illustrates a schematic cutaway right side view 2000 of a heat transfer system 1 depicting an assembly of the heat transfer element 50 of FIG. 18A and a flange coupling 14 of a process pipe 10, in accordance with some embodiments of the disclosure. Specifically, FIG. 20 illustrates a flange coupling 14 (e.g., a process pipe component portion 5) having two adjacent process pipe flanges 12 (e.g., process pipe component portions 5), and the heat transfer element 50 of FIGS. 18A-18C being bent into a curved configuration 58 and assembled over a circumference of the flange coupling 14. The heat transfer element 50 may completely or partially cover the circumference of the flange coupling 14. The heat transfer element 50 may be positioned such that the cavity 62 is positioned over one of the process pipe flanges 12, while the arm 70 extends over the other process pipe flange 12. This arrangement renders the assembly to be more stable and having better performance, with the tracer tube 20 resting on one of the flanges and not within the gap between the two process pipe flanges 12. That said, it is contemplated that in other embodiments, the heat transfer element 50 may be positioned such that the cavity 62 is positioned over a gap between the process pipe flanges 12, while the arms 72, 74 extend over the process pipe flanges 12. The heat transfer element 50 may be held together in place around the process pipe flange 12 using heat transfer element couplings 30 such as a band 32 that is positioned over the heat transfer element 50 (e.g., in channel 63) and may exert a compressive force over the heat transfer element 50 thereby holding it in place. In addition, upon assembly, the heat transfer element coupling 30 such as the band 32 may rest between the one or more projections 66, such that the heat transfer element coupling 30 or the band 32 does not slide off when tightened thereon during assembly.

Figure 21:
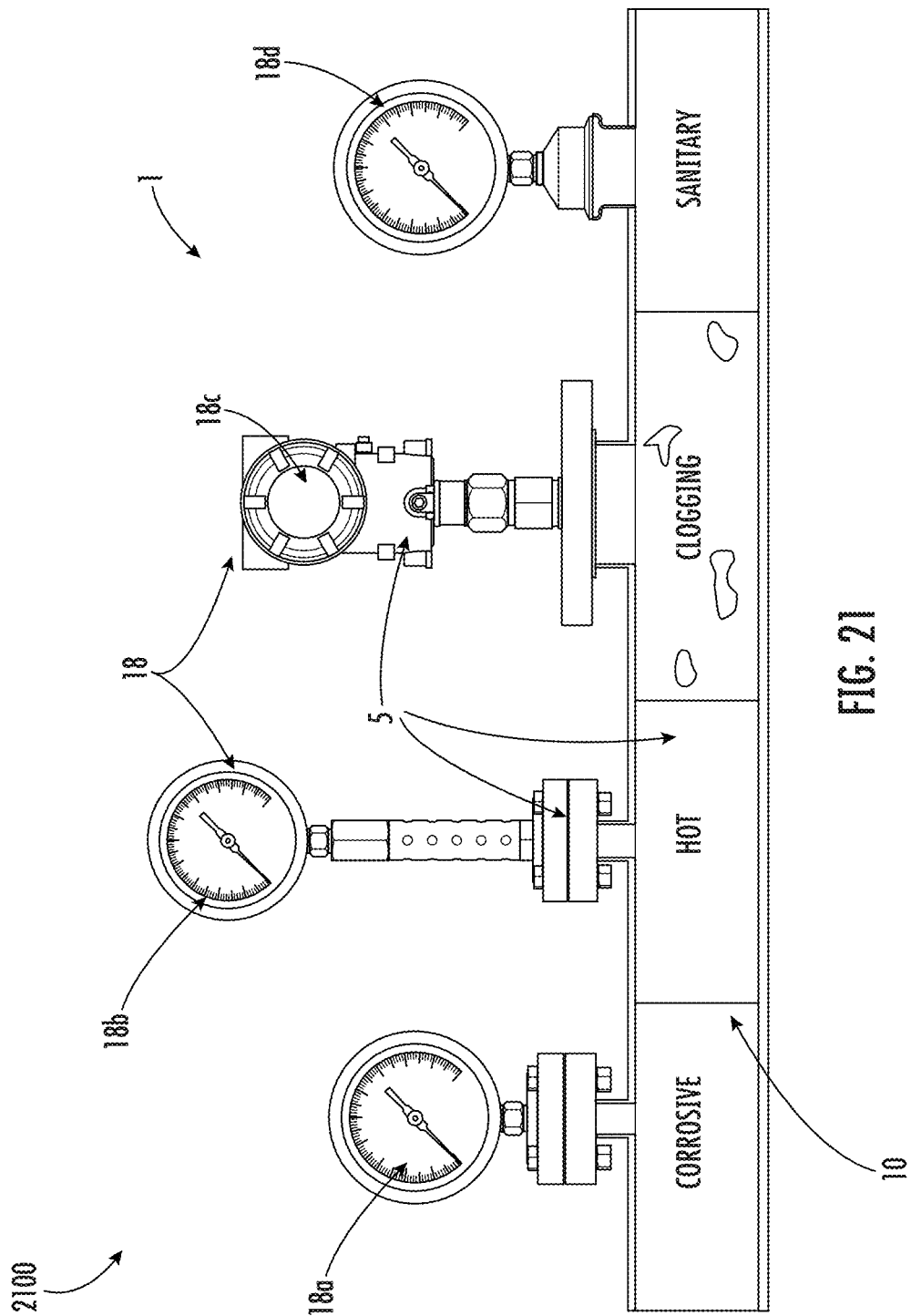
FIG. 21 illustrates a schematic view 2100 of a heat transfer system 1 depicting a process pipe 10 having one or more process pipe instruments 18, in accordance with some embodiments of the disclosure.

FIG. 21 illustrates a schematic view 2100 of a heat transfer system 1 depicting a process pipe 10 having one or more process pipe instruments 18 (e.g., a process pipe component portions 5), in accordance with some embodiments of the disclosure. These one or more process pipe instruments 18 may comprise a corrosion detection instrument 18a, a temperature detection instrument 18b, a clogging detection instrument 18c, and a sanitation detection instrument 18d, structured for measuring/controlling/monitoring one or more parameters of the process fluid of the process pipe 10. Heat transfer elements 50, similar to those described herein, may be provided over the one or more process pipe instruments 18 in a similar manner as described herein.

Figure 22:
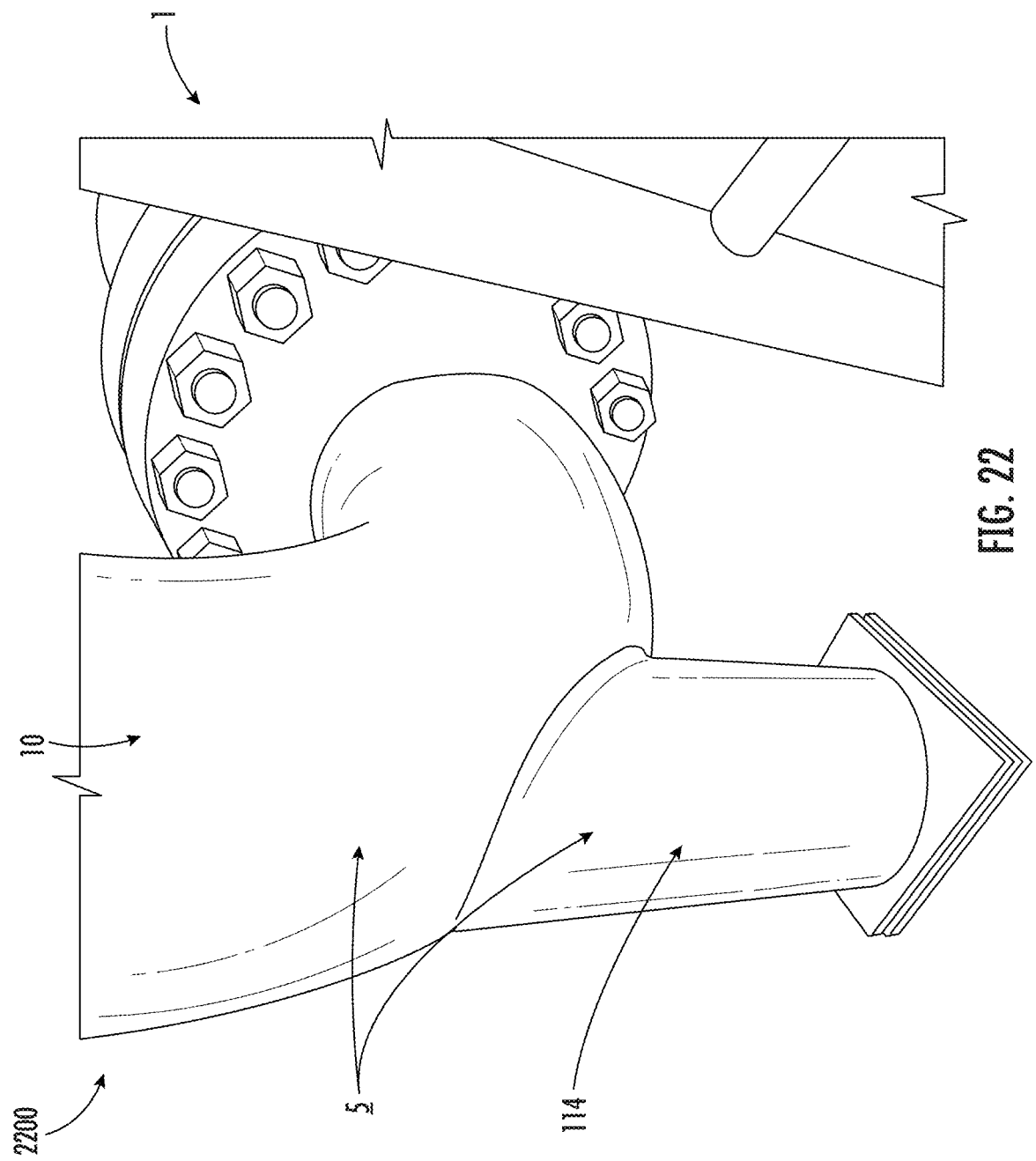
FIG. 22 illustrates a perspective view 2200 of a heat transfer system 1 depicting a process pipe 10 having a pipe support member 114, in accordance with some embodiments of the disclosure.

FIG. 22 illustrates a perspective view 2200 of a heat transfer system 1 depicting a process pipe 10 having a pipe support member 114, in accordance with some embodiments of the disclosure. As described previously, one or more pipe support members 114 (e.g., a process pipe component portions 5) may be provided to support the process pipes 10. However, these pipe support members 114 act as a heat sink and undesirably draw away heat from the process fluid in the process pipes 10. To counteract this, tracer tubes 20 (not illustrated) may be provided at the pipe support members 114 to provide heat thereto. FIG. 22 illustrates a cylindrical pipe support member 114, unlike the flat (e.g., I-beam) support members previously shown and described herein. In this regard, one or more heat transfer elements 50 (e.g., those described with respect to FIGS. 18A-18C) may be provided around the cylindrical pipe support member 114, in a manner similar to that described with respect to 19A-20 with respect to a pipe flange 12.

Figure 23A:
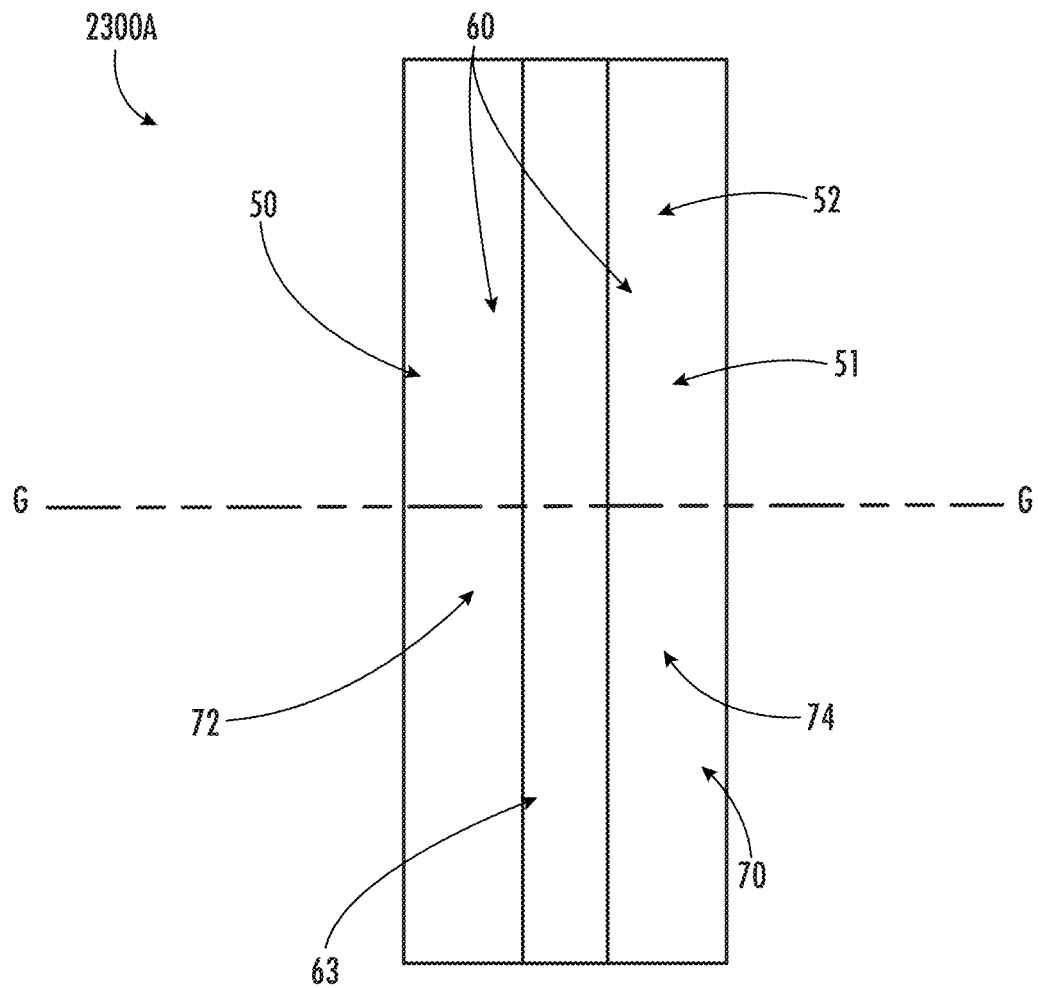
FIG. 23A illustrates a schematic top view 2300A of a heat transfer element 50, in accordance with some embodiments of the disclosure.
Figure 23B:
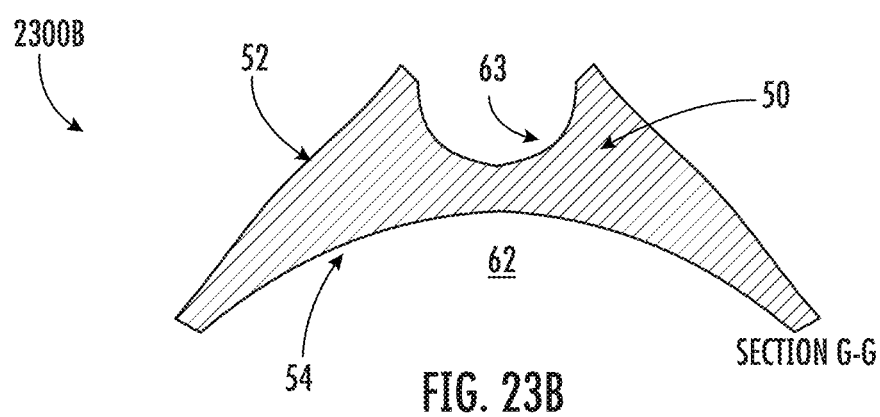
FIG. 23B illustrates a cross-sectional view 2300B of the heat transfer element 50 of FIG. 23A, in accordance with some embodiments of the disclosure.

FIG. 23A illustrates a schematic top view 2300A of a heat transfer element 50, in accordance with some embodiments of the disclosure. FIG. 23B illustrates a cross-sectional view 2300B of the heat transfer element 50 of FIG. 23A, in accordance with some embodiments of the disclosure. As illustrated, the heat transfer element 50 comprises a heat transfer element body 51 comprising a nested portion 60 that forms a cavity 62 therein. The heat transfer element 50 comprises an outer surface 52 and an opposite inner surface 54. The heat transfer element 50 is configured for operative coupling to a process pipe component portions 5 such as a process pipe 10, a pipe flange 12, and/or the like. The body 51 and the cavity 62 of the nested portion 60 of the body 51 extend in a longitudinal direction. The cavity 62 of the nested portion 60 is configured to receive a tracer tube 20. The heat transfer element 50 also comprises one or more arms 70 (e.g., a first arm 72 and a second arm 74) extending from the body 51. Unlike the heat transfer elements 50, previously discussed herein, the nested portion 60 having the cavity may be located in the outer surface 54 of the body 51 of the heat transfer element 50. The nested portion 60 is configured to receive the tracer tube 20 within the cavity 62. The heat transfer element 50 is configured to transfer heat between the tracer tube 20 and the process pipe 10. The heat transfer element 50 in FIGS. 23A and 23B, is a linear heat transfer element 50 that is configured to be utilized in a straight section of a process pipe 10.

FIG. 24A illustrates a schematic top view 2400A of a heat transfer element 50, in accordance with some embodiments of the disclosure. FIG. 24B illustrates a cross-sectional view 2400B of the heat transfer element 50 of FIG. 24A, in accordance with some embodiments of the disclosure. The heat transfer element body 51 comprises a plurality of body portions 80. The body portions 80 may be integrally operatively coupled with each other, and formed by body apertures 156 (e.g., cut into a linear heat transfer element 50). Alternatively, the body portion 80 may be discrete body portions 80 that are separate from each other and operatively coupled together through the use of a spine 90. Each of the body portions 80 comprise a body 51 having a nested portion 60. Each of the nested portions 60 form a cavity 62 structured for receiving and at least partially surrounding a corresponding tracer tube 20. The cavity 62 may comprise a suitable cross-section shape such as a "U" shape, a "C" shape, a semi-circular shape, and/or the like. Again, unlike the heat transfer elements 50 previously discussed herein, the nested portion 60 having the cavity 62 may be located in the outer surface 54 of the body 51 of the heat transfer element 50. The nested portion 60 is configured to receive the tracer tube 20 within the cavity 62. The heat transfer element 50 is configured to transfer heat between the tracer tube 20 and the process pipe 10. The heat transfer element 50 may also comprise one or more arms 70 (e.g., a first arm 72 and a second arm 74) extending from either side of the body 51.

Moreover, the heat transfer element 50 may comprise a spine 90. The spine 90 may comprise a circular cross-section and may be provided at a general center of the body 51 of the body portions 80. Moreover, as illustrated, the spine 90 comprises a generally curvilinear (e.g., circular, oval, or the like) cross-section, although other cross-sections may also be provided. The body portions 80, the body apertures 156, the spine 90, and the bevels 82 allow the otherwise rigid heat transfer element 50 to bend or flex into a curved configuration in any plane.

Figure 25A:
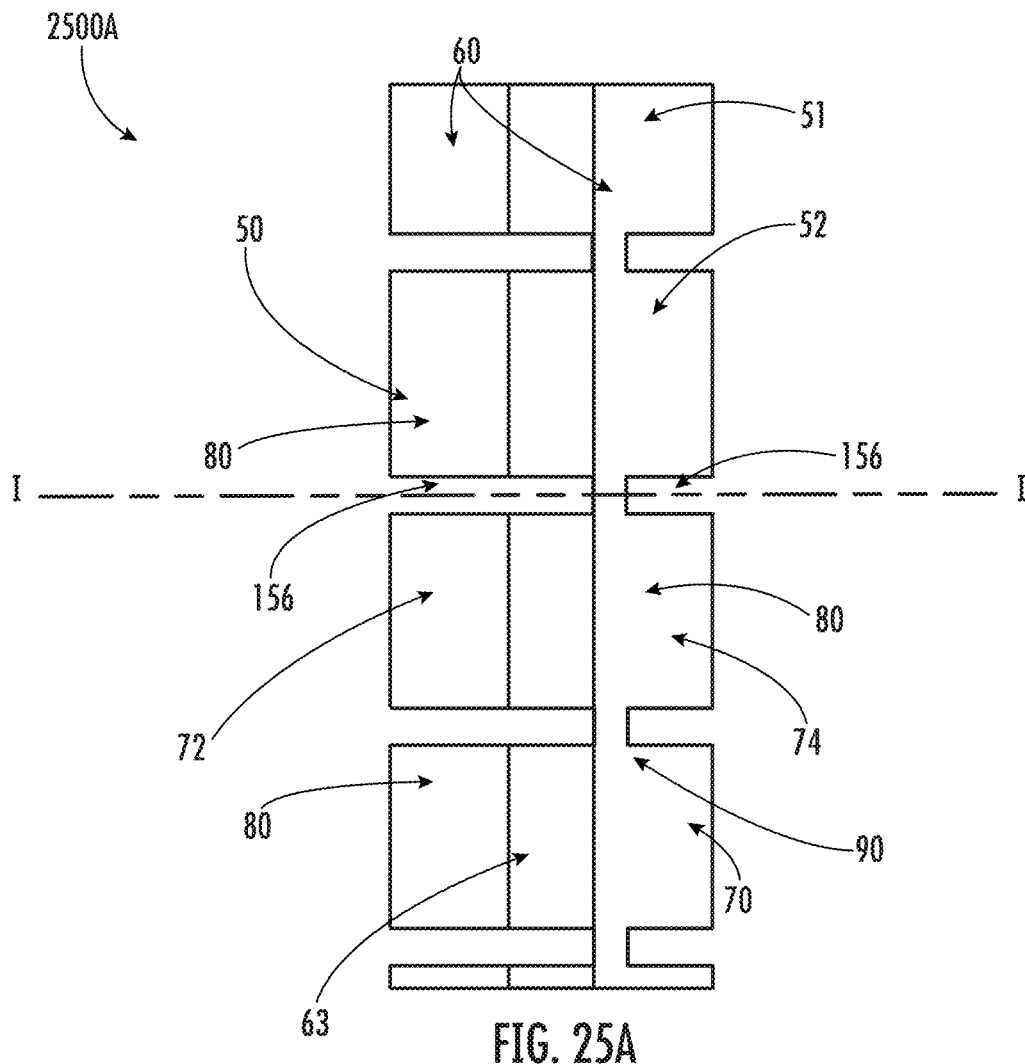
FIG. 25A illustrates a schematic top view 2500A of a heat transfer element 50, in accordance with some embodiments of the disclosure.
Figure 25B:
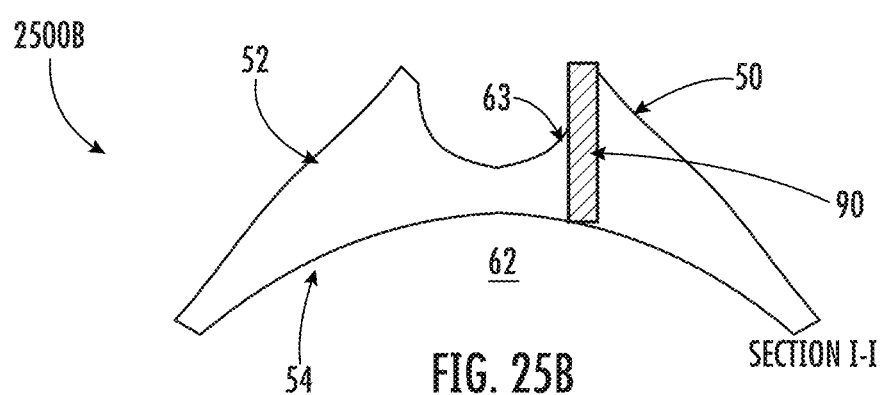
FIG. 25B illustrates a cross-sectional view 2500B of the heat transfer element 50 of FIG. 25A, in accordance with some embodiments of the disclosure.

FIG. 25A illustrates a schematic top view 2500A of a heat transfer element 50, in accordance with some embodiments of the disclosure. FIG. 25B illustrates a cross-sectional view 2500B of the heat transfer element 50 of FIG. 25A, in accordance with some embodiments of the disclosure. Unlike, FIGS. 24A and 24B discussed above, in this embodiment, the spine 90 is located adjacent to the side of the nested portion 60 of the body 51 of the heat transfer element 50. The spine 90 illustrated in FIGS. 25A and 25B is rectangular, which is similar to the spine 90 illustrated and described with respect to FIGS. 3A and 3B. As previously discussed with respect to FIGS. 3A and 3B, the spine 90 allow for bending the heat transfer element 50 horizontally for a side placement on a bend in a process tube, but restricts the bending of the heat transfer element 40 vertically for placement on an outer or inner bend of a process pipe 10 and/or other process pipe component portions 5. As such, depending on the shape and orientation of the spine 90, the spine 90 may aid in allowing for bending in one or more planes, while restricting bending in one or more other planes, as previously described with respect to FIGS. 3A and 3B.

Figure 26A:
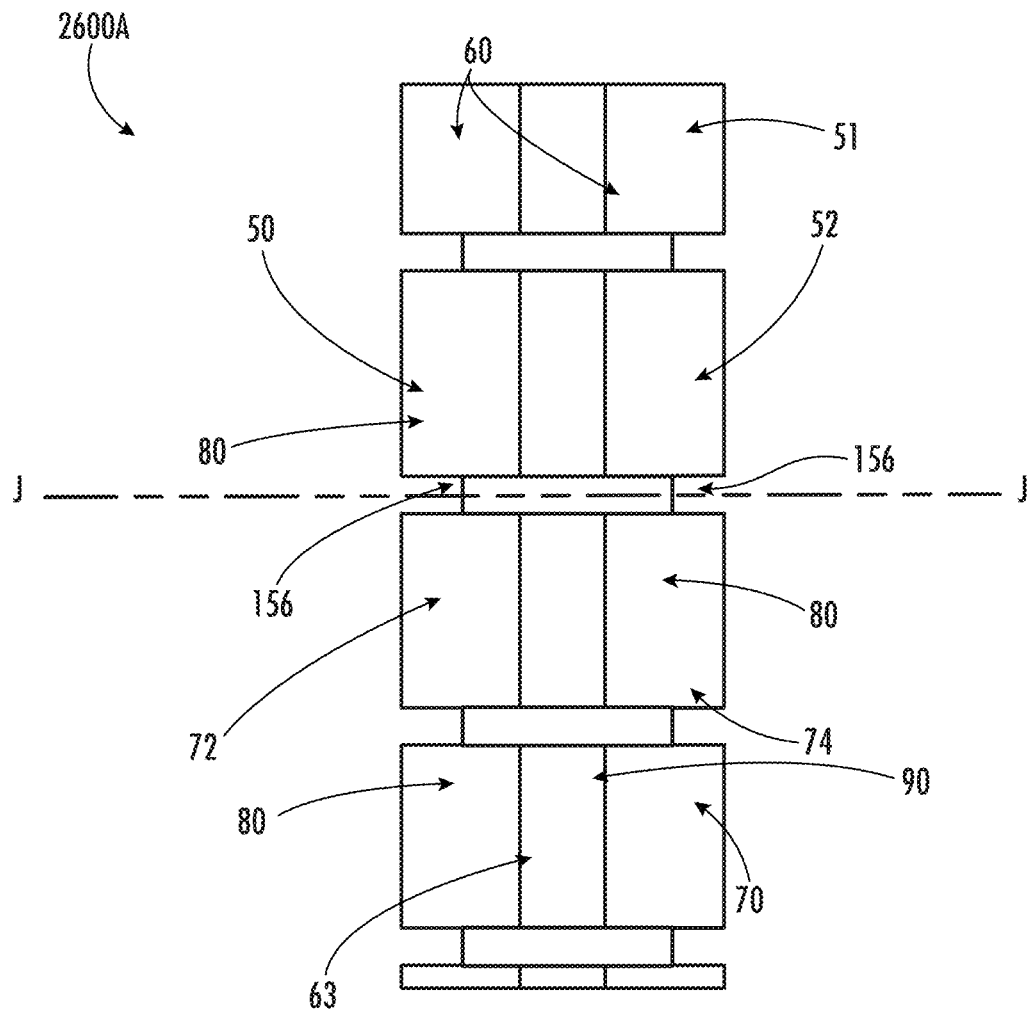
FIG. 26A illustrates a schematic top view 2600A of a heat transfer element 50, in accordance with some embodiments of the disclosure.
Figure 26B:
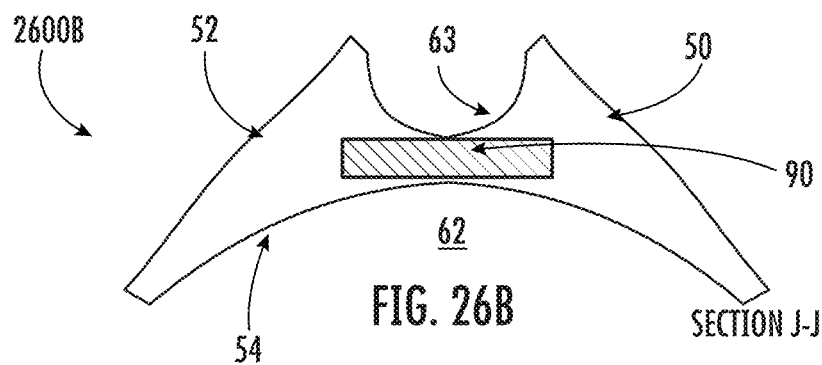
FIG. 26B illustrates a cross-sectional view 2600B of the heat transfer element 50 of FIG. 26A, in accordance with some embodiments of the disclosure.

FIG. 26A illustrates a schematic top view 2600A of a heat transfer element 50, in accordance with some embodiments of the disclosure. FIG. 26B illustrates a cross-sectional view 2600B of the heat transfer element 50 of FIG. 26A, in accordance with some embodiments of the disclosure. The spine 90 illustrated in FIGS. 26A and 26B may comprise a polygonal or rectangular cross-section and may be provided at a general center of the nested portion 60 of the body 51. The spine 90 illustrated in FIGS. 26A and 26B aids in allowing bending in the vertical direction for positioning the heat transfer element around the outer surface or inner surface of a bend in a process pipe, while restricting the bending of the illustrated heat transfer element 50 in the horizontal direction due to the rectangular shape.

Figure 27A:
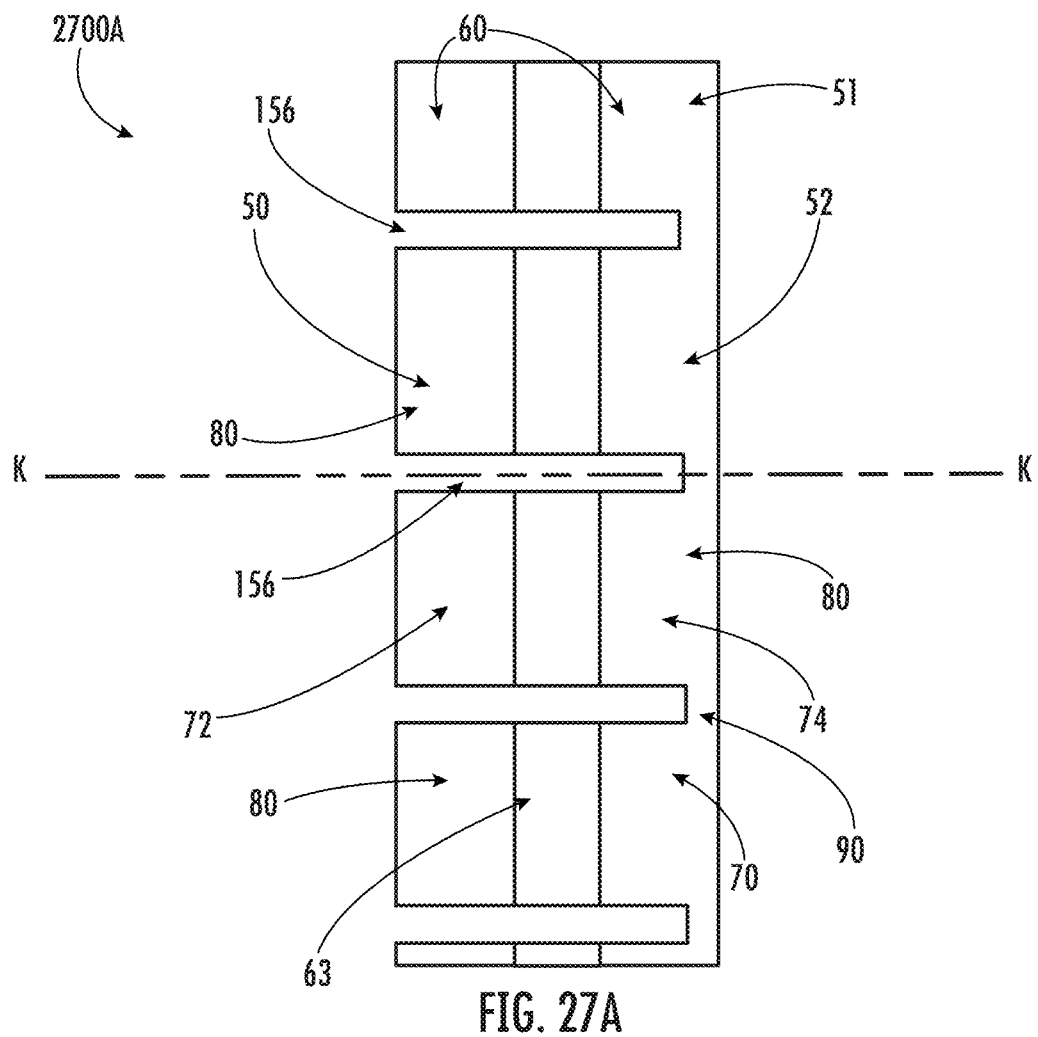
FIG. 27A illustrates a schematic top view 2700A of a heat transfer element 50, in accordance with some embodiments of the disclosure.
Figure 27B:
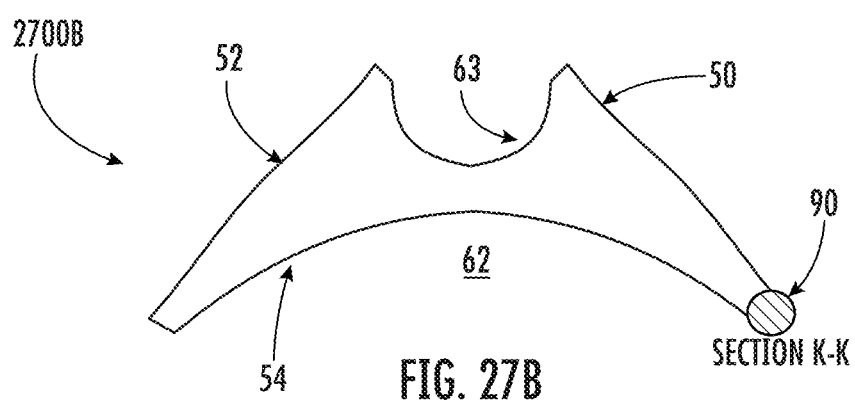
FIG. 27B illustrates a cross-sectional view 2700B of the heat transfer element 50 of FIG. 27A, in accordance with some embodiments of the disclosure.

FIG. 27A illustrates a schematic top view 2700A of a heat transfer element 50, in accordance with some embodiments of the disclosure. FIG. 27B illustrates a cross-sectional view 2700B of the heat transfer element 50 of FIG. 27A, in accordance with some embodiments of the disclosure. The spine 90 illustrated in FIGS. 27A and 27B may be located in one of the arms 70, such as the second arm 74. Depending on the shape and/or orientation of the spine, bending the heat transfer element in one or more orientations may be easier than bending in one or more alternate orientations. The spine 90 illustrated in FIGS. 27A and 27B has a curvilinear cross-section (e.g., circular, oval, or the like), which may allow bending of the heat transfer element 50 in any plane.

Figure 28A:
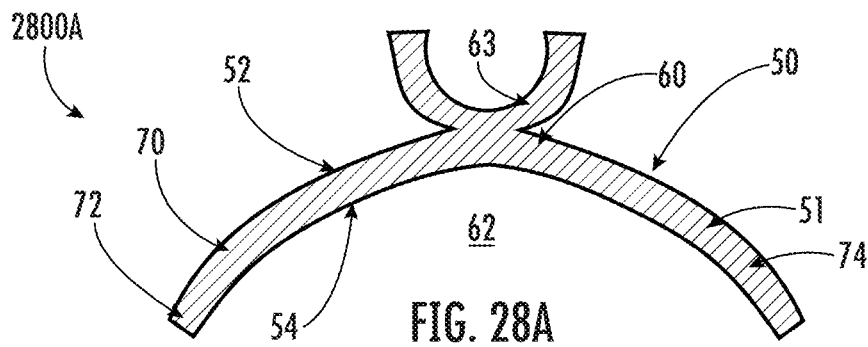
FIG. 28A illustrates a schematic cross-sectional view 2800A of a heat transfer element 50, in accordance with some embodiments of the disclosure.
Figure 28B:
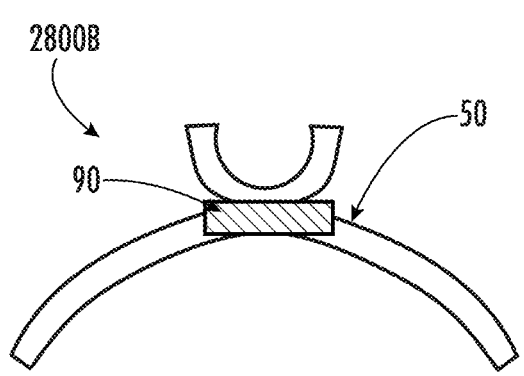
FIGS. 28B to 28E illustrate schematic cross-sectional views 2800B-2800E of the heat transfer element 50 of FIG. 28A with alternative positions of a spine 90, in accordance with some embodiments of the disclosure.
Figure 28C:
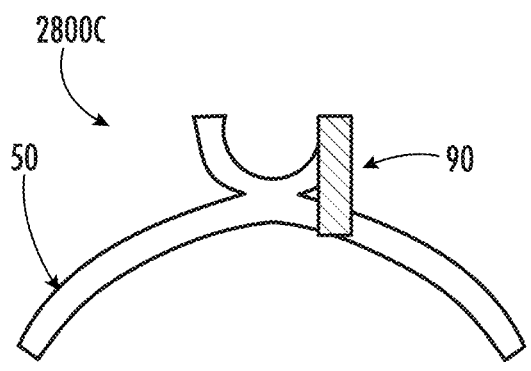
Figure 28D:
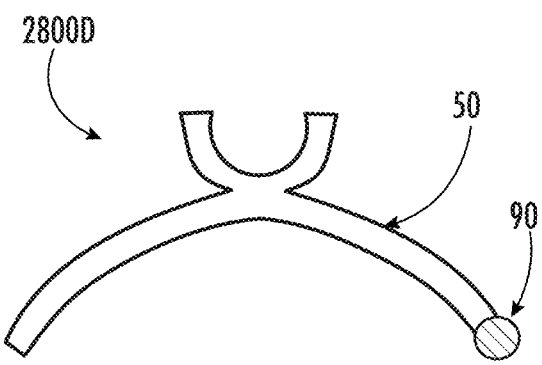
Figure 28E:
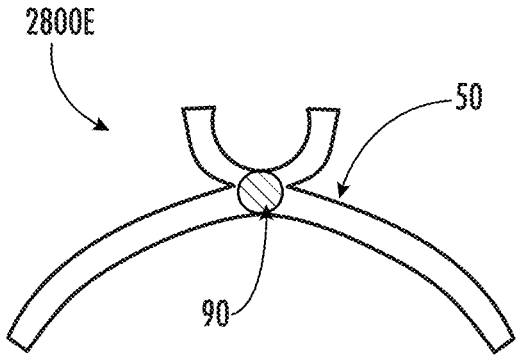

FIG. 28A illustrates a schematic cross-sectional view 2800A of a heat transfer element 50, in accordance with some embodiments of the disclosure. FIGS. 28B to 28E illustrate schematic cross-sectional views 2800B-2800E of the heat transfer element 50 of FIG. 28A with alternative profiles. Moreover, FIGS. 28B-28E illustrate alternative positions and/or shapes for the spine 90 therein. Specifically, FIG. 28B illustrates a polygonal or rectangular spine 90 positioned along a general center of the body 51 adjacent the nested portion 60 of the heat transfer element 50. FIG. 28C illustrates a polygonal or rectangular spine 90 positioned offset from a general center of the body 51 adjacent a side of the nested portion 60 of the heat transfer element 50. FIG. 28D illustrates a curvilinear spine 90 (e.g., circular, or the like) positioned at the end on one or the arms 70, such as the second arm 74. FIG. 28E illustrates a curvilinear spine 90 (e.g., circular, or the like) positioned along a center of the body 51 adjacent the nested portion 60 of the heat transfer element 50.

FIG. 29A illustrates a schematic cross-sectional view 2900A of a heat transfer element 50, in accordance with some embodiments of the disclosure. FIGS. 29B to 29E illustrate schematic cross-sectional views 2900B-2900E of the heat transfer element 50 of FIG. 29A with alternative positions and shapes of a spine 90, in accordance with some embodiments of the disclosure. Specifically, FIG. 29B illustrates a polygonal or rectangular spine 90 positioned offset from the body 51 on a side adjacent to the nested portion 60 of the heat transfer element 50. FIG. 29C illustrates a polygonal or rectangular spine 90 positioned along a body 51 above the nested portion 60 of the heat transfer element 50. FIG. 29D illustrates a curvilinear spine 90 positioned along a body 51 above the nested portion 60 of the heat transfer element 50. FIG. 29E illustrates a curvilinear spine 90 positioned above an outer surface 54 of the body 51 of the heat transfer element 50.

Figure 30A:
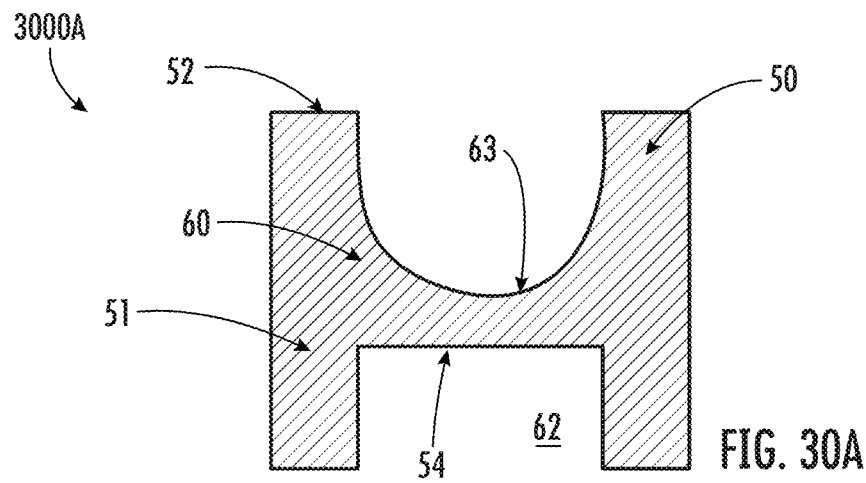
FIG. 30A illustrates a schematic cross-sectional view 3000A of a heat transfer element 50, in accordance with some embodiments of the disclosure.
Figure 30B:
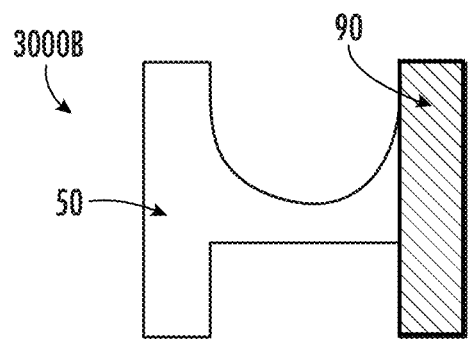
FIGS. 30B to 30E illustrate schematic cross-sectional views 3000B-3000E of the heat transfer element 50 of FIG. 30A with alternative positions of a spine 90, in accordance with some embodiments of the disclosure.
Figure 30C:
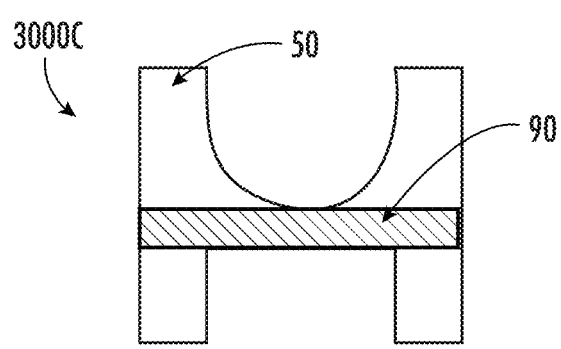
Figure 30D:
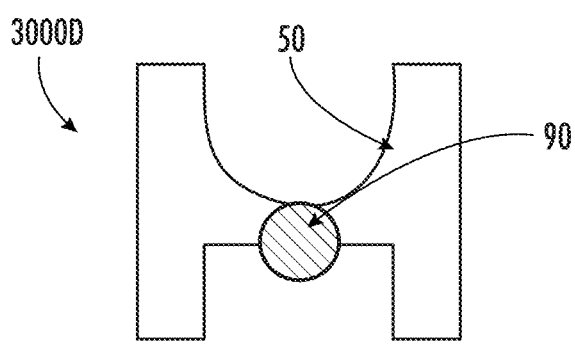
Figure 30E:
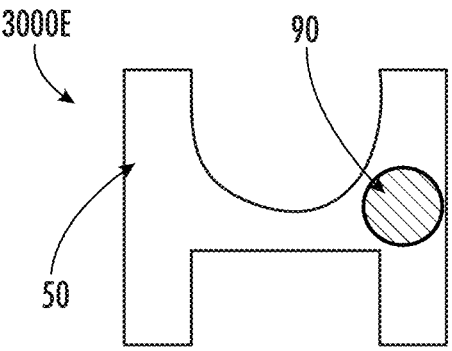

FIG. 30A illustrates a schematic cross-sectional view 3000A of a heat transfer element 50, in accordance with some embodiments of the disclosure. FIGS. 30B to 30E illustrate schematic cross-sectional views 3000B-3000E of the heat transfer element 50 of FIG. 30A with alternative positions of a spine 90, in accordance with some embodiments of the disclosure. Specifically, FIG. 30A illustrates a cross-sectional view of a heat transfer element 50, while FIGS. 30B-30E illustrate alternative positions of a spine 90 therein. Specifically, FIG. 30B illustrates a polygonal or rectangular spine 90 positioned offset from the body 51 adjacent the nested portion 60 of the heat transfer element 50. FIG. 30C illustrates a polygonal or rectangular spine 90 positioned along a general center of the body 51 below the nested portion 60 of the heat transfer element 50. FIG. 30D illustrates a curvilinear spine 90 (e.g., circular, or the like) positioned along a general center of the body 51 below the nested portion 60 of the heat transfer element 50. FIG. 30E illustrates a curvilinear spine 90 (e.g., circular, or the like) positioned offset from a general center of the body 51 of the adjacent the side of the nested portion 60 of the heat transfer element. In some embodiments, the heat transfer element 50 of FIGS. 30A-30E, is structured for separating the tracer tube 20 from the corresponding process pipe 10 and/or other process pipe component portions 5, for example, in order to reduce heat transfer when the heating fluid within the tracer tube 20 is above a predetermined threshold associated with direct contact therebetween (e.g., too hot for direct contact).

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed:

1. A heat transfer element comprising:
   a body comprising a plurality of discrete body portions having a nested portion that forms a cavity therein;
   a spine operatively coupling the plurality of discrete body portions together;
   wherein the spine is configured to be bent in one or more planes to form a curved heat transfer element;
   wherein the curved heat transfer element is configured to be operatively coupled to a process pipe component portion with the plurality of discreate body portions having the cavity extending along the process pipe component portion;
   wherein the cavity of the nested portion is configured to receive a tracer tube; and
   wherein the curved heat transfer element is configured to transfer heat between the tracer tube and the process pipe component portion.

2. The heat transfer element of claim 1, wherein the spine has a cross-section that is curvilinear or polygonal.

3. The heat transfer element of claim 1, wherein the spine is operatively coupled to an outer surface radially outward of the cavity of the nested portion the plurality of discrete body portions.

4. The heat transfer element of claim 1, wherein the spine is operatively coupled to an outer surface adjacent of the cavity of the nested portion of the plurality of discrete body portions.

5. The heat transfer element of claim 1, wherein the plurality of discrete body portions comprise one or more bevels, and wherein the one or more bevels are configured to allow bending of the body in a beveled plane to a radius that is smaller than the radius in a non-bevel plane.

6. The heat transfer element of claim 1, wherein the spine has a length, a width, and a thickness; wherein the thickness is less than the width and the length, and the width is less than the length, and wherein the thickness facilitates bending of the spine out of a plane created by the width and the length.

7. The heat transfer element of claim 1, wherein the body further comprises:
   one or more arms operatively coupled to one or more of the plurality of discrete body portions.

8. The heat transfer element of claim 7, wherein an inner surface of the one or more arms are curved to provide surface to surface contact between the process pipe component portion and the inner surface of the one or more arms of the heat transfer element.

9. The heat transfer element of claim 1, wherein the nested portion is formed within an inner surface of the plurality of discrete body portions such that the cavity extends from the inner surface of the plurality of discrete body portions into the plurality of discrete body portions.

10. The heat transfer element of claim 1, wherein the nested portion is formed within an outer surface of the plurality of discrete body portions such that the cavity extends from the outer surface of the plurality of discrete body portions into the plurality of discrete body portions.

11. A heat transfer system, the system comprising:
    a process pipe component portion;
    a tracer tube; and
    a heat transfer element operatively coupled to the tracer tube and the process pipe component portion, wherein the heat transfer element, comprises:
    a body comprising a plurality of discrete body portions having a nested portion that forms a cavity therein;
    a spine operatively coupling the plurality of discrete body portions together;
    wherein the spine is configured to be bent in one or more planes to form a curved heat transfer element;
    wherein the curved heat transfer element is operatively coupled to the process pipe component portion with the plurality of discrete body portions having the cavity extending along the process pipe component portion;
    wherein the cavity of the nested portion is configured to receive the tracer tube; and
    wherein the heat transfer element is configured to transfer heat between the tracer tube and the process pipe component portion.

12. The heat transfer system of claim 11, wherein the spine has a cross-section that is curvilinear or polygonal.

13. A method of installing a heat transfer element, wherein the heat transfer element comprises: a body comprising a plurality of discrete body portions having a nested portion that forms a cavity therein, a spine operatively coupling the plurality of discrete body portions together, the method comprising:
- bending the heat transfer element into a curved heat transfer element by forming a radius in at least a portion of the spine of the heat transfer element; and
- assembling the curved heat transfer element and a tracer to a process pipe component portion;
- wherein the tracer is located within the cavity of the plurality of discrete body portions of curved heat transfer element; and
- wherein the curved heat transfer element and tracer operatively coupled to the process pipe component portion exchanges heat between the tracer and process pipe component portion through the curved heat transfer element.

14. The heat transfer system of claim 11, wherein the spine is operatively coupled to an outer surface radially outward of the cavity of the nested portion the plurality of discrete body portions.

15. The heat transfer system of claim 11, wherein the spine is operatively coupled to an outer surface adjacent of the cavity of the nested portion of the plurality of discrete body portions.

16. The heat transfer system of claim 11, wherein the plurality of discrete body portions comprise one or more bevels, and wherein the one or more bevels are configured to allow bending of the body in a beveled plane to a radius that is smaller than the radius in a non-bevel plane.

17. The heat transfer system of claim 11, wherein the body further comprises:
- one or more arms operatively coupled to one or more of the plurality of discrete body portions.

18. The heat transfer system of claim 17, wherein an inner surface of the one or more arms are curved to provide surface to surface contact between the process pipe component portion and the inner surface of the one or more arms of the heat transfer element.

19. The heat transfer element of claim 11, wherein the nested portion is formed within an inner surface of the plurality of discrete body portions such that the cavity extends from the inner surface of the plurality of discrete body portions into the plurality of discrete body portions.

20. The heat transfer element of claim 11, wherein the nested portion is formed within an outer surface of the plurality of discrete body portions such that the cavity extends from the outer surface of the plurality of discrete body portions into the plurality of discrete body portions.

* * * * *